(12) United States Patent
Ide

(10) Patent No.: US 8,165,252 B2
(45) Date of Patent: Apr. 24, 2012

(54) SIGNAL PROCESSING DEVICE AND METHOD, AND PROGRAM

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 1006 days.

(21) Appl. No.: 12/126,341

(22) Filed: May 23, 2008

(65) Prior Publication Data

US 2008/0292038 A1    Nov. 27, 2008

(30) Foreign Application Priority Data

May 24, 2007    (JP) ................................ P2007-137874

(51) Int. Cl.
  *H04L 7/00* (2006.01)
  *H04L 27/00* (2006.01)
(52) U.S. Cl. ......................................... 375/354; 375/326
(58) Field of Classification Search .................. 375/354, 375/355, 371, 373, 375, 376, 362, 316, 322, 375/323, 324, 325, 326, 327; 327/141, 144, 327/152, 153, 156, 147, 162
  See application file for complete search history.

(56) References Cited

U.S. PATENT DOCUMENTS

| | | | |
|---|---|---|---|
| 4,760,344 A | 7/1988 | Takase et al. | |
| 5,247,544 A | 9/1993 | LaRosa et al. | |
| 5,614,861 A | 3/1997 | Harada | |
| 5,977,821 A * | 11/1999 | Shibata | 329/306 |
| 2006/0227916 A1 | 10/2006 | Masui et al. | |
| 2007/0002990 A1 * | 1/2007 | Lee et al. | 375/355 |

FOREIGN PATENT DOCUMENTS

| | | |
|---|---|---|
| JP | 60-198945 | 10/1985 |
| JP | 62-183247 | 8/1987 |
| JP | 02-117247 | 5/1990 |
| JP | 06-085860 | 3/1994 |
| JP | 06-197083 | 7/1994 |
| JP | 06-508494 | 9/1994 |
| JP | 08-213977 | 8/1996 |
| JP | 08-317005 | 11/1996 |
| JP | 2002-190724 | 7/2002 |
| JP | 2002-544685 | 12/2002 |
| JP | 2004-053412 | 2/2004 |
| JP | 2005-151087 | 6/2005 |
| JP | 2006-262165 | 9/2006 |
| WO | WO 00/67441 | 11/2000 |

* cited by examiner

*Primary Examiner* — David C. Payne
*Assistant Examiner* — Vineeta Panwalkar
(74) *Attorney, Agent, or Firm* — Finnegan, Henderson, Farabow, Garrett & Dunner, L.L.P.

(57) ABSTRACT

A signal processing device for detecting, from an input signal expressing data series, the data, including: a sampling clock generating unit for generating, from a driving clock with a predetermined cycle, multiple sampling clocks with mutually different phases and the same cycle as the cycle; a sampling data generating unit for sampling the input signal using the multiple sampling clocks, and generating a plurality of sampling data; a phase comparison data generating unit for generating phase comparison data indicating phase shifting as to the input signal of the sampling clock using the sampling data for each sampling clock; and a data generating unit for generating the data for each sampling clock using the sampling data, and selecting the data of the sampling clock having the phase closest to the phase of the input signal as the original data expressed with the input signal, based on the phase comparison data.

10 Claims, 30 Drawing Sheets

FIG. 10

| lock-flag | phase-init |
|---|---|
| 0001 | 0 |
| 0010 | 2 |
| 0011 | 1 |
| 0100 | 4 |
| 0110 | 3 |
| 0111 | 2 |
| 1000 | 6 |
| 1001 | 7 |
| 1011 | 0 |
| 1100 | 5 |
| 1101 | 6 |
| 1110 | 4 |

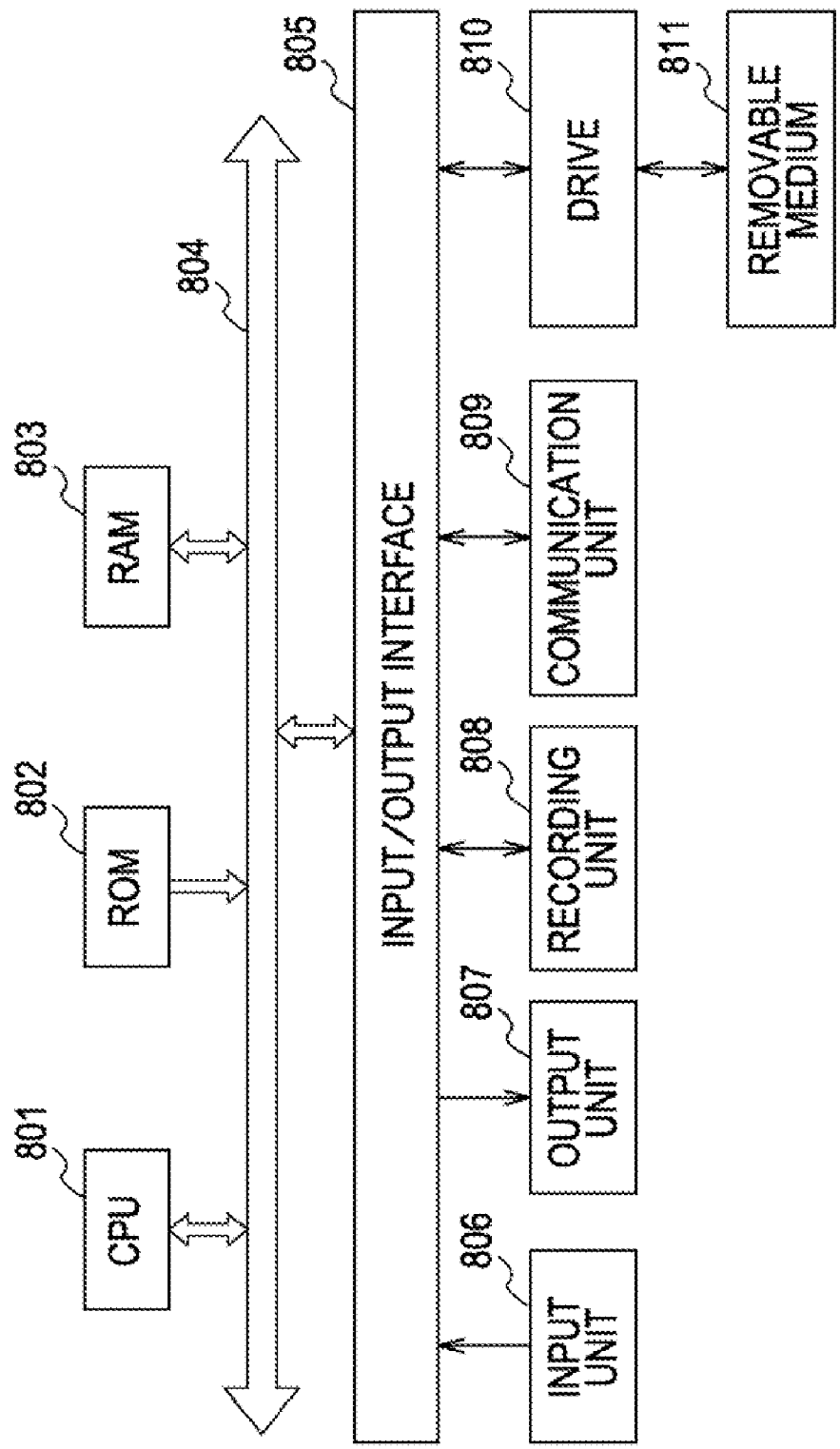

SIGNAL PROCESSING DEVICE AND METHOD, AND PROGRAM

CROSS REFERENCES TO RELATED APPLICATIONS

The present invention contains subject matter related to Japanese Patent Application JP 2007-137874 filed in the Japanese Patent Office on May 24, 2007, the entire contents of which are incorporated herein by reference.

BACKGROUND OF THE INVENTION

1. Field of the Invention

The present invention relates to a signal processing device and method, and a program, and particularly relates to a signal processing device and method, and a program whereby detection can be carried out simpler in a sure manner.

2. Description of the Related Art

With digital modulation methods for transporting a digital signal with a predetermined allocated band, a signal obtained by modulating the amplitude or phase of a predetermined carrier according to data is transmitted. Of these digital modulation methods, in particular, a method for modulating amplitude is called "amplitude modulation", and a method for modulating a phase is called "phase modulation".

The amplitude modulation method, i.e., ASK (Amplitude Shift Keying) method, is a digital modulation method for modulating the amplitude of a carrier so as to correspond to data to be transmitted. With the amplitude modulation method, 1-bit data is made to correspond to the magnitude of amplitude, and among the amplitude modulation methods, there is known an OSK (On-Off Shift Keying) method for corresponding data to the presence/absence of amplitude, and so forth.

Also, the phase modulation method, i.e., PSK (Phase Shift Keying) method, is a digital modulation method for modulating the phase of a carrier so as to correspond to data to be transmitted. As for the phase modulation method, there are known the BPSK (Binary Phase Shift Keying) method for corresponding 1-bit data to a phase, QPSK (Quadrature Phase Shift Keying) method, and so forth.

For example, with BPSK, the phase of a carrier is made to correspond to 0 or n according to the logic value of baseband data to be transmitted. Specifically, if we say that the frequency of a carrier is taken as $\omega$, and predetermined point-in-time is taken as t, the carrier can be represented with $\sin(\omega t)$. If we say that the logic value 0 or 1 of baseband data to be transmitted is made to correspond to the phase 0 or n of a carrier, a BPSK signal in a section where the logic value of the baseband data is 0 is taken as $\sin(\omega t)$ that is the carrier itself, and a BPSK signal in a section where the logic value of the baseband data is 1 is taken as $-\sin(\omega t)$ wherein the phase of the carrier is shifted by just n. Here, a BPSK signal (PSK signal) is a signal obtained by modulating a carrier based on the logic value of the baseband data.

Thus, as for a detection method for obtaining original baseband data represented with a logic value from a digital modulated signal obtained by modulating a carrier according to data, synchronous detection has been known well. With synchronous detection, an oscillation signal having the same frequency as the carrier of a received digital modulated signal is oscillated, and the original baseband data is reproduced using the oscillation signal thereof.

That is to say, with synchronous detection of a PSK signal, usually, an oscillation signal and the received PSK signal are input to a multiplier, and output obtained by calculation with the multiplier is further subjected to filtering by a low-pass filter, thereby obtaining baseband data. Here, the multiplier is employed for utilizing a mixer function for performing addition and subtraction of the frequency of an input signal, and the low-pass filter is employed for removing the components twice the frequency of the carrier, included in the signal output from the multiplier.

For example, with BPSK method, upon $\sin(\omega t)$ that is an oscillation signal, and $\sin(\omega t)$ or $-\sin(\omega t)$ that is the received BPSK signal being input to the multiplier, as the output thereof, $(1-\cos(2\omega t))/2$ is obtained when the logic value of the baseband data is 0, and $(-1-\cos(2\omega t))/2$ is obtained when the logic value of the baseband data is 1.

The components of $\cos(2\omega t)$ are removed from $(1-\cos(2\omega t))/2$ or $(-1-\cos(2\omega t))/2$ that is the output from the multiplier using the low-pass filter, as the output from the low-pass filter, there can be obtained a signal level of 1 when the logic value of the baseband data is 0, a signal level of $-1$ when the logic value of the baseband data is 1.

In order to perform synchronous detection of a digital modulated signal, the oscillation signal needs to be a signal having completely the same frequency as the carrier of the received digital modulated signal. Therefore, a carrier reproducing signal obtained by carrier reproduction is frequently employed as an oscillation signal. This carrier reproducing signal is obtained by taking the received digital modulated signal as two inputs to the multiplier, i.e., the received digital modulated signal, and completely the same signal as that signal being input to the multiplier, the output from the multiplier being further input to a band-pass filter, and a ½ frequency divider. Here, the multiplier is employed for utilizing a function as a frequency 2 multiplying circuit, and the band-pass filter is employed for enhancing the components twice the frequency of the carrier.

For example, with BPSK method, upon $\sin(\omega t)$ or $-\sin(\omega t)$ that is the received BPSK signal being input to the multiplier and being squared, as the output thereof $(1-\cos(2\omega t))/2$ is obtained in either case. Subsequently, only the components of $\cos(2\omega t)$ are extracted from the obtained $1-\cos(2\omega t)$ using the band-pass filter, and further the frequency thereof is divided into ½ using a ½ frequency divider or the like, thereby obtaining the components $\cos(\omega t)$ having completely the same frequency as the carrier. Subsequently, the phase or the like of the signal of $\cos(\omega t)$ thus obtained is adjusted, thereby obtaining an oscillation signal $\sin(\omega t)$ employed for synchronous detection of a BPSK signal.

As described above, baseband data is generated by down-converting the received digital modulated signal from the band of the carrier to the band of baseband utilizing synchronous detection and carrier reproduction, thereby obtaining the original data.

With the above-mentioned detection method of a PSK signal, the properties of a PSK signal as an analog signal are utilized well, whereby a detection device for detecting a PSK signal using such a detection method can be effectively realized by configuring the detection device with an analog circuit. Note however, in a case wherein a detection device for detecting a PSK signal using the above-mentioned detection method is configured of a digital circuit, it has been difficult to reproduce the carrier of the PSK signal by the digital circuit.

Therefore, there have been proposed several methods for detecting the original data from a PSK signal without performing carrier reproduction (e.g., see Japanese Unexamined Patent Application Publication No. 60-198945, Japanese Unexamined Patent Application Publication No. 62-183247, Japanese Unexamined Patent Application Publication No. 2-117247, Japanese Unexamined Patent Application Publication No. 6-85860, and Japanese Unexamined Patent Application Publication No. 8-317005).

With these methods, first, the received PSK signal is sampled using a sampling clock having a sampling frequency several times the frequency of the carrier of the PSK signal. Next, according to the code transition timing of the sampling data series obtained with the sampling, the phase of the carrier in the sampling data series is detected. Subsequently, in accordance with the timing of the detected phase, detection of the original data is carried out by a majority vote of the logic values of the sampling data before and after thereof. Here, in order to perform sampling at the sampling frequency twice or more the frequency of the carrier of the PSK signal, a phase synchronization circuit capable of outputting the clock of the frequency of the integral multiplication of the frequency of the input clock, i.e., a PLL (Phase Locked Loop) circuit is employed to generate a sampling clock.

Also, with a transmission device and reception device capable of both of transmission and reception of a PSK signal, and particularly with a transmission device, a PSK signal is transmitted while synchronizing the carrier and baseband data to be transmitted, and accordingly, it is desirable for a digital circuit making up these devices to operate by being driven with a driving clock having the frequency comparable to the frequency of the carrier of a PSK signal. Accordingly, with a reception device as well, the digital circuit is driven with a driving clock having the frequency comparable to the frequency of the carrier of a PSK signal, and the reception device generates the above-mentioned sampling clock having a frequency of the integral multiplication of the frequency of the carrier using the driving clock.

In a case wherein sampling of a PSK signal is performed using the sampling clock generated from the driving clock, and further detection is performed using the sampling data obtained as a result thereof, reproduction of the carrier at the analog circuit is replaced with detection of the phase of the carrier in the sampling data series, and synchronous detection itself is replaced with detection of the original baseband data by a majority vote of sampling data.

Here, the phase of the carrier is detected based on the timing of reverse of code of the sampling data, and the original baseband data detected using the sampling data, and a phase-locked loop is operated with the information of the phase of the carrier obtained as a result thereof. Also, with detection of baseband data according to a majority vote, the first and later half cycles of the sampling clock having the same phase as the phase of the carrier, i.e., the sampling data in one cycle worth in combination thereof is employed, and detection of the original baseband data is performed based on a majority vote of the logic value of the sampling data thereof. That is to say, the logic value of the baseband data is determined from the logic value 1 or 0 in a first half cycle of the sampling data, and the logic value 1 or 0 in a later half cycle thereof.

Thus, a PSK signal is sampled at a sampling frequency several times the frequency of the carrier of the PSK signal, and detection of the original baseband data can be performed based of a majority vote of the logic value of the sampling data obtained as a result thereof without performing carrier reproduction. With such a detection method, the properties of a PSK signal as an analog signal are not employed, so the precision thereof is not high as compared with a method for employing the properties of an analog signal, but a detection device can be designed with digital circuits, and accordingly, there is no need to employ special devices necessary for analog circuits, circuit scale and power requirement can be suppressed, and stable operations can be expected.

SUMMARY OF THE INVENTION

Note however, upon detection being performed with the above-mentioned detection method using digital circuits, with regard to restriction as to the frequency of a PSK signal, restriction due to the operating speed limit of a reception device for receiving the PSK signal is greater compared with restriction due to the operating speed limit in a transmission device for transmitting the PSK signal. As a result thereof, upon the frequency of the carrier of the PSK signal becoming great, a state is caused wherein the PSK signal can be transmitted, but the PSK signal cannot be received, and accordingly, a state is caused wherein the performance of a communication system cannot be exhibited to the maximum extent.

Specifically, first, with the reception device, there is a need to sample a PSK signal at high speed with the sampling frequency several times the frequency of the carrier of the PSK signal, and accordingly, there is a need to provide a block operating at the frequency several times the frequency of the carrier within the reception device. This becomes a condition imposing severer restraints on the reception device as compared with a case wherein the frequency comparable to the frequency of the carrier of the PSK signal is sufficient for the frequency of a driving clock necessary for generating a PSK signal within the transmission device at the time of transmission.

Also, with the reception device, there is a possibility that the operating speed necessary for the block for processing data obtained with high-speed sampling at the sampling frequency several times the frequency of the carrier may exceed the operable limit thereof. For example, in order to perform detection of the original baseband data and processing for comparing phases based on the sampling data sampled at high speed and updated one after another, the stored sampling data needs to be processed before the next sampling data is updated.

Note however, as the sampling speed becomes faster, the next sampling data is input before sampled data is settled, i.e., before so-called settling of data is performed. Therefore, the operable speed of the reception device is subjected to restraints due to the timing of settling of the sampling data, and more severe restraint conditions are imposed on the reception device as compared with the transmission device.

Further, in order to perform detection of the original baseband data, processing for settling a phase is necessary. On the other hand, this processing for settling a phase needs to settle baseband data. Accordingly, in order to perform detection of baseband data and settlement of a phase, processing at extremely short period of time is needed. Note however, in the existing circumstances, many procedures are necessary for detection of baseband data and settlement of a phase, so it has been difficult to perform such processing at a short period of time.

Thus, it has been difficult to obtain the original baseband data easily and in a sure manner from the PSK signal modulated and obtained by PSK method so as to correspond the phase of the carrier to baseband data.

It has been found desirable to enable the original data to be obtained from the signal obtained by modulating a carrier according to data, in a simpler and more sure manner.

A signal processing device according to an embodiment of the present invention is a signal processing device configured to detect, from an input signal expressing data series, the data, including sampling clock generating means configured to generate, from a driving clock with a predetermined cycle serving as operating timing reference, a plurality of sampling clocks with mutually different phases and the same cycle as the cycle, sampling data generating means configured to sample the input signal using each of the plurality of sampling clocks, and generate a plurality of sampling data corresponding to the input signal, phase comparison data generating means configured to generate phase comparison data indicating phase shifting as to the input signal of the sampling clock using the sampling data for each sampling clock, and data generating means configured to generate the data for each sampling clock using the sampling data, and select the data of the sampling clock having the phase closest to the phase of the input signal as original the data expressed with the input signal, of each piece of the data for each of the sampling clocks, based on the phase comparison data.

An arrangement can be made wherein the data generating means multiply each piece of the sampling data obtained by sampling the input signal using each of the plurality of sampling clocks during a period of one cycle of one of the sampling clocks by predetermined weight, compares the sum of the sampling data sampled at a first half cycle of one cycle of the sampling clock, and multiplied by the weight with the sum of the sampling data sampled at a later half cycle of one cycle of the sampling clock, and multiplied by the weight, of the sampling data multiplied by the weight, and generates the data based on the comparison result thereof.

An arrangement can be made wherein the phase comparison data generating means multiply each piece of the sampling data obtained by sampling the input signal using each of the plurality of sampling clocks during a period of one cycle of one of the sampling clocks by predetermined weight, and obtains the sum of each piece of the sampling data multiplied by the weight, thereby generating the phase comparison data.

An arrangement can be made wherein the sampling data generating means employ a sampling clock of which the phase is closer to the phase of the driving clock than the phase of the predetermined sampling clock to sample data obtained by sampling the input signal using a predetermined sampling clock, further samples the data obtained as a result thereof employing a sampling clock having the same phase as the driving clock, and outputs the obtained data thereof as the sampling data, thereby generating the sampling data synchronized with the driving clock.

An arrangement can be made wherein the input signal is a signal obtained by modulating a carrier having generally the same cycle as the cycle of the driving clock according to the data.

An arrangement can be made wherein the sampling clock is delayed by predetermined time shorter than one cycle of the driving clock as to the driving clock.

An arrangement can be made wherein the signal processing device further includes initial phase data generating means configured to detect an initial phase that is the phase of the input signal immediately after starting detection of the data by detecting a predetermined fixed pattern from the input signal using the data for each of the sampling clocks, and generate initial phase data indicating the detection result thereof, phase data generating means configured to detect phase shifting of the input signal as to the initial phase, and generate phase data indicating the detection result thereof, and phase comparison data selecting means configured to select the phase comparison data of the sampling clock having the phase closest to the phase of the input signal, of the comparison data for each of the sampling clocks, based on the initial phase data and the phase data, the phase data generating means generate the phase data based on the data selected by the data selecting means, and the phase comparison data selected by the phase comparison data selecting means, and the data generating means select the data using the initial phase data and the phase data.

A signal processing method or program according to an embodiment of the present invention is a signal processing method or program of a signal processing device configured to detect, from an input signal expressing data series, the data, including the steps of generating, from a driving clock having a predetermined cycle serving as operating timing reference, a plurality of sampling clocks having mutually different phases and the same cycle as the cycle, generating plurality of sampling data corresponding to the input signal by sampling the input signal using each of the plurality of sampling clocks, generating phase comparison data indicating phase shifting as to the input signal of the sampling clock using the sampling data for each of the sampling clocks, and generating the data for each of the sampling clocks using the sampling data, and selecting the data of the sampling clock having the phase closest to the phase of the input signal as the original the data represented with the input signal, of each piece of the data for each of the sampling clocks, based on the phase comparison data.

With an embodiment of the present invention, with a signal processing device configured to detect, from an input signal expressing data series, the data, there are generated from a driving clock with a predetermined cycle serving as operating timing reference, a plurality of sampling clocks with mutually different phases and the same cycle as the cycle, the input signal is sampled using each of the plurality of sampling clocks, and a plurality of sampling data corresponding to the input signal are generated, phase comparison data indicating phase shifting as to the input signal of the sampling clock is generated using the sampling data for each sampling clock, and the data for each sampling clock is generated using the sampling data, and the data of the sampling clock having the phase closest to the phase of the input signal is selected as original the data expressed with the input signal, of each piece of the data for each of the sampling clocks, based on the phase comparison data.

According to an embodiment of the present invention, the original data can be obtained from a signal obtained by modulating a carrier according to data. Particularly, according to an embodiment of the present invention, the original data can be obtained from a signal obtained by modulating a carrier according to data simpler in a sure manner.

BRIEF DESCRIPTION OF THE DRAWINGS

FIG. 10 is a diagram illustrating an example of a table held by a phase encoder;

FIG. 32 is a diagram illustrating a configuration example of a personal computer.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is are described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

The present invention can be applied to a communication device, communication system, and so forth for processing digital signals such as ASK signals, PSK signals, Manchester code, or the like.

Description will be made below with reference to the drawings regarding embodiments to which the present invention has been applied.

Figure 1:
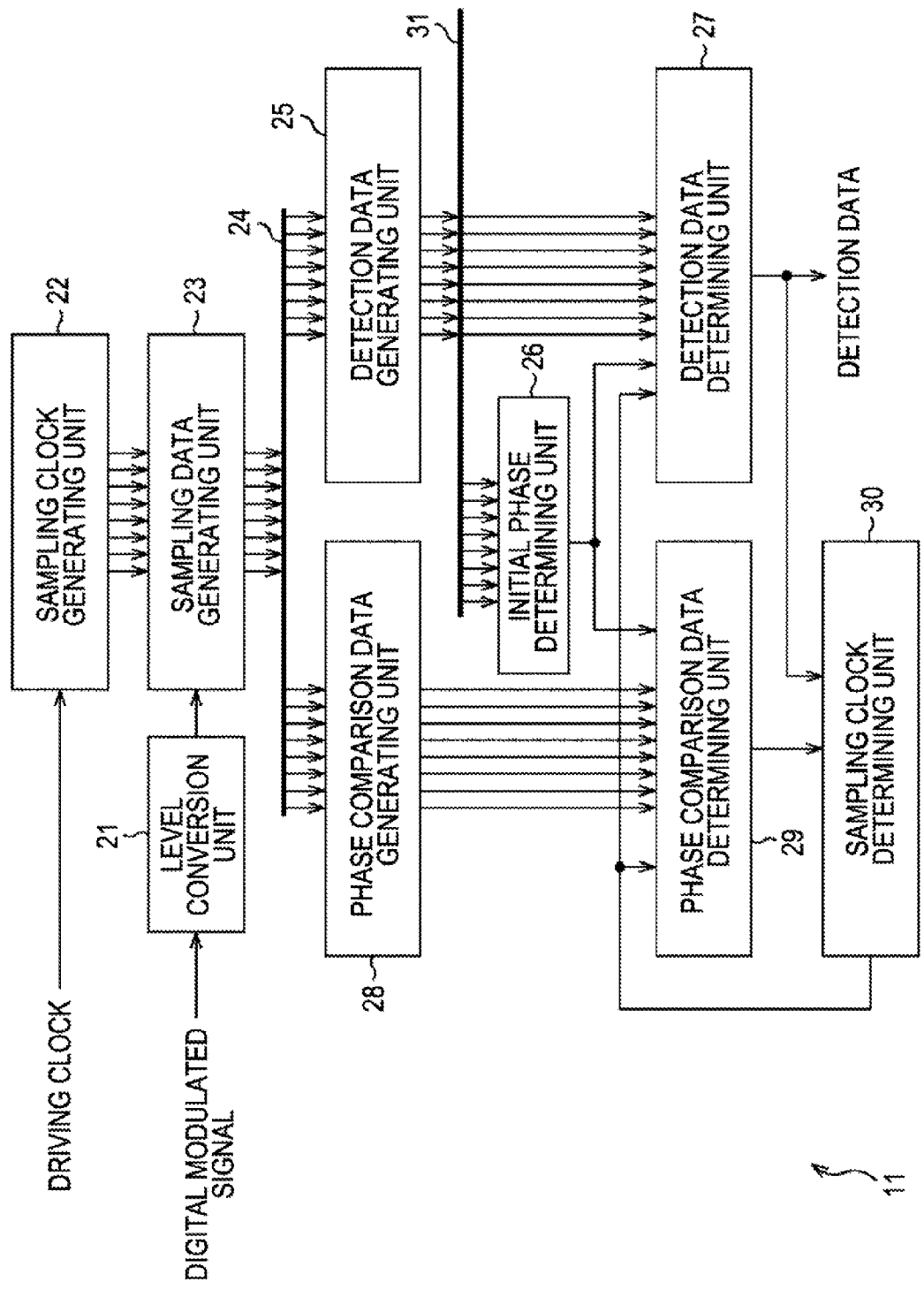
FIG. 1 is a block diagram illustrating a configuration example of an embodiment of a detection device to which the present invention has been applied.

FIG. 1 is a block diagram illustrating a configuration example of an embodiment of a detection device to which the present invention has been applied.

A detection device 11 is configured of a level conversion unit 21, sampling clock generating unit 22, sampling data generating unit 23, bus 24, detection data generating unit 25, initial phase determining unit 26, detection data determining unit 27, phase comparison data generating unit 28, phase comparison data determining unit 29, sampling clock determining unit 30, and bus 31.

The detection device 11 receives a digital modulated signal transmitted from an unshown transmission device. Subsequently, the received digital modulated signal is supplied to the level conversion unit 21. Now, the digital modulated signal is a signal obtained by modulating the phase or amplitude of a carrier so as to correspond to baseband data. Also, a driving clock having the frequency (cycle) comparable to the carrier of the digital modulated signal for driving a digital circuit is supplied to the sampling clock generating unit 22. This driving clock serves as the reference of operation timing of a digital circuit.

The level conversion unit 21 shifts the center level of the supplied digital modulated signal to the reference level for logic determination, and supplies this to the sampling data generating unit 23. The sampling clock generating unit 22 employs the supplied driving clock to generate multiple sampling clocks which are delayed temporally with a shorter interval than the cycle of the driving clock. That is to say, the sampling clock generating unit 22 generates multiple sampling clocks having the same cycle and mutually having a different phase, and supplies the generated sampling clocks to the sampling data generating unit 23.

The sampling data generating unit 23 employs each of the sampling clocks supplied from the sampling clock generating unit 22 to sample the digital modulated signal supplied from the level conversion unit 21. That is to say, the sampling data generating unit 23 performs logic determination of the received digital modulated signal at each timing of each of the sampling clocks, and supplies sample data obtained as a result thereof to the detection data generating unit 25 and phase comparison data generating unit 28 via the bus 24.

Consequently, sampling data obtained for each of the multiple sampling clocks is supplied to the detection data generating unit 25 and phase comparison data generating unit 28. Thus, multiple sampling clocks having the same cycle and mutually having a different phase are employed, whereby sampling can be performed with a shorter time interval than the cycle of the carrier of the digital modulated signal.

The detection data generating unit 25 generates detection data which is baseband data for each of the sampling clocks from the sampling data for each of the sampling clocks supplied from the sampling data generating unit 23. Each piece of the detection data is each piece of baseband data obtained by performing detection assuming that each of the sampling clocks is synchronized with the carrier of the received digital modulated signal. The detection data generating unit 25 supplies the generated detection data to the initial phase determining unit 26 and detection data determining unit 27 via the bus 31.

Also, the detection data generating unit 25 generates error data for preventing a sampling clock clearly not synchronized with the carrier from being selected as a synchronized sampling clock based on the sampling data for each of the sampling clocks supplied form the sampling data generating unit 23. The detection data generating unit 25 supplies the generated error data to the initial phase determining unit 26 via the bus 31.

The initial phase determining unit 26 determines the initial phase of the carrier based on the detection data and error data, supplied from the detection data generating unit 25. More specifically, the initial phase determining unit 26 selects a sampling clock having the same phase as the phase of the carrier of the received digital modulated signal, i.e., a sampling clock synchronized with the carrier from the generated multiple sampling clocks based on the detection data and error data immediately after starting reception of the digital modulated signal, i.e., immediately after starting detection of the digital modulated signal, and supplies the initial phase data indicating the selected sampling clock thereof to the detection data determining unit 27 and phase comparison data determining unit 29.

The detection data determining unit 27 selects the final detection data obtained by performing detection using the sampling clock synchronized with the carrier from the detection data for each of the sampling clocks supplied from the detection data generating unit 25 based on the initial phase data supplied from the initial phase determining unit 26, and the phase comparison low-pass data supplied from the sampling clock determining unit 30. The detection data determining unit 27 supplies the selected final detection data to the sampling clock determining unit 30, and outputs to the block of the subsequent stage of the detection device 11.

Now, the phase comparison low-pass data is assumed to be a signal indicating how far the phase of the carrier of the received digital modulated signal is relatively shifted immediately after staring reception of the digital modulated signal.

The phase comparison data generating unit 28 generates each piece of the phase comparison data indicating how far each of the phases of the generated sampling clocks is relatively shifted as to the phase of the carrier based on the sampling data supplied from the sampling data generating unit 23, and supplies the generated phase comparison data to the phase comparison data determining unit 29.

The phase comparison data determining unit 29 selects the phase comparison data of the sampling clock having the phase closest to the phase of the carrier of the received digital modulated signal, of the phase comparison data for each of the sampling clocks supplied from the phase comparison data generating unit 28, based on the initial phase data supplied from the initial phase determining unit 26, and the phase comparison low-pass data supplied from the sampling clock determining unit 30. The phase comparison data determining unit 29 supplies the selected phase comparison data to the sampling clock determining unit 30.

The sampling clock determining unit 30 detects the sampling clock having the phase closest to the phase of the carrier of the received digital modulated signal. That is to say, the sampling clock determining unit 30 generates phase comparison low-pass data from the detection data supplied from the detection data determining unit 27, and the phase comparison data supplied from the phase comparison data determining unit 29. The sampling clock determining unit 30 supplies the generated phase comparison low-pass data to the detection data determining unit 27 and phase comparison data determining unit 29.

Figure 2:
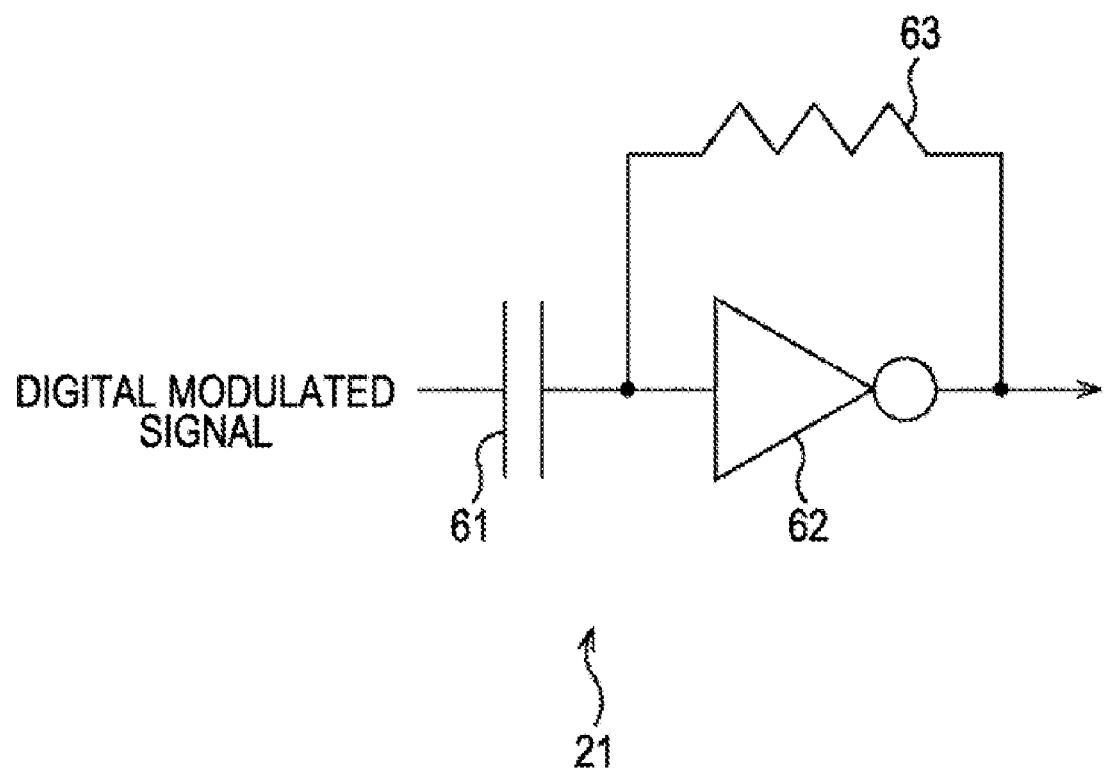
FIG. 2 is a diagram illustrating a configuration example of a level conversion unit.

FIG. 2 is a diagram illustrating a configuration example of the level conversion unit 21 in FIG. 1. The level conversion unit 21 is configured of a capacitor 61, inverter 62, and resistance 63. With the example in FIG. 2, the input terminal of the inverter 62 is connected to one end of the capacitor 61, and further the input terminal inverter 62 is also connected to one end of the resistance 63. Also, the other end of the resistance 63 is connected to the output terminal of the inverter 62.

The received digital modulated signal is input to the inverter 62 via the capacitor 61. That is to say, the received digital modulated signal is input to the end different from the end connected to the input terminal of the inverter 62, of the ends of the capacitor 61.

The inverter 62 is made up of an inverter logic device which operates at high speed, converts (shifts) the level of the digital modulated signal input via the capacitor 61 such that the level of the center thereof becomes the reference level of logic determination, and outputs the digital modulated signal of which the level has been converted. Here, the input terminal and output terminal of the inverter 62 are connected to the resistance 63, so the level of the digital modulated signal is converted into the threshold level of the inverter 62 immediately before being input to the inverter 62.

Thus, the level of the digital modulated signal is converted into a level wherein logic determination can be performed by the level conversion unit 21, whereby the detection device 11 can perform logic determination of the digital modulated signal using a sampling clock. Subsequently, with the detection device 11, the sampling data obtained by logic determination can be processed. Note that as for a combination of the capacitor 61 and resistance 63, a combination is desirable wherein the time constant thereof is small so as to not exceed the frequency of the carrier of the digital modulated signal, and becomes great immediately after receiving the digital modulated signal such that the level of the digital modulated signal is stabilized.

Figure 3:
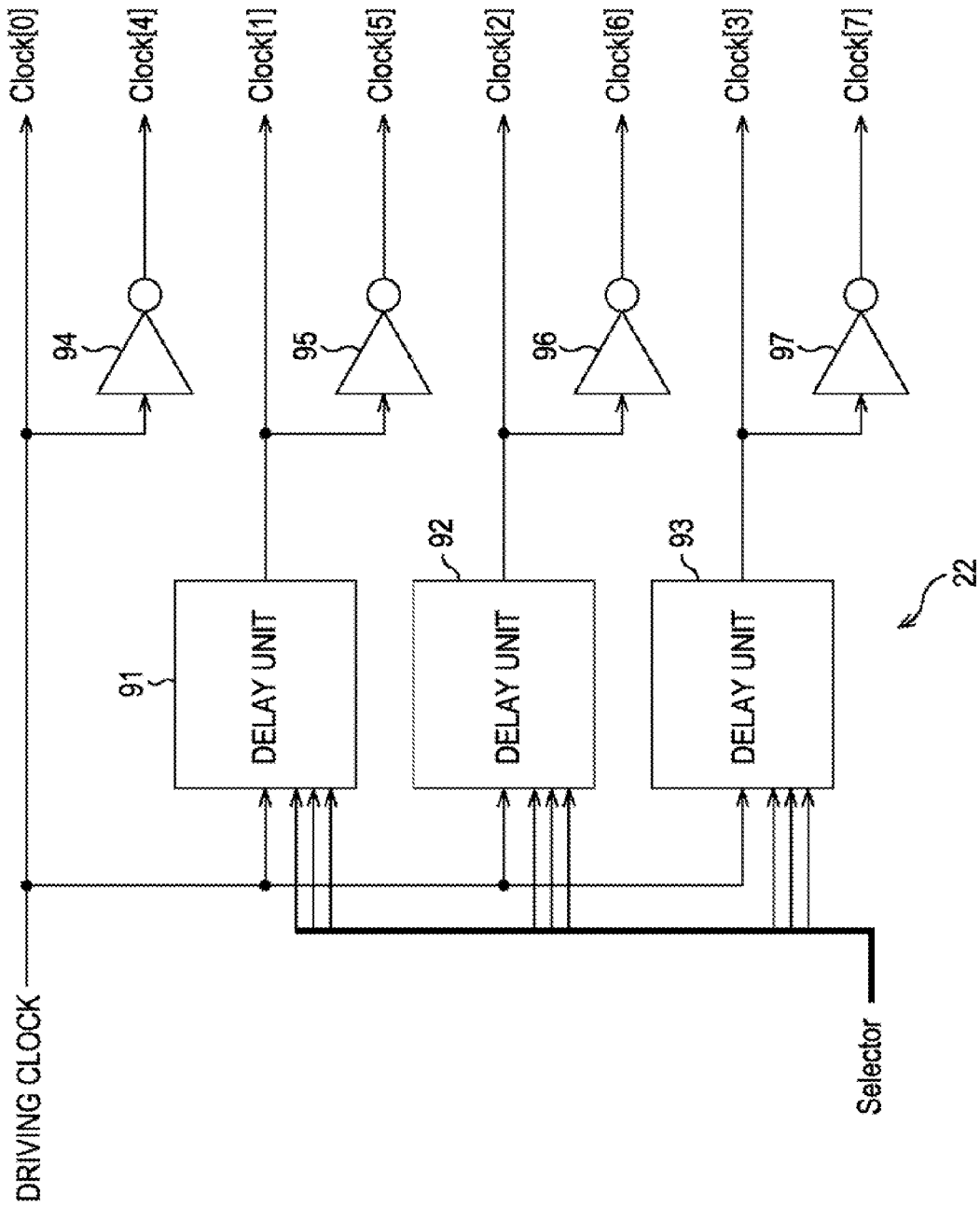
FIG. 3 is a diagram illustrating a configuration example of a sampling clock generating unit.

FIG. 3 is a diagram illustrating a configuration example of the sampling clock generating unit 22 in FIG. 1. The sampling clock generating unit 22 is configured of delay units 91 through 93, and inverters 94 through 97.

Also, the delay units 91 through 93 are made up of, for example, programmable delay devices, and the inverters 94 through 97 are made up of inverters which operate at high speed as compared with the cycle of the driving clock. With the sampling clock generating unit 22, eight sampling clocks are generated wherein the phases are shifted by integer multiples of ⅛ cycle of the driving clock.

That is to say, the input driving clock is output as a sampling clock Clock[0] with no change, and is also supplied to the delay units 91 through 93 and inverter 94. Here, the sampling clock Clock[0] is the driving clock itself, so this is a sampling clock having the same phase as the driving clock.

Also, the inverter 94 inverts the supplied driving clock, and outputs the inverted driving clock as a sampling clock Clock[4]. This sampling clock Clock[4] is a clock wherein the driving clock is inverted, so this is a sampling clock delayed by 4/8 cycles of the sampling clock Clock[0].

The delay unit 91 delays the supplied driving clock by ⅛ cycles of the driving clock based on the signal supplied from an unshown selector controlling the delay unit 91, outputs the delayed driving clock as a sampling clock Clock[1], and supplies the delayed driving clock to the inverter 95. This sampling clock Clock[1] is a clock wherein the driving clock is delayed by ⅛ cycles, so this is a sampling clock delayed by ⅛ cycles of the sampling clock Clock[0].

The inverter 95 inverts the driving clock supplied from the delay unit 91, and outputs the inverted driving clock as a sampling clock Clock[5]. This sampling clock Clock[5] is a clock wherein the driving clock is delayed by ⅛ cycles, so this is a sampling clock delayed by ⅝ cycles of the sampling clock Clock[0].

The delay unit 92 delays the supplied driving clock by 2/8 cycles of the driving clock based on the signal supplied from an unshown selector controlling the delay unit 92, outputs the delayed driving clock as a sampling clock Clock[2], and supplies the delayed driving clock to the inverter 96. This sampling clock Clock[2] is a clock wherein the driving clock is delayed by ⅖ cycles, so this is a sampling clock delayed by ⅖ cycles of the sampling clock Clock[0].

The inverter 96 inverts the driving clock supplied from the delay unit 92, and outputs the inverted driving clock as a sampling clock Clock[6]. This sampling clock Clock[6] is a clock wherein the driving clock is delayed by ⅖ cycles, so this is a sampling clock delayed by ⅖ cycles of the sampling clock Clock[0].

The delay unit 93 delays the supplied driving clock by ⅜ cycles of the driving clock based on the signal supplied from an unshown selector controlling the delay unit 93, outputs the delayed driving clock as a sampling clock Clock[3], and supplies the delayed driving clock to the inverter 97. This sampling clock Clock[3] is a clock wherein the driving clock is delayed by ⅜ cycles, so this is a sampling clock delayed by ⅜ cycles of the sampling clock Clock[0].

The inverter 97 inverts the driving clock supplied from the delay unit 93, and outputs the inverted driving clock as a sampling clock Clock[7]. This sampling clock Clock[7] is a clock wherein the driving clock is delayed by ⅜ cycles, so this is a sampling clock delayed by ⅞ cycles of the sampling clock Clock[0].

The sampling clocks Clock[0] through Clock[7] thus generated at the sampling clock generating unit 22 are supplied to the sampling data generating unit 23.

Thus, the driving clock is delayed by the delay units 91 through 93, and the driving clock is inverted by the inverters 94 though 97, whereby multiple sampling clocks mutually having a different phase can be easily generated using the driving clock without PLL circuits. Also, this sampling clock group is employed, whereby the digital modulated signal can be sampled with a shorter cycle than the driving clock.

Accordingly, constraints due to the operating speed of the detection device 11 as to the frequency of the carrier of the digital modulated signal, caused heretofore in a case wherein a sampling clock having a frequency integer multiples the carrier is generated, can be eliminated, whereby the frequency of the carrier of the digital modulated signal can be increased up to the upper limit of the frequency of the driving clock. That is to say, a sampling clock can be generated without operation at a frequency equal to or greater than the frequency of the carrier.

Note that with the example in FIG. 3, an arrangement has been made wherein the delay units 91 through 93 are arrayed in parallel, but an arrangement may be made wherein three delay units for delaying the driving clock by ⅛ cycles are arrayed in series, or multiple delay units are combined to be arrayed in series or in parallel.

Also, the delay units 91 through 93 are programmable delay devices, so in the case of changing the frequency of the driving clock, duration for delaying the driving clock can be changed, but in the case of the frequency of the driving clock having been determined beforehand, the delay units 91 through 93 are not restricted to programmable delay devices, and delay devices wherein delay duration has been determined beforehand may be employed.

Further, the inverters 94 through 97 invert the driving clock, whereby the sampling clocks output from the inverters 94 through 97 are delayed by the worth of inverse processing time as compared with the other sampling clocks. In a case wherein the delay for the worth of the inverse processing cannot be ignored, an arrangement may be made wherein the other sampling clock not delayed is temporarily stored in a buffer by the delay duration thereof, and all of the sampling clocks are output simultaneously.

Further, with the sampling clock generating unit 22 shown in FIG. 3, sampling clocks are generated by taking advantage of a situation wherein upon the driving clock being inverted, the phase of the driving clock is changed by n, and accordingly, it is desirable that the driving clock is a signal of which the duty ratio approximates 50%.

Figure 4:
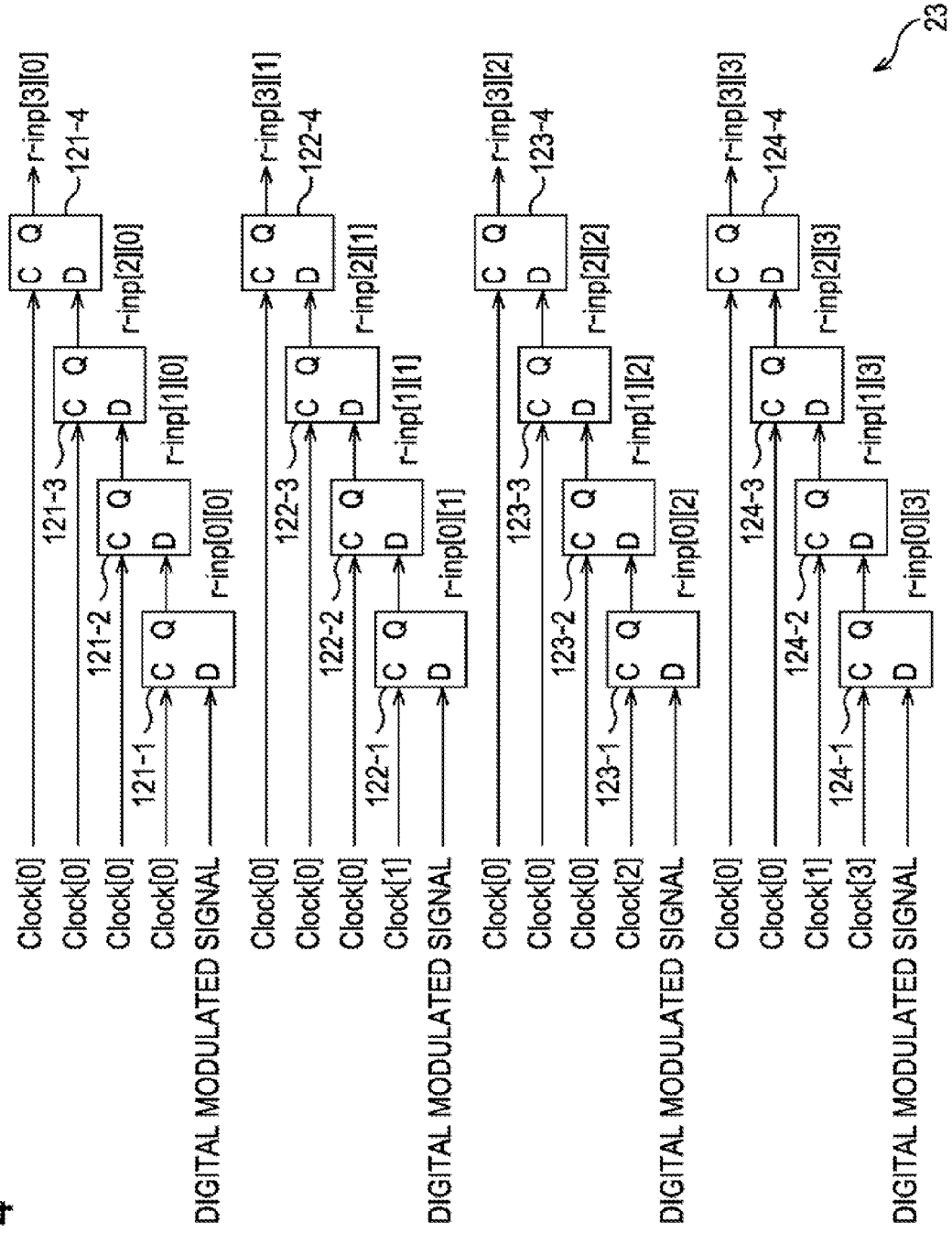
FIGS. 4 and 5 are diagrams illustrating a configuration example of a sampling data generating unit.
Figure 5:
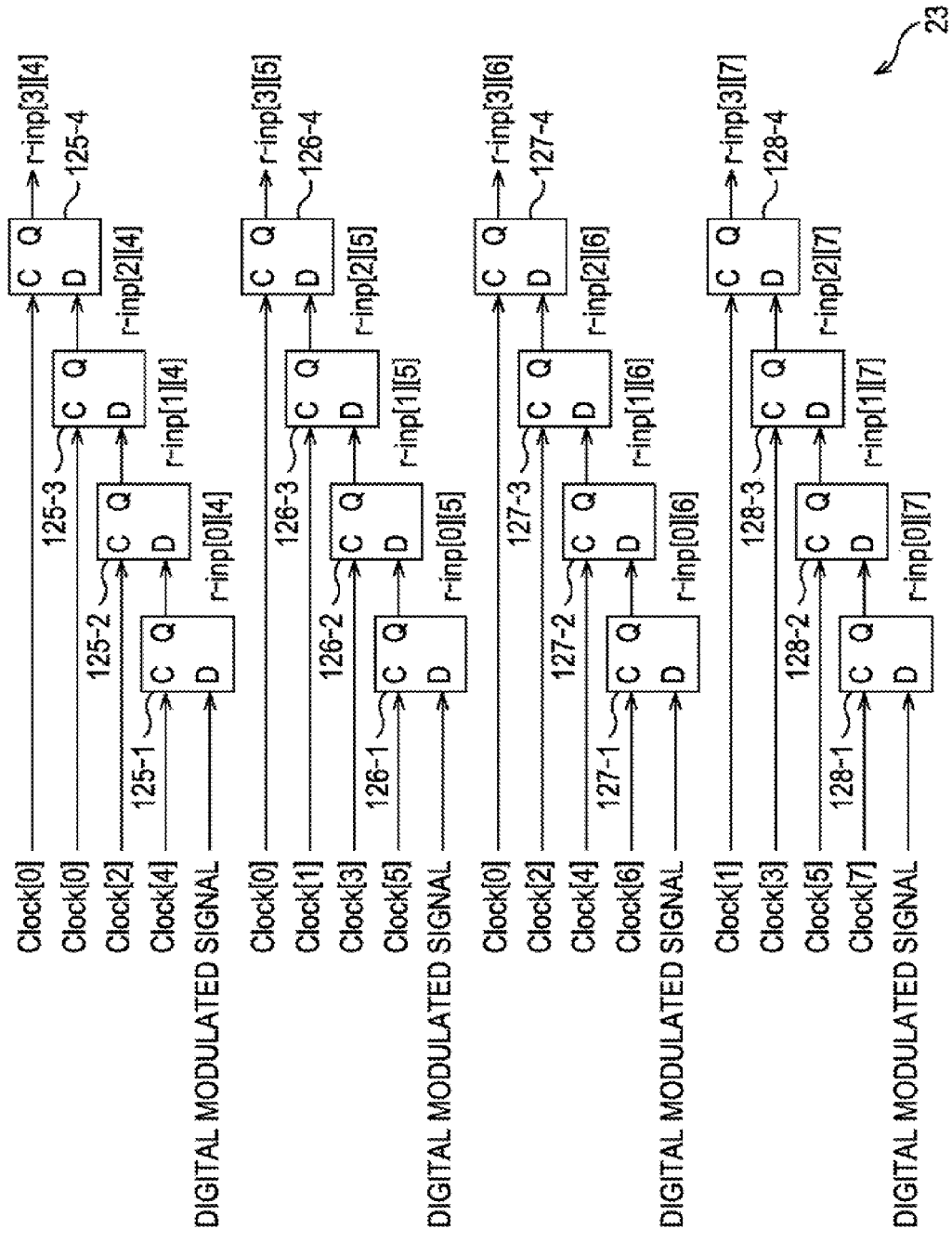

FIGS. 4 and 5 are block diagrams illustrating a configuration example of the sampling data generating unit 23 in FIG. 1. With the sampling data generating unit 23, the cycle tc of the carrier of the digital modulated signal is longer than the delay time td of settling of sampling data, and in the case of the delay time td being around (¾) tc, this is taken as a suitable arrangement for generating sampling data using a sampling clock.

The sampling data generating unit 23 is configured of flip-flops 121-1 through 128-4. That is to say, the sampling data generating unit 23 is configured of eight shift registers each made up of flip-flops 121-1 through 121-4, flip-flops 122-1 through 122-4, flip-flops 123-1 through 123-4, flip-flops 124-1 through 124-4, flip-flops 125-1 through 125-4, flip-flops 126-1 through 126-4, flip-flops 127-1 through 127-4, and flip-flops 123-1 through 128-4.

The flip-flop 121-1 samples the digital modulated signal supplied from the level conversion unit 21 at the timing of the leading edge of the sampling clock Clock[0] supplied from the sampling clock generating unit 22, and outputs logic data r-inp[0][0] obtained according to this sampling. The flip-flop 121-2 samples the logic data r-inp[0][0] output from the flip-flop 121-1 at the timing of the leading edge of the sampling clock Clock[0] supplied from the sampling clock generating unit 22, and outputs logic data r-inp[1][0] obtained according to this sampling.

The flip-flop 121-3 samples the logic data r-inp[1][0] output from the flip-flop 121-2 at the timing of the leading edge of the sampling clock Clock[0] supplied from the sampling clock generating unit 22, and outputs logic data r-inp[2][0] obtained according to this sampling. The flip-flop 121-4 samples the logic data r-inp[2][0] output from the flip-flop 121-3 at the timing of the leading edge of the sampling clock Clock[0] supplied from the sampling clock generating unit 22, and outputs sampling data r-inp[3][0] which is logic data obtained, according to this sampling.

Thus, the digital modulated signal is sampled at the timing of the leading edge of the sampling clock Clock[0], and the sampling data r-inp[3][0] synchronized with the sampling clock Clock[0] is output from the flip-flop 121-4. Note that hereinafter, in a case wherein there is no need to particularly distinguish each of the flip-flops 121-1 through 121-4, these will be simply referenced to as a flip-flop 121.

The flip-flop 122-1 samples the digital modulated signal supplied from the level conversion unit 21 at the timing of the leading edge of the sampling clock Clock[1] supplied from the sampling clock generating unit 22, and outputs logic data r-inp[0][1] obtained according to this sampling. The flip-flop 122-2 samples the logic data r-inp[0][1] output from the flip-flop 122-1 at the timing of the leading edge of the sampling clock Clock[0] supplied from the sampling clock generating unit 22, and outputs logic data r-inp[1][1] obtained according to this sampling.

This takes advantage of the fact that the settling time of the logic data r-inp[0][1] is temporally shorter than duration from the leading edge of the sampling clock Clock[1] to the leading edge of the next sampling clock Clock[0]. That is to say, the level of the logic data r-inp[0][1] held at the flip-flop 122-1 becomes a level wherein the logic value thereof can be read correctly by the time of the leading edge of the next sampling Clock[0], so the logic data r-inp[0][1] is sampled temporally at the timing of the leading edge of the next sampling clock Clock[0], whereby the logic data r-inp[0][1] can be taken as the data synchronized with the sampling clock Clock[0].

The flip-flop 122-3 samples the logic data r-inp[1][1] output from the flip-flop 122-2 at the timing of the leading edge of the sampling clock Clock[0] supplied from the sampling clock generating unit 22, and outputs logic data r-inp[2][1] obtained according to this sampling. The flip-flop 122-4 samples the logic data r-inp[2][1] output from the flip-flop 122-3 at the timing of the leading edge of the sampling clock Clock[0] supplied from the sampling clock generating unit 22, and outputs sampling data r-inp[3][1] which is logic data obtained according to this sampling.

Thus, the digital modulated signal is sampled at the timing of the leading edge of the sampling clock Clock[1], and the sampling data r-inp[3][1] synchronized with the sampling clock Clock[0] is output from the flip-flop 122-4. That is to say, the data obtained by sampling the sampling data r-inp[3][1] at the timing of the leading edge of the sampling clock Clock[0] is equal to the logic data when sampling the digital modulated data at the timing of the leading edge of the sampling clock Clock[1], and is also the data synchronized with the sampling clock Clock[0].

Note that hereafter, in a case that there is no need to particularly distinguish each of the flip-flops 122-1 through 122-4, these will be simply referred to as a flip-flop 122.

The flip-flop 123-1 samples the digital modulated signal supplied from the level conversion unit 21 at the timing of the leading edge of the sampling clock Clock[2] supplied from the sampling clock generating unit 22, and outputs logic data r-inp[0][2] obtained according to this sampling. The flip-flop 123-2 samples the logic data r-inp[0][2] output from the flip-flop 123-1 at the timing of the leading edge of the sampling clock Clock[0] supplied from the sampling clock generating unit 22, and outputs logic data r-inp[1][2] obtained according to this sampling.

This takes advantage of the fact that the settling time of the logic data r-inp[0][2] is temporally shorter than duration from the leading edge of the sampling clock Clock[2] to the leading edge of the next sampling clock Clock[0].

The flip-flop 123-3 samples the logic data r-inp[1][2] output from the flip-flop 123-2 at the timing of the leading edge of the sampling clock Clock[0] supplied from the sampling clock generating unit 22, and outputs logic data r-inp[2][2] obtained, according to this sampling. The flip-flop 123-4 samples the logic data r-inp[2][2] output from the flip-flop 123-3 at the timing of the leading edge of the sampling clock Clock[0] supplied from the sampling clock generating unit 22, and outputs sampling data r-inp[3][2] which is logic data obtained according to this sampling.

Thus, the digital modulated signal is sampled at the timing of the leading edge of the sampling clock Clock[2], and the sampling data r-inp[3][2] synchronized with the sampling clock Clock[0] is output from the flip-flop 123-4. That is to say, the data obtained by sampling the sampling data r-inp[3][2] at the timing of the leading edge of the sampling clock Clock[0] is equal to the logic data when sampling the digital modulated signal at the timing of the leading edge of the sampling clock Clock[2], and is also the data synchronized with the sampling clock Clock[0]. Note that hereafter, in a case that there is no need to particularly distinguish each of the flip-flops 123-1 through 123-4, these will be simply referred to as a flip-flop 123.

The flip-flop 124-1 samples the digital modulated signal supplied from the level conversion unit 21 at the timing of the leading edge of the sampling clock Clock[3] supplied from the sampling clock generating unit 22, and outputs logic data r-inp[0][3] obtained according to this sampling. The flip-flop 124-2 samples the logic data r-inp[0][3] output from the flip-flop 124-1 at the timing of the leading edge of the sampling clock Clock[1] supplied from the sampling clock generating unit 22, and outputs logic data r-inp[1][3] obtained according to this sampling.

This takes advantage of the fact that the settling time of the logic data r-inp[0][3] is temporally shorter than duration from the leading edge of the sampling clock Clock[3] to the leading edge of the next sampling clock Clock[1].

The flip-flop 124-3 samples the logic data r-inp[1][3] output from the flip-flop 124-2 at the timing of the leading edge of the sampling clock Clock[0] supplied from the sampling clock generating unit 22, and outputs logic data r-inp[2][3] obtained according to this sampling. This takes advantage of the fact that the settling time of the logic data r-inp[1][3] is temporally shorter than duration from the leading edge of the sampling clock Clock[1] to the leading edge of the next sampling clock Clock[0]. The flip-flop 124-4 samples the logic data r-inp[2][3] output from the flip-flop 124-3 at the timing of the leading edge of the sampling clock Clock[0] supplied from the sampling clock generating unit 22, and outputs sampling data r-inp[3][3] which is logic data obtained according to this sampling.

Thus, the digital modulated signal is sampled at the timing of the leading edge of the sampling clock Clock[3], and the sampling data r-inp[3][3] synchronized with the sampling clock Clock[0] is output from the flip-flop 124-4. That is to say, the data obtained by sampling the sampling data r-inp[3][3] at the timing of the leading edge of the sampling clock Clock[0] is equal to the logic data when sampling the digital modulated signal at the timing of the leading edge of the sampling clock Clock[3], and is also the data synchronized with the sampling clock Clock[0]. Note that hereafter, in a case that there is no need to particularly distinguish each of the flip-flops 124-1 through 124-4, these will be simply referred to as a flip-flop 124.

The flip-flop 125-1 samples the digital modulated signal supplied from the level conversion unit 21 at the timing of the leading edge of the sampling clock Clock[4] supplied from the sampling clock generating unit 22, and outputs logic data r-inp[0][4] obtained according to this sampling. The flip-flop 125-2 samples the logic data r-inp[0][4] output from the flip-flop 125-1 at the timing of the leading edge of the sampling clock Clock[2] supplied from the sampling clock generating unit 22, and outputs logic data r-inp[1][4] obtained according to this sampling. This takes advantage of the fact that the settling time of the logic data r-inp[0][4] is temporally shorter than duration from the leading edge of the sampling clock Clock[4] to the leading edge of the next sampling clock Clock[2].

The flip-flop 125-3 samples the logic data r-inp[1][4] output from the flip-flop 125-2 at the timing of the leading edge of the sampling clock Clock[0] supplied from the sampling clock generating unit 22, and outputs logic data r-inp[2][4] obtained according to this sampling. This takes advantage of the fact that the settling time of the logic data r-inp[1][4] is temporally shorter than duration from the leading edge of the sampling clock Clock[2] to the leading edge of the next sampling clock Clock[0]. The flip-flop 125-4 samples the logic data r-inp[2][4] output from the flip-flop 125-3 at the timing of the leading edge of the sampling clock Clock[0] supplied from the sampling clock generating unit 22, and outputs sampling data r-inp[3][4] which is logic data obtained according to this sampling.

Thus, the digital modulated signal is sampled at the timing of the leading edge of the sampling clock Clock[4], and the sampling data r-inp[3][4] synchronized with the sampling clock Clock[0] is output from the flip-flop 125-4. That is to say, the data obtained by sampling the sampling data r-inp[3][4] at the timing of the leading edge of the sampling clock Clock[0] is equal to the logic data when sampling the digital modulated signal at the timing of the leading edge of the sampling clock Clock[4], and is also the data synchronized with the sampling clock Clock[0]. Note that hereafter, in a case that there is no need to particularly distinguish each of the flip-flops 125-1 through 125-4, these will be simply referred to as a flip-flop 125.

The flip-flop 126-1 samples the digital modulated signal supplied from the level conversion unit 21 at the timing of the leading edge of the sampling clock Clock[5] supplied from the sampling clock generating unit 22, and outputs logic data r-inp[0][5] obtained according to this sampling. The flip-flop 126-2 samples the logic data r-inp[0][5] output from the flip-flop 126-1 at the timing of the leading edge of the sampling clock Clock[3] supplied from the sampling clock generating unit 22, and outputs logic data r-inp[1][5] obtained according to this sampling. This takes advantage of the fact that the settling time of the logic data r-inp[0][5] is temporally shorter than duration from the leading edge of the sampling clock Clock[5] to the leading edge of the next sampling clock Clock[3].

The flip-flop 126-3 samples the logic data r-inp[1][5] output from the flip-flop 126-2 at the timing of the leading edge of the sampling clock Clock[1] supplied from the sampling clock generating unit 22, and outputs logic data r-inp[2][5] obtained according to this sampling. This takes advantage of the fact that the settling time of the logic data r-inp[1][5] is temporally shorter than duration from the leading edge of the sampling clock Clock[3] to the leading edge of the next sampling clock Clock[1].

The flip-flop 126-4 samples the logic data r-inp[2][5] output from the flip-flop 126-3 at the timing of the leading edge of the sampling clock Clock[0] supplied from the sampling clock generating unit 22, and outputs sampling data r-inp[3][5] which is logic data obtained according to this sampling. This takes advantage of the fact that the settling time of the logic data r-inp[2][5] is temporally shorter than duration from the leading edge of the sampling clock Clock[1] to the leading edge of the next sampling clock Clock[0].

Thus, the digital modulated signal is sampled at the timing of the leading edge of the sampling clock Clock[5], and the sampling data r-inp[3][5] synchronized with the sampling clock Clock[0] is output from the flip-flop 126-4. That is to say, the data obtained by sampling the sampling data r-inp[3][5] at the timing of the leading edge of the sampling clock Clock[0] is equal to the logic data when sampling the digital modulated signal at the timing wherein the sampling clock Clock[5], and is also the data synchronized with the sampling clock Clock[0]. Note that hereafter, in a case that there is no need to particularly distinguish each of the flip-flops 126-1 through 126-3, these will be simply referred to as a flip-flop 126.

The flip-flop 127-1 samples the digital modulated signal supplied from the level conversion unit 21 at the timing of the leading edge of the sampling clock Clock[6] supplied from the sampling clock generating unit 22, and outputs logic data r-inp[0][6] obtained according to this sampling. The flip-flop 127-2 samples the logic data r-inp[0][6] output from the flip-flop 127-1 at the timing of the leading edge of the sampling clock Clock[4] supplied from the sampling clock generating unit 22, and outputs logic data r-inp[1][6] obtained according to this sampling. This takes advantage of the fact that the settling time of the logic data r-inp[0][6] is temporally shorter than duration from the leading edge of the sampling clock Clock[6] to the leading edge of the next sampling clock Clock[4].

The flip-flop 127-3 samples the logic data r-inp[1][6] output from the flip-flop 127-2 at the timing of the leading edge of the sampling clock Clock[2] supplied from the sampling clock generating unit 22, and outputs sampling data r-inp[2][6] which is logic data obtained according to this sampling. This takes advantage of the fact that the settling time of the logic data r-inp[1][6] is temporally shorter than duration from the leading edge of the sampling clock Clock[4] to the leading edge of the next sampling clock Clock[2].

The flip-flop 127-4 samples the logic data r-inp[2][6] output from the flip-flop 127-3 at the timing of the leading edge of the sampling clock Clock[0] supplied from the sampling clock generating unit 22, and outputs sampling data r-inp[3][6] which is logic data obtained according to this sampling. This takes advantage of the fact that the settling time of the logic data r-inp[2][6] is temporally shorter than duration from the leading edge of the sampling clock Clock[2] to the leading edge of the next sampling clock Clock[0].

Thus, the digital modulated signal is sampled at the timing of the leading edge of the sampling clock Clock[6], and the sampling data r-inp[3][6] synchronized with the sampling clock Clock[0] is output from the flip-flop 127-4. That is to say, the data obtained by sampling the sampling data r-inp[3][6] at the timing of the leading edge of the sampling clock Clock[0] is equal to the logic data when sampling the digital modulated signal at the timing of the leading edge of the sampling clock Clock[6], and is also the data synchronized with the sampling clock Clock[0]. Note that hereafter, in a case that there is no need to particularly distinguish each of the flip-flops 127-1 through 127-4, these will be simply referred to as a flip-flop 127.

The flip-flop 128-1 samples the digital modulated signal supplied from the level conversion unit 21 at the timing of the leading edge of the sampling clock Clock[7] supplied from the sampling clock generating unit 22, and outputs logic data r-inp[0][7] obtained according to this sampling. The flip-flop 128-2 samples the logic data r-inp[0][7] output from the flip-flop 128-1 at the timing of the leading edge of the sampling clock Clock[5] supplied from the sampling clock generating unit 22, and outputs logic data r-inp[1][7] obtained according to this sampling. This takes advantage of the fact that the settling time of the logic data r-inp[0][7] is temporally shorter than duration from the leading edge of the sampling clock Clock[7] to the leading edge of the next sampling clock Clock[5].

The flip-flop 128-3 samples the logic data r-inp[1][7] output from the flip-flop 128-2 at the timing of the leading edge of the sampling clock Clock[3] supplied from the sampling clock generating unit 22, and outputs logic data r-inp[2][7] obtained according to this sampling. This takes advantage of the fact that the settling time of the logic data r-inp[1][7] is temporally shorter than duration from the leading edge of the sampling clock Clock[5] to the leading edge of the next sampling clock Clock[3].

The flip-flop 128-4 samples the logic data r-inp[2][7] output from the flip-flop 128-3 at the timing of the leading edge of the sampling clock Clock[1] supplied from the sampling clock generating unit 22, and outputs sampling data r-inp[3][7] which is logic data obtained according to this sampling. This takes advantage of the fact that the settling time of the logic data r-inp[2][7] is temporally shorter than duration from the leading edge of the sampling clock Clock[3] to the leading edge of the next sampling clock Clock[1].

Thus, the digital modulated signal is sampled at the timing of the leading edge of the sampling clock Clock[7], and the sampling data r-inp[3][7] synchronized with the sampling clock Clock[1] is output from the flip-flop 128-4. That is to say, the data obtained by sampling the sampling data r-inp[3][7] at the timing of the leading edge of the sampling clock Clock[1] is equal to the logic data when sampling the digital modulated signal at the timing of the leading edge of the sampling clock Clock[7], and is also the data synchronized with the sampling clock Clock[1].

The sampling data r-inp[3][7] is data synchronized with the sampling clock Clock[1], but the detection data generating unit 25 and phase comparison data generating unit 28 of the subsequent stages obtain the sampling data r-inp[3][7] at the timing from the leading edge of the sampling clock Clock[1] wherein the sampling data r-inp[3][7] is output temporally to the leading edge of the next sampling clock Clock[0], whereby consequently the sampling data r-inp[3][7] becomes data synchronized with the sampling clock Clock[0]. Note that hereafter, in a case that there is no need to particularly distinguish each of the flip-flops 128-1 through 128-4, these will be simply referred to as a flip-flop 128.

Thus, of the flip-flops making up the sampling data generating unit 23, the flip-flops 121-1 through 128-1 to which the digital modulated signal is input determine the logic level (logic value) of the digital modulated signal at the timing wherein the data held is updated, i.e., at the timing of the leading edge of the supplied sampling clock. Accordingly, with the sampling data generating unit 23, the digital modulated signal is sampled using the multiple sampling clocks obtained by delaying the driving clock by n times ⅛ cycles (wherein 0≦n≦7), whereby the digital modulated signal can be sampled at a shorter cycle than the cycle of the carrier thereof.

Also, in order to process the sampling data obtained by sampling the digital modulated signal at a shorter time interval than the cycle of the carrier, at digital circuits which are driven with the driving clock having the cycle (frequency) comparable to the cycle (frequency) of the carrier of the digital modulated signal, i.e., the detection data generating unit 25 and phase comparison data generating unit 28 of the subsequent stages, the sampling data needs to be synchronized with the driving clock, i.e., the sampling clock Clock[0].

Therefore, with the subsequent flip-flop of each of the flip flops 121-1 through 128-1 which sample the digital modulated signal, the logic data output from the preceding stage is sampled at the timing of the leading edge of a sampling clock having little phase shifting as to the sampling clock Clock[0] (driving clock) as much as possible before the logic data held at the flip-flop of the preceding stage is updated, whereby ultimately, the sampling data r-inp[3][0] through sampling data r-inp[3][7] synchronized with the sampling clock Clock[0] can be obtained.

That is to say, the logic data held at the flip-flop of the preceding stage is sampled sequentially using a sampling clock having a phase closer to the phase of the driving clock than the phase of the sampling clock which the flip-flop thereof employed for sampling, whereby sampling data synchronized with the driving clock can be obtained.

Thus, the sampling data obtained using each of the sampling clocks is synchronized with the sampling clock Clock[0], whereby with the subsequent stage of the sampling data generating unit 23, the sampling data for each of the sampling clocks can be processed in sync with the sampling clock Clock[0] (driving clock) simultaneously. Heretofore, in order to process each piece of sampling data at the timing of the driving clock simultaneously, sampling data cannot be processed until the data obtained by being sampled at the sampling clock most delayed as to the driving clock is settled. Therefore, in order to process the sampling data for each of the sampling clocks simultaneously, there has been constraint on the upper limit of the frequency of the driving clock depending on settling time.

However, there is no need to provide the constraint for the upper limit of the frequency of the driving clock depending on settling time by synchronizing sampling data with the driving clock using several sampling clocks. Thus, the constraint for the limit of the operating speed of the detection device 11 can be eliminated, and accordingly, the frequency (cycle) of the carrier of the digital modulated signal can be increased to the upper limit of the frequency of the driving clock.

Figure 6:
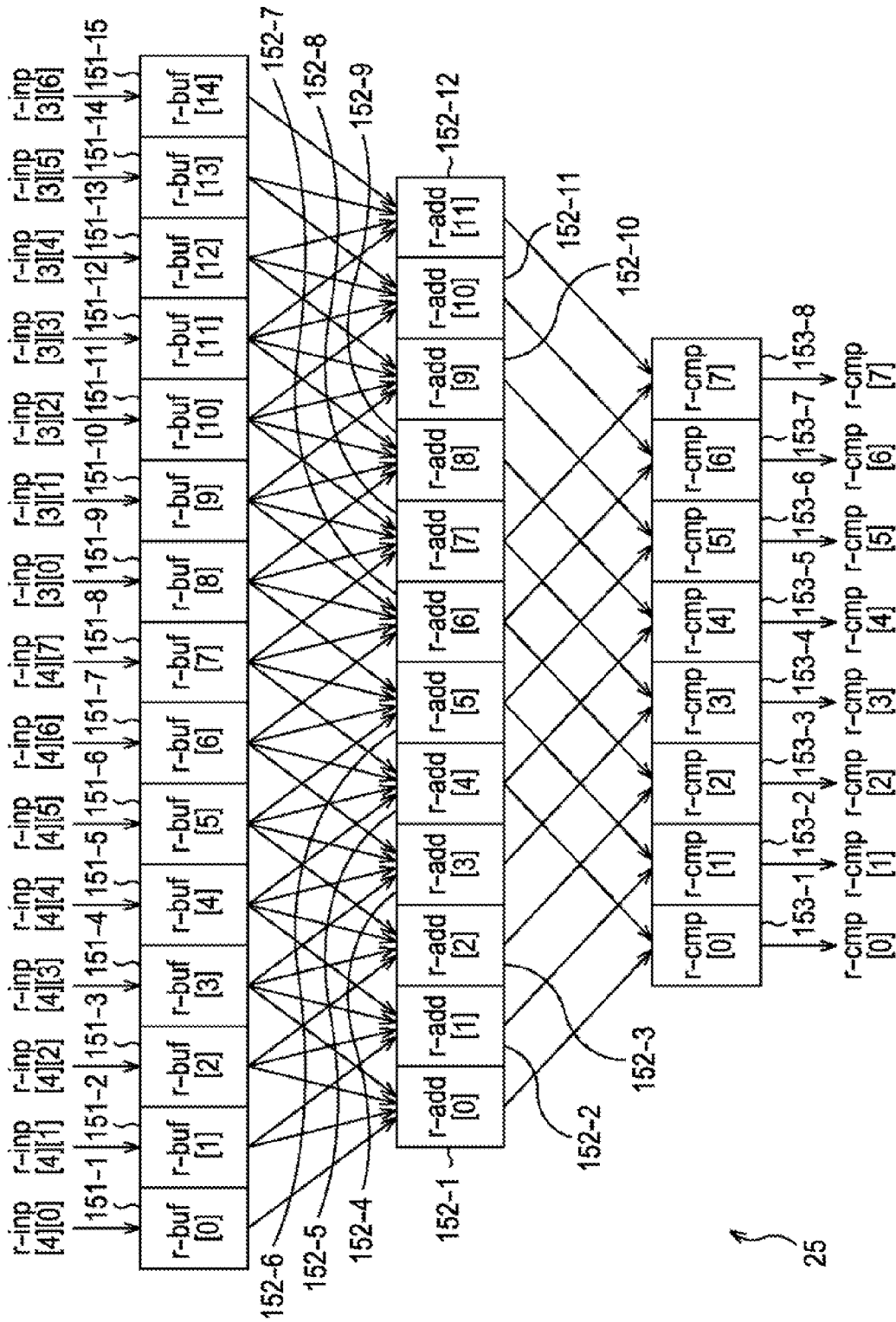
FIGS. 6 and 7 are diagrams illustrating a configuration example of a detection data generating unit.
Figure 7:
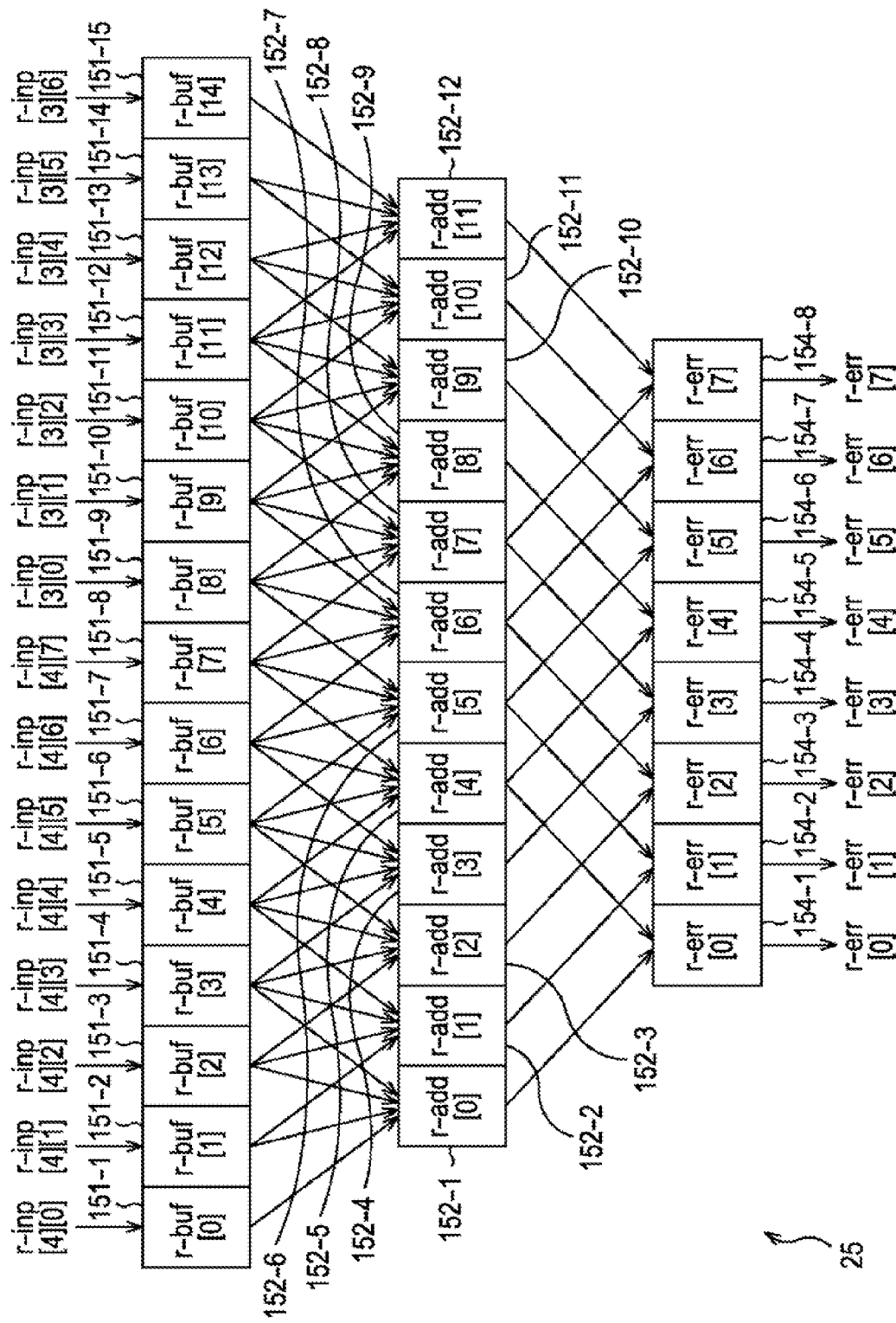

FIGS. 6 and 7 are diagrams illustrating a configuration example of the detection data generating unit 25 in FIG. 1. The detection data generating unit 25 is configured of registers 151-1 through 151-15, registers 152-1 through 152-12, registers 153-1 through 153-3, and registers 154-1 through 154-8.

These registers operate in sync with the same driving clock as the driving clock supplied to the sampling clock generating unit 22, obtain data from the preceding stage at the timing of the leading edge the driving clock, and processes the data as necessary. Subsequently, these registers hold the obtained data by one cycle worth of the driving clock, following which outputs the data held at the next timing of the leading edge of the driving clock temporally. Note that in FIG. 7, the components corresponding to those in FIG. 6 are denoted with the same reference numerals.

The detection data generating unit 25 supplies the sampling data r-inp[3][0] through r-inp[3][7] supplied from the sampling data generating unit 23 last time to the registers 151-1 through 151-8 respectively, and supplies the sampling data r-inp[3][0] through r-inp[3][6] supplied from the sampling data generating unit 23 this time to the registers 151-9 through 151-15 respectively, at the timing of the leading edge of the driving clock.

Note that hereafter, in order to distinguish the sampling data newly supplied this time, and the sampling data supplied last time, the sampling data r-inp[3][0] through r-inp[3][7] supplied last time will also be referred to as sampling data r-inp[4][0] through r-inp[4][7].

The registers 151-1 through 151-15 hold the sampling data r-inp[4][0] through r-inp[3][6] supplied at the timing of the leading edge of the driving clock by one cycle of the driving clock, respectively.

Accordingly, with the registers 151-1 through 151-15, the sampling data obtained by sampling the digital modulated signal using the eight sampling clocks is held during around two cycles worth of the driving clock.

The registers 151-1 through 151-15 supply the sampling data held by one cycle to the register of the subsequent stage at the timing of the leading edge of the driving clock.

That is to say, the register 151-1 supplies the held sampling data r-inp[4][0] to the register 152-1, the register 151-2 supplies the held sampling data r-inp[4][1] to the registers 152-1 and 152-2, and the register 151-3 supplies the held sampling data r-inp[4][2] to the registers 152-1 through 152-3.

Also, the registers 151-4 through 151-12 supply the held sampling data r-inp[4][3] through r-inp[3][3] to the registers 152-1 through 152-4, registers 152-2 through 152-5, registers 152-3 through 152-6, registers 152-4 through 152-7, registers 152-5 through 152-8, registers 152-6 through 152-9, registers 152-7 through 152-10, registers 152-3 through 152-11, and registers 152-9 through 152-12, respectively.

Further, the register 151-13 supplies the held sampling data r-inp[3][4] to the registers 152-10 through 152-12, the register 151-14 supplies the held sampling data r-inp[3][5] to the registers 152-11 and 152-12, and the register 151-15 supplies the held sampling data r-inp[3][6] to the register 152-12.

Note that hereafter, in a case that there is no need to particularly distinguish each of the registers 151-1 through 151-15, these will be simply referred to as a register 151.

The registers 152-1 through 152-12 multiply the logic value of the sampling data supplied from the register 151 by predetermined weight, and hold data r-add[0] through r-add[11] having 1-bit or more precision obtained by adding each of the logic values multiplied by the weight, by one cycle of the driving clock, respectively. Subsequently, the registers 152-1 through 152-12 supply the data r-add[0] through r-add[11] held by one cycle to the register of the subsequent stage at the timing of the leading edge of the driving clock, respectively.

That is to say, the registers 152-1 through 152-12 multiply the logic values of the sampling data supplied from the registers 151-1 through 151-4, registers 151-2 through 151-5, registers 151-3 through 151-6, registers 151-4 through 151-7, registers 151-5 through 151-8, registers 151-6 through 151-9, registers 151-7 through 151-10, registers 151-8 through 151-11, registers 151-9 through 151-12, registers 151-10 through 151-13, registers 151-11 through 151-14, and registers 151-12 through 151-15 by predetermined weights, and add the logic values multiplied by the weights, and hold the data r-add[0] through r-add[11] obtained as a result thereof, respectively.

Here, the weights to be multiplied to the logic values of the sampling data are assumed to be, for example, 1, 1, 1, and 1, or 1, 2, 2, and 1 in order. Accordingly, in the case of the weights to be multiplied being 1, 1, 1, and 1, for example, the logic values of the sampling data r-inp[4][0] through r-inp[4][3] are multiplied by the weights 1, 1, 1, and 1 by the register 152-1, respectively. Note however, the weights to be multiplied to the logic values are determined so as to exclude clearly unsuitable sampling clocks.

Also, the registers 152-1 through 152-4 supply the held data r-add[0] through r-add[3] to the registers 153-1 through 153-4, respectively.

Further, the register 152-5 supplies the held data r-add[4] to the registers 153-1 and 153-5, the register 152-6 supplies the held data r-add[5] to the registers 153-2 and 153-6, the register 152-7 supplies the held data r-add[6] to the registers 153-3 and 153-7, and the register 152-8 supplies the held data r-add[7] to the registers 153-4 and 153-8.

Further, the registers 152-9 through 152-12 supply the held data r-add[8] through r-add[11] to the registers 153-5 through 153-8, respectively.

Note that hereafter, in a case that there is no need to particularly distinguish each of the registers 152-1 through 152-12, these will be simply referred to as a register 152.

The registers 153-1 through 153-8 hold detection data that is 1-bit logic data indicating the comparison result of two sets of data supplied from the register 152, and updates the held detection data at the timing of the leading edge of the driving clock.

That is to say, the registers 153-1 through 153-8 compare the data r-add[0] through r-add[7] supplied from the registers 152-1 through 152-8, and the data r-add[4] through r-add[11] supplied from the registers 152-5 through 152-12 respectively, and in the case of the data r-add[0] through r-add[7] being greater than the data r-add[4] through r-add[11] respectively, hold detection data r-cmp[0] through r-cmp[7] each of which the logic value is 1 respectively, and in the case of the data r-add[0] through r-add[7] being not greater than the data r-add[4] through r-add[11] respectively, hold detection data r-cmp[0] through r-cmp[7] each of which the logic value is 0 respectively.

The detection data r-cmp[0] through r-cmp[7] thus obtained is taken as detection data obtained in a case wherein the received digital modulated signal is detected assuming that the sampling clocks Clock[0] through Clock[7] are synchronized with the carrier of the received digital modulated signal, respectively.

For example, the data r-add[0] supplied to the register 153-1 indicates the sum of the logic values each of which is further multiplied by a weight of the sampling data r-inp[4][0] through r-inp[4][3] obtained by sampling the received digital modulated signal four times at the interval of ⅛ cycles of the sampling clock Clock[0] from the timing of the leading edge of the sampling clock Clock[0]. That is to say, the data r-add[0] indicates the value obtained by sampling the received digital modulated signals four times at the interval of ⅛ cycles during a first half cycle period of one cycle of the carrier assuming that the sampling clock Clock[0] and the carrier are synchronized, multiplying the logic values of the obtained four sets of sampling data by weights, and obtaining the sum of the logic values further multiplied by the weights.

On the other hand, the data r-add[4] supplied to the register 153-1 indicates the sum of the logic values each of which is further multiplied by a weight of the sampling data r-inp[4][4] through r-inp[4][7] obtained by sampling the received digital modulated signal four times at the interval of ⅛ cycles of the sampling clock Clock[4] from the timing of the leading edge of the sampling clock Clock[4]. That is to say, the data r-add[4] indicates the value obtained by sampling the received digital modulated signals four times at the interval of ⅛ cycles during a latter half cycle period of one cycle of the carrier assuming that the sampling clock Clock[0] and the carrier are synchronized, multiplying the logic values of the obtained four sets of sampling data by weights, and obtaining the sum of the logic values further multiplied by the weights.

The detection data r-cmp[0] held at the register 153-1 is logic data wherein the logic value thereof is 1 in the case of the data r-add[0] being greater than the data r-add[4], otherwise the logic value is 0, and accordingly is a logic value indicating a result determined by a majority vote of logic values by comparing the sum of the logic values of the sampling data of a first half cycle of the carrier multiplied by weights, and the sum of the logic values of the sampling data of a latter half cycle of the carrier multiplied by weights to determine which is greater.

In a case wherein the received digital modulated signal is detected with a sampling clock synchronized with the carrier, when the logic value of the baseband data obtained by the detection is 1, the logic value of the sampling data sampled during a first half cycle period of the carrier is 1, and the logic value of the sampling data sampled during a later half cycle period of the carrier is 0.

Accordingly, the logic value of the detection data r-cmp[0] is the logic value of the original baseband data obtained by further down-converting the sampling data obtained by sampling the received digital modulated signal at the interval of ⅛ cycles of the carrier, assuming that the phase of the sampling clock Clock[0] is identical to the phase of the carrier of the received digital modulated signal, i.e., both are synchronized. That is to say, the detection data r-cmp[0] is detection data obtained in the case of detecting the received digital modulated signal, assuming that the sampling clock Clock[0] is synchronized with the carrier of the received digital modulated signal.

Note that hereafter, in a case that there is no need to particularly distinguish each of the registers 153-1 through 153-8, these will be simply referred to as a register 153.

Also, as shown in FIG. 7, the register 152 supplies the data held by one cycle to the register 153, and also supplies the data held by one cycle to the several registers of the registers 154-1 through 154-8 at the timing of the leading edge of the driving clock.

Also, the registers 152-1 through 152-4 supply the held data r-add[0] through r-add[3] to the registers 154-1 through 154-4, respectively.

Also, the register 152-5 supplies the held data r-add[4] to the registers 154-1 and 154-5, the register 152-6 supplies the held data r-add[5] to the registers 154-2 and 154-6, the register 152-7 supplies the held data r-add[6] to the registers 154-3 and 154-7, and the register 152-8 supplies the held data r-add[7] to the registers 154-4 and 154-8.

Further, the registers 152-9 through 152-12 supply the held data r-add[8] through r-add[11] to the registers 154-5 through 154-8, respectively.

The registers 154-1 through 154-8 hold error data that is 1-bit logic data indicating the comparison result of two sets of data supplied from the register 152, and updates the held error data at the timing of the leading edge of the driving clock.

That is to say, the registers 154-1 through 154-8 compare the data r-add[0] through r-add[7] supplied from the registers 152-1 through 152-8, and the data r-add[4] through r-add[11] supplied from the registers 152-5 through 152-12 respectively, and in the case of the data r-add[0] through r-add[7] being identical to the data r-add[4] through r-add[11] respectively, hold error data r-err[0] through r-err[7] each of which the logic value is 1 respectively, and in the case of the data r-add[0] through r-add[7] being not identical to the data r-add[4] through r-add[11] respectively, hold error data r-err[0] through r-err[7] each of which the logic value is 0 respectively.

The error data r-err[0] through r-err[7] is employed for preventing an unsuitable sampling block from being selected in a case wherein, with the initial phase determining unit 26, one of the sampling clocks Clock[0] through Clock[7] is selected as a sampling clock synchronized with the carrier of the digital modulated signal.

For example, with the register 153-1, the detection data r-cmp[0] is determined by the data r-add[0] and data r-add[4] being compared, and in the case of the data r-add[0] being equal to the data r-add[4], the logic value of the detection data r-cmp[0] is set to 0.

Note however, in the case of the data r-add[0] being equal to the data r-add[4], the sampling clock Clock[0] assumed to be synchronized with the carrier, and employed for detection is actually delayed as to the carrier by ¼ cycles or 2/4 cycles of the carrier. That is to say, the intermediate position of the period wherein the sampling data r-inp[4][0] through r-inp[4][7] is sampled is the position of ¾ cycles of the actual carrier, or the start position of one cycle, i.e., the position where the phase of the carrier is inverted.

Accordingly, the sampling clock Clock[0] employed for detection is not synchronized with the carrier, so the logic value of the error data r-err[0] is set to 1 such that such a sampling clock Clock[0] is not selected as a sampling clock synchronized with the carrier, i.e., the detection data r-cmp[0] obtained by a sampling clock not synchronized with the carrier being employed is not selected as final detection data. The logic value 1 of the error data r-err[0] indicates that the detection data r-cmp[0] is data obtained by detection employing the sampling clock Clock[0] not synchronized with the carrier.

Also, in the case of the data r-add[0] being unequal to the data r-add[4], the logic value of the error data r-err[0] is set to 0, and this logic value 0 indicates that there is a possibility that the sampling clock Clock[0] employed for detection for obtaining the detection data r-cmp[0] is synchronized with the carrier.

Thus, the error data r-err[0] is taken as error data regarding the sampling clock Clock[0], and similarly, the error data r-err[1] through r-err[7] are taken as error data regarding the sampling clock Clock[1] through Clock[7], respectively.

Note that hereafter, in a case that there is no need to particularly distinguish each of the registers 154-1 through 154-8, these will be simply referred to as a register 154.

Also, description has been made above that the sampling data held at the register 151 is supplied to the register 152, and the data held by the register 152 is supplied to the registers 153 and 154, but registers corresponding to the registers 151 and 152 shown in FIG. 7 may be provided separately.

In such a case, the sampling data held at the register 151 is supplied to the register 152, and the data held at the register 152 is supplied to the register 153. Also, the same data as the sampling data supplied to the register 151 is supplied to the register corresponding to the register 151, and the register corresponding to the register 151 holds the supplied sampling data, and supplies this to the register corresponding to the register 152. Subsequently, the register corresponding to the register 152 supplies the held data to the register 154.

Further, in this case, an arrangement may be made wherein the weight to be multiplied to sampling data at the register 152 differs from the weight to be multiplied to sampling data at the register corresponding to the register 152. In other words, an arrangement may be made wherein the weight to be multiplied to sampling data to generate detection data differs from the weight to be multiplied to sampling data to generate error data.

Figure 8:
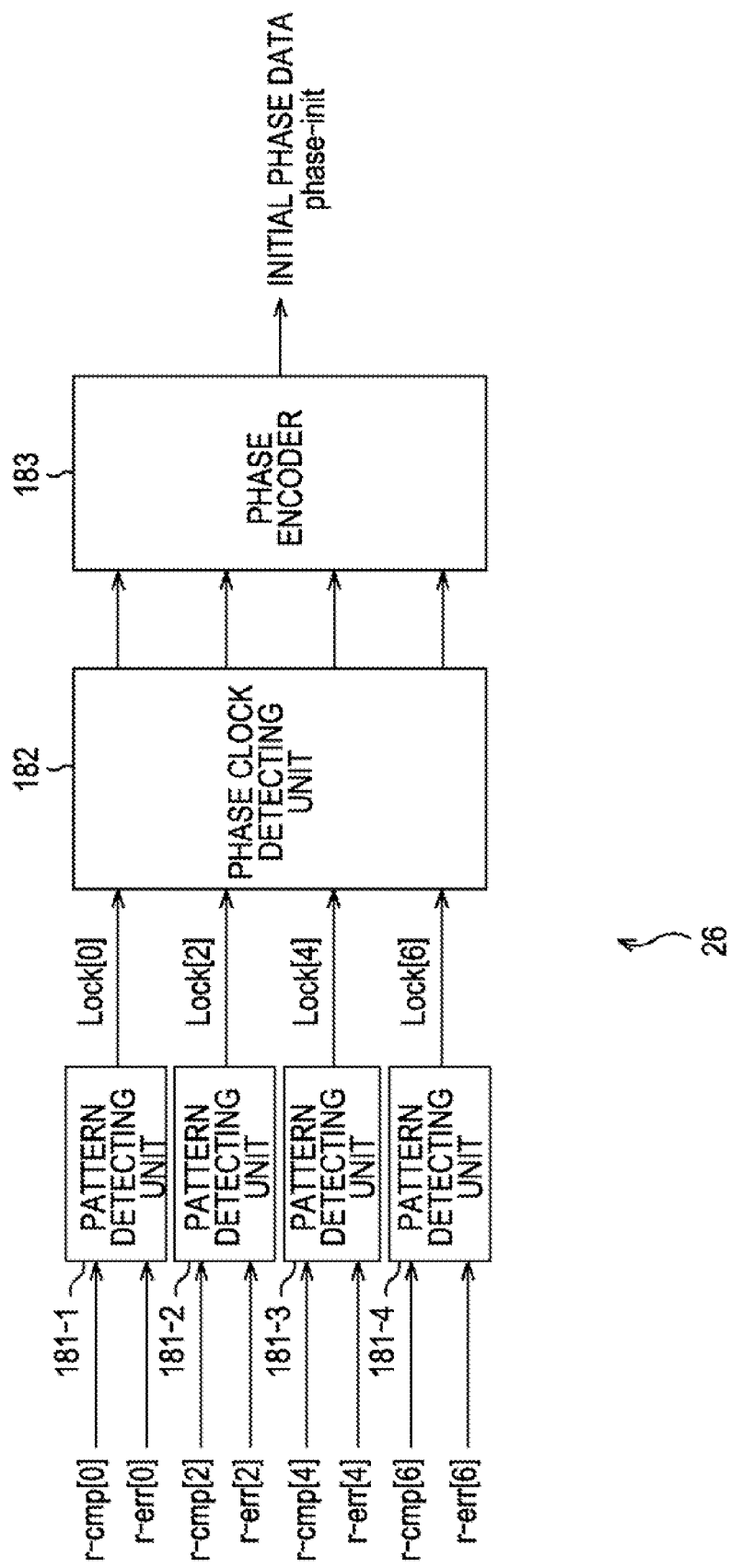
FIG. 8 is a diagram illustrating a configuration example of an initial phase determining unit.

FIG. 8 is a diagram illustrating a configuration example of the initial phase determining unit 26 in FIG. 1. The initial phase determining unit 26 is configured of pattern detecting units 181-1 through 181-4, phase-lock detecting unit 182, and phase encoder 183. Also, each unit of the initial phase determining unit 26 operates in sync with the same driving clock as the driving clock supplied to the sampling clock generating unit 22. That is to say, the initial phase determining unit 26 operates at the timing of the leading edge of the driving clock.

The detection data r-cmp[0] obtained by detection employing the sampling clock Clock[0], and the error data r-err[0] regarding the detection data r-cmp[0] thereof are supplied to the pattern detecting unit 181-1 from the detection data generating unit 25. The pattern detecting unit 181-1 detects a predetermined fixed pattern from the received digital modulated signal based on the supplied detection data r-cmp[G] and error data r-err[0], and supplies a detection flag Lock[0] indicating the detection result thereof to the phase-lock detecting unit 182.

With the digital modulated signal, the head portion thereof, e.g., a portion called a preamble includes a 16-bit fixed pattern "0000111100001111", and an arrangement is made wherein the fixed pattern thereof appears repeatedly. In the case of detecting the fixed pattern, the pattern detecting unit 181-1 set 1 to the detection flag Lock[0], and supplies this detection flag to the phase-lock detecting unit 182. In the case of detecting no fixed pattern, the pattern detecting unit 181-1 set 0 to the detection flag Lock[0], and supplies this detection flag to the phase-lock detecting unit 182. Note that each logic value 1 or 0 of the fixed pattern "0000111100001111" is arrayed in a newly detected order temporally from the head side thereof.

The pattern detecting units 181-2 through 181-4 detect a fixed pattern from the received digital modulated signal based on the detection data r-cmp[2] and error data r-err[2], detection data r-cmp[4] and error data r-err[4], and detection data r-cmp[6] and error data r-err[6] supplied from the detection data generating unit 25, and supply the detection flags Lock [2], Lock[4], and Lock[6] indicating the detection results thereof to the phase-lock detecting unit 182, respectively.

Note that hereafter, in a case that there is no need to particularly distinguish each of the pattern detecting units 181-1 through 181-4, these will be simply referred to as a pattern detecting unit 181.

Figure 9:
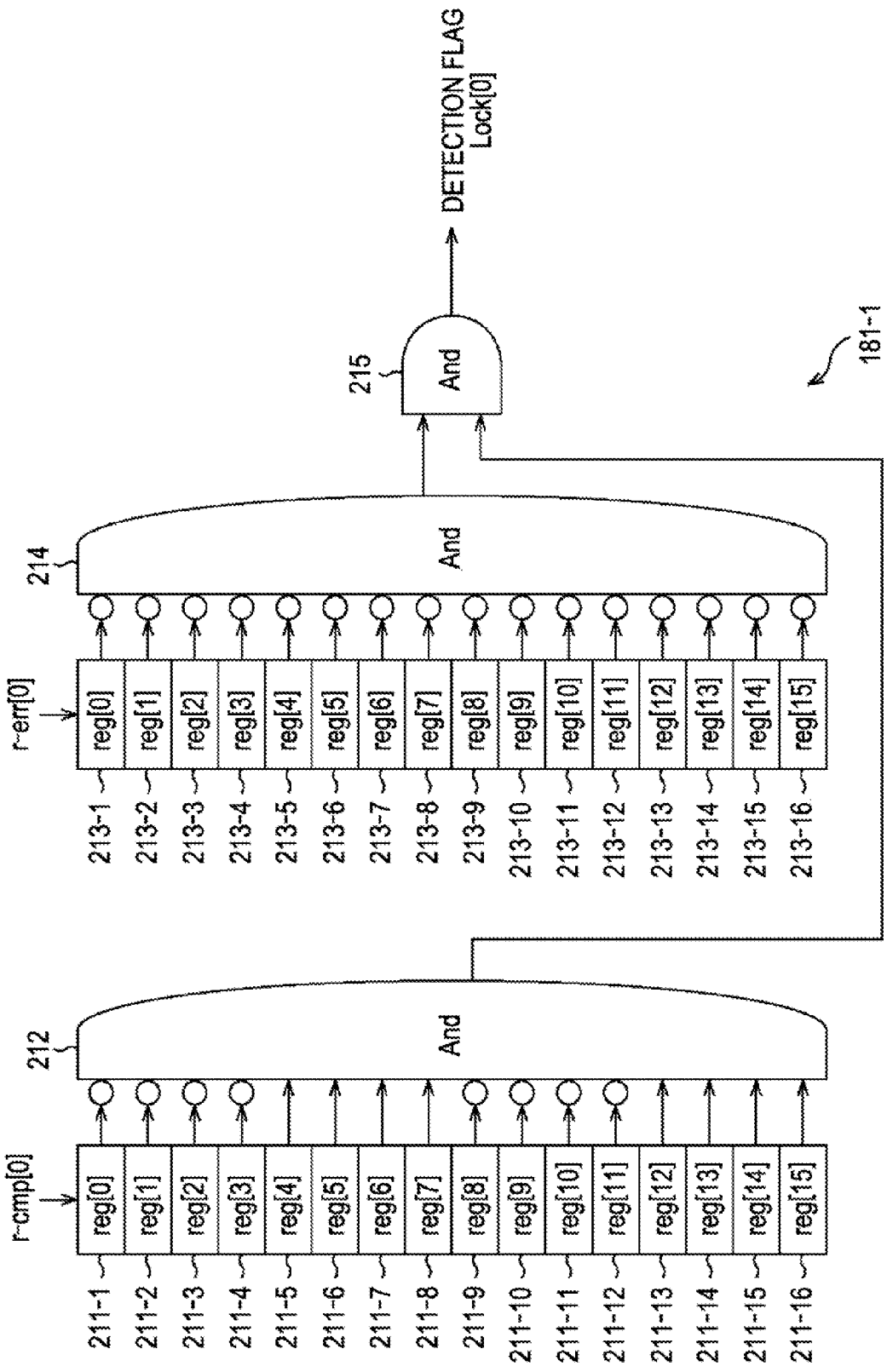
FIG. 9 is a diagram illustrating a configuration example of a pattern detecting unit.

Now, description will be made regarding the more detailed configuration of the pattern detecting unit 131 with reference to FIG. 9. FIG. 9 is a diagram illustrating a configuration example of the pattern detecting unit 181-1.

The pattern defecting unit 181-1 is configured of registers 211-1 through 211-16, logical AND unit 212, registers 213-1 through 213-16, logical AND unit 214, and logical AND unit 215.

The register 211-1 obtains the detection data r-cmp[0] from the register 153-1 of the detection data generating unit 25 at the timing of the leading edge of the driving clock, holds this by one cycle worth of the driving clock, and then supplies the held detection data r-cmp[0] to the register 211-2 and logical AND unit 212.

The registers 211-2 through 211-15 obtain the detection data r-cmp[0] held at the registers 211-1 through 211-14 at the timing of the leading edge of the driving clock, hold this by one cycle of the driving clock, and then supply the held detection data r-cmp[0] to the registers 211-3 through 211-16 and logical AND unit 212, respectively.

The register 211-16 obtains the detection data r-cmp[0] held at the register 211-15 at the timing of the leading edge of the driving clock, holds this by one cycle of the driving clock, and then supplies the held detection data r-cmp[0] to the logical AND unit 212.

Accordingly, data series obtained by detection data held in the registers 211-1 through 211-16 being arrayed is 16-bit data series obtained by the logic values of the detection data obtained by detecting the received digital modulated signal using the sampling clock Clock[0] being consecutively arrayed in chronological order. Note that hereafter, in a case that there is no need to particularly distinguish each of the registers 211-1 through 211-16, these will be simply referred to as a register 211.

Here, each piece of the detection data held at the registers 211-1 through 211-4, and registers 211-9 through 211-12 is inverted (logically inverted) and supplied to the logical AND unit 212.

The logical AND unit 212 computes logical AND of the logic values of the detection data supplied from the registers 211-1 through 211-16, and supplies the computation result thereof to the logical AND unit 215. Accordingly, in a case wherein the series of the 16 consecutive logic values of the detection data are identical to the fixed pattern "0000111100001111", i.e., in a case wherein the fixed pattern is detected from the received digital modulated signal by detection using the sampling clock Clock[0], a logic value 1 is output from the logical AND unit 212, and in a case wherein the series of the logic values of the detection data are not identical to the fixed pattern, a logic value 0 is output from the logical AND unit 212.

The register 213-1 obtains the error data r-err[0] from the register 154-1 of the detection data generating unit 25 at the timing of the leading edge of the driving clock, holds this by one cycle of the driving clock, and then supplies the held error data r-err[0] to the register 213-2 and logical AND unit 214.

The registers 213-2 through 213-15 obtain the error data r-err[0] held at the registers 213-1 through 213-14 at the timing of the leading edge of the driving clock, hold this by one cycle of the driving clock, and then supply the held error data r-err[0] to the registers 213-3 through 213-16 and logical AND unit 214, respectively.

The register 213-16 obtains the error data r-err[0] held at the register 213-15 at the timing of the leading edge of the driving clock, holds this by one cycle of the driving clock, and then supplies the held error data r-err[0] to the logical AND unit 214.

Note that hereafter, in a case that there is no need to particularly distinguish each of the registers 213-1 through 213-16, these will be simply referred to as a register 213.

Here, each piece of the error data held at the registers 213-1 through 213-16 is inverted (logically inverted) and supplied to the logical AND unit 214.

The logical AND unit 214 computes logical AND of the logic values of the error data supplied from the registers 213-1 through 213-16, and supplies the computation result thereof to the logical AND unit 215. Here, with the error data r-err[0], the logic value thereof is set to 1 in a case wherein the sampling clock Clock[0] is clearly not synchronized with the carrier of the received digital modulated signal. Accordingly, in a case wherein all of the logic values of the error data supplied to the logical AND unit 214 are 0, a logic value 1 is output from the logical AND unit 224, and in a case wherein the error data of which the logic values include at least one logic value of 1 is supplied to the logical AND unit 214, a logic value 0 is output from the logical AND unit 214.

The logical AND unit 215 computes logical AND of the logic values supplied from the logical AND unit 212, and the logic values supplied form the logical AND unit 214, and supplies the result thereof to the phase-lock detecting unit 182 as the detection flag Lock[0]. That is to say, in a case wherein the sampling clock Clock[0] is determined not to be unsuitable, and the fixed pattern is detected from the received digital modulated signal by detection employing the sampling clock Clock[0], the detection flag Lock[0] to which 1 is set is supplied to the phase-lock detecting unit 182 from the logical AND unit 215, and in a case wherein the sampling clock Clock[0] is determined to be unsuitable, or the fixed pattern is not detected, the detection flag Lock[0] to which 0 is set is supplied to the phase-lock detecting unit 182 from the logical AND unit 215.

This detection flag Lock[0] is employed as a flag indicating the validity of the detection result of the fixed pattern from the received digital modulated signal. That is to say, we can find that in a case wherein the detection flag Lock[0] is set to 1, the phase difference between the sampling clock Clock[0] and the carrier is comparable to difference wherein when performing detection of the digital modulated signal using the sampling clock Clock[0], the correct logic value of the baseband data can be obtained.

Note that the pattern detecting units 181-2 through 181-4 are assumed to have the same configuration as the pattern detecting unit 181-1 shown in FIG. 9, so the description thereof will be omitted.

Now, description will return to the description of FIG. 8. Upon the detection flag being supplied from the pattern detecting unit 181 to the phase-lock detecting unit 182, the phase-lock detecting unit 182 supplies a lock flag (Lock-flag) to the phase encoder 183 based on the detection flag supplied from the pattern detecting unit 181.

More specifically, the phase-lock detecting unit 182 includes a counter for each of the detection flags, which is counted at the cycle of the driving clock. Upon a detection flag to which 1 is set once being supplied to the phase-lock detecting unit 182, the counter of the detection flag thereof holds the value 1 of the detection flag thereof by three cycles of the driving clock. Subsequently, in a case wherein the values held in all of the counters for the respective detection flags have not changed during the two cycles of the driving clock, i.e., in a case wherein each counter continuously holds the same value during the two cycles, the phase-lock detecting unit 182 outputs the values arrayed in order of the values of the detection flags held in the counters as a lock flag, and thereafter continuously outputs a lock flag having the same value.

Accordingly, for example, in a case wherein the values of the detection flags Lock[0], Lock[2], Lock[4], and Lock[6] held by the counters for the respective detection flags of the phase-lock detecting unit 182 are continuously kept in 1, 1, 0, and 0 during the two cycles of the driving clock, the phase-lock detecting unit 182 outputs a lock flag of which the value is "0011" arrayed in order of the detection flags Lock[6] through Lock[0]. Subsequently, thereafter, the phase-lock detecting unit 182 continuously outputs a lock flag of which the value is continuously "0011" regardless of the values of the counters.

Now, the detection flags are flags which are set to 1 by one cycle of the driving clock after the fixed pattern is detected as a result of detecting the digital modulated signal using the sampling clock, but in actuality, depending on the timing for sampling using the sampling clock, the timing wherein the fixed pattern is detected at the pattern detecting unit 181 is shifted by one cycle as to the timing wherein the fixed pattern is detected at the other pattern detecting unit 181 in some cases. Accordingly, in order to eliminate such detection shift of the fixed pattern, upon the detection flag to which 1 is set being supplied, the counter for each detection flag continuously holds the value thereof during three cycles.

The phase encoder 183 determines the initial phase of the carrier based on the lock flag supplied from the phase-lock detecting unit 182. That is to say, the phase encoder 183 supplies initial phase data (phase-init) indicating the sampling clock having the phase closest to the carrier of the received digital modulated signal, which is determined with the value of the supplied lock flag, to the detection data determining unit 27 and phase comparison data determining unit 29.

For example, the phase encoder 183 holds a table shown in FIG. 10 beforehand, and outputs the initial phase data of which the value is determined with the supplied lock flag. FIG. 10 shows a lock flag (Lock-flag) to be input to the phase encoder 183, and the value of the initial phase data (phase-init) to be output according to the lock flag thereof.

That is to say, in the case of the lock flag having a value of "0001" being input, the initial phase data having a value of 0 is output, in the case of the lock flag having a value of "0010" being input, the initial phase data having a value of 2 is output, in the case of the lock flag having a value of "0011" being input, the initial phase data having a value of 1 is output, and in the case of the lock flag having a value of "0100" being input, the initial phase data having a value of 4 is output.

Also, in the case of the lock flag having a value of "0110" being input, the initial phase data having a value of 3 is output, in the case of the lock flag having a value of "0111" being input, the initial phase data having a value of 2 is output, in the case of the lock flag having a value of "1000" being input, the initial phase data having a value of 6 is output, and in the case of the lock flag having a value of "1001" being input, the initial phase data having a value of 7 is output.

Further, in the case of the lock flag having a value of "1011" being input, the initial phase data having a value of 0 is output, in the case of the lock flag having a value of "1100" being input, the initial phase data having a value of 5 is output, in the case of the lock flag having a value of "1101" being input, the initial phase data having a value of 6 is output, and in the case of the lock flag having a value of "1110" being input, the initial phase data having a value of 4 is output.

Here, the values 0 through 7 of the initial phase data indicate that the sampling clock having the phase closest to the phase of the carrier immediately after starting reception of the digital modulated signal is the sampling clocks Clock[0] through Clock[7], respectively.

Also, for example, the four logic values of the value "0001" of the lock flag indicate the detection flags Lock[6], Lock{4}, Lock[2], and Lock[0] in order from the head, respectively. Therefore, we can find according to the lock flag having a value of "0001" that the fixed pattern has been detected from the digital modulated signal with detection employing the sampling clock Clock[0], and the fixed pattern has not been detected with detection employing other sampling clocks.

Accordingly, in the case of the lock flag having a value of "0001" being supplied, the phase encoder 183 determines that the sampling clock having the phase closest to the phase of the carrier of the received modulated signal is the sampling clock Clock[0], and outputs the initial phase data having a value of 0.

Also, for example, the lock flag having a value of "0011" indicates that the fixed patterns have been detected from the received digital modulated signal according to the detection employing the sampling clock Clock[0] and detection employing the sampling clock Clock[2]. Therefore, in the case of the lock flag having a value of "0011" being supplied, the phase encoder 183 determines that the sampling clock Clock[1] having the intermediate phase between the sampling clock Clock[0] and sampling clock Clock[2] is the sampling clock having the phase closest to the phase of the carrier of the received digital modulated signal, and outputs the initial phase data having a value of 1.

Further, for example, the lock flag having a value of "0111" indicates that the fixed patterns have been detected from the received digital modulated signal according to the detection employing the sampling clock Clock[0], detection employing the sampling clock Clock[2], and detection employing the sampling clock Clock[4]. Therefore, in the case of the lock flag having a value of "0111" being supplied, the phase encoder 183 determines that the sampling clock Clock[2] having the intermediate phase between the sampling clock Clock[0], sampling clock Clock[2], and sampling clock Clock[4] is the sampling clock having the phase closest to the phase of the carrier of the received digital modulated signal, and outputs the initial phase data having a value of 2.

Note that in the case of the lock flag having a value of "0000", "0101", or "1111" being supplied to the phase encoder 183, the phase encoder 183 cannot determine the initial phase using the held table. Accordingly, in a case wherein the value of the lock flag is a value that cannot be processed at the phase encoder 183, i.e., a value not included in the held table, and impossible as a combination, the lock flag is prevented from being output from the phase-lock detecting unit 182.

Also, with the initial phase determining unit 26, an arrangement has been made wherein the detection data obtained with detection using each of the sampling clocks Clock[0], Clock[2], Clock[4], and Clock[6] is employed to determine the initial phase of the carrier, but detection data obtained with detection using each of the other sampling clocks Clock[1], Clock[3], Clock[5], and Clock[7] may be employed as well.

Figure 11:
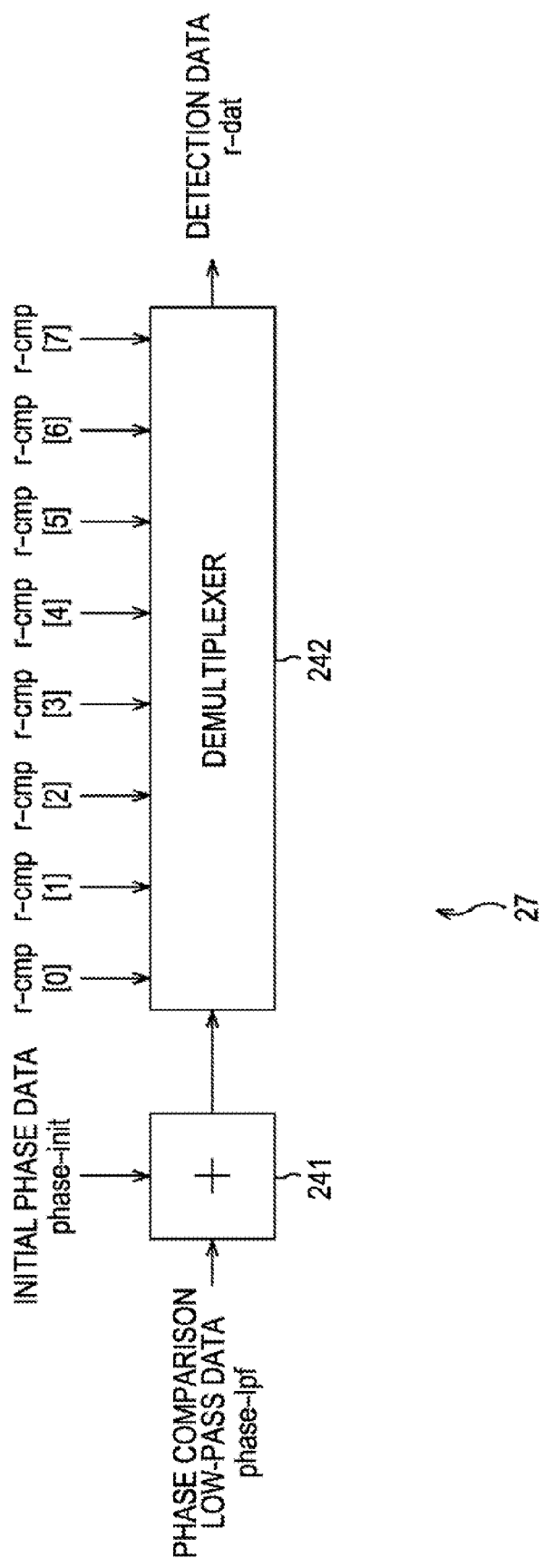
FIG. 11 is a diagram illustrating a configuration example of a detection data determining unit.

FIG. 11 is a block diagram illustrating a configuration example of the detection data determining unit 27 in FIG. 1. The detection data determining unit 27 is configured of an adder 241, and demultiplexer 242.

The initial phase data is supplied from the initial phase determining unit 26 to the adder 241, and the phase comparison low-pass data is supplied from the sampling clock determining unit 30 to the adder 241. The adder 241 adds the supplied initial phase data and phase comparison low-pass data, and supplies the value obtained as a result thereof to the demultiplexer 242.

Note that in more detail, the initial phase data and phase comparison low-pass data are data having a different number of bits, so addition is performed by adding a predetermined number of bit data, e.g., 5-bit data "00000" to after the initial phase data.

The demultiplexer 242 selects any one of the detection data r-cmp[0] through r-cmp[7] supplied from the detection data generating unit 25 based on the value supplied from the adder 241, and outputs the selected detection data as final detection data r-dat. That is to say, with the demultiplexer 242, determination is made beforehand which detection data is selected regarding each value supplied from the adder 241. Subsequently, the detection data selected according to the value supplied from the adder 241 is output as detection data obtained with detection using the sampling clock having the phase closest to the phase of the carrier of the received digital modulated signal.

Here, the value of the phase comparison low-pass data is set to 0 immediately after reception of the digital modulated signal is started, and subsequently the value thereof is changed as time passes. Accordingly, for example, the value of the phase comparison low-pass data is 0 immediately after reception of the digital modulated signal is started, so the value of the initial phase data is output from the adder 241 to the demultiplexer 242 with no change. Subsequently, with the demultiplexer 242, the detection data obtained with detection using the sampling clock indicated with the initial phase data is selected as the final detection data.

Figure 12:
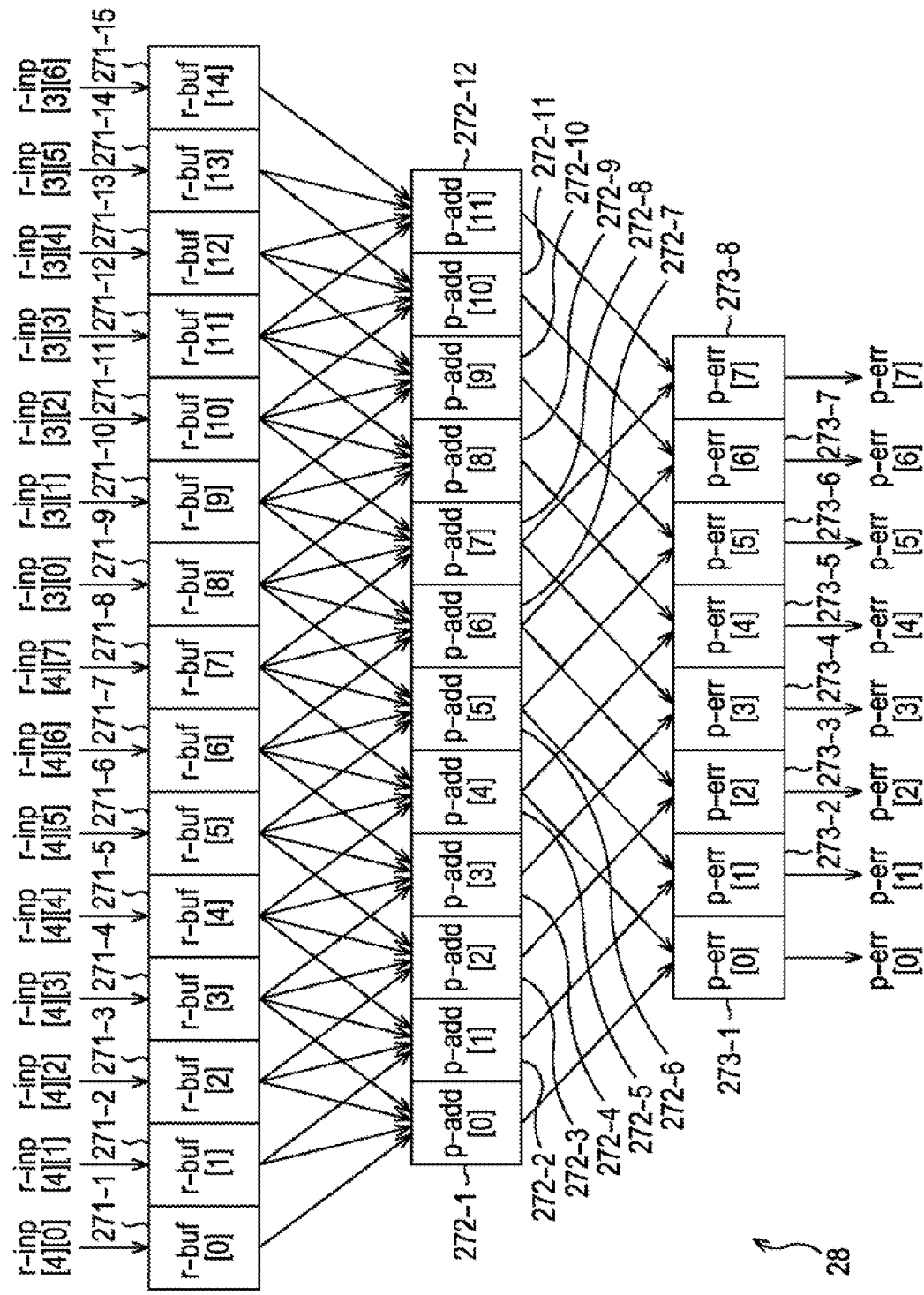
FIG. 12 is a diagram illustrating a configuration example of a phase comparison data generating unit.

FIG. 12 is a diagram illustrating a configuration example of the phase comparison data generating unit 28. The phase comparison data generating unit 28 is configured of registers 271-1 through 271-15, registers 272-1 through 272-12, and registers 273-1 through 273-8.

The registers making up the phase comparison data generating unit 28 operate in sync with the same driving clock as the driving clock supplied to the sampling clock generating unit 22, obtains data from the preceding stage at the timing of the leading edge of the driving clock, and processes the data as necessary. Subsequently, the registers hold the obtained data by one cycle of the driving clock, and then output the held data temporally at the next timing of the leading edge of the driving clock.

The phase comparison data generating unit 28 supplies the sampling data r-inp[4][0] through r-inp[4][7] supplied from the sampling data generating unit 23 last time to the registers 271-1 through 271-8 at the timing of the leading edge of the driving clock, and supplies the sampling data r-inp[3][0] through r-inp[3][6] supplied from the sampling data generating unit 23 this time to the registers 271-9 through 271-15, respectively.

The registers 271-1 through 271-15 hold the sampling data r-inp[4][0] through r-inp[3][6] supplied at the timing of the leading edge of the driving clock by one cycle of the driving clock.

The registers 271-1 through 271-15 supply the sampling data held by one cycle to the register of the subsequent stage at the next timing of the leading edge of the driving clock.

That is to say, the register 271-1 supplies the held sampling data r-inp[4][0] to the register 272-1, the register 271-2 supplies the held sampling data r-inp[4][1] to the registers 272-1 and 272-2, and the register 271-3 supplies the held sampling data r-inp[4][2] to the registers 272-1 through 272-3.

Also, the registers 271-4 through 271-12 supply the held sampling data r-inp[4][3] through r-inp[3][3] to the registers 272-1 through 272-4, registers 272-2 through 272-5, registers 272-3 through 272-6, registers 272-4 through 272-7, registers 272-5 through 272-8, registers 272-6 through 272-9, registers 272-7 through 272-10, registers 272-8 through 272-11, and registers 272-9 through 272-12, respectively.

Further, the register 271-13 supplies the held sampling data r-inp[3][4] to the registers 272-10 through 272-12, the register 271-14 supplies the held sampling data r-inp[3][5] to the registers 272-11 and 272-12, and the register 271-15 supplies the held sampling data r-inp[3][6] to the register 272-12.

Note that hereafter, in a case that there is no need to particularly distinguish each of the registers 271-1 through 271-15, these will be simply referred to as a register 271.

The registers 272-1 through 272-12 multiply the logic values of the sampling data supplied from the register 271 by a predetermined weight, add the logic values multiplied by the weight, hold the obtained 3-bit data p-add[0] through p-add[11] that are equal to or greater than −2 and also equal to or smaller than 2 by one cycle of the driving clock, respectively. Subsequently, the registers 272-1 through 272-12 supply the data p-add[0] through p-add[11] held by one cycle to the registers of the subsequent stages at the timing of the leading edge of the driving clock, respectively.

That is to say, the register 272-$i$ (wherein $1 \leq i \leq 12$) multiplies each piece of the sampling data supplied from the registers 271-$i$ through 271-($i$+3) by each of 1, 1, −1, and −1 as a weight, and adds the sampling data, multiplied by weights, and holds the obtained data p-add[$i$−1].

Also, the registers 272-1 through 272-4 supply the held data p-add[0] through p-add[3] to the registers 273-1 through 273-4, respectively.

The registers 272-5 through 272-8 supply the held data p-add[4] through p-add[7] to the registers 273-1 through 273-4, and registers 273-5 through 273-8, respectively.

The registers 272-9 through 272-12 supply the held data p-add[8] through p-add[11] to the registers 273-5 through 273-8, respectively.

Note that hereafter, in a case that there is no need to particularly distinguish each of the registers 272-1 through 272-12, these will be simply referred to as a register 272.

The registers 273-1 through 273-8 multiply each of the supplied two sets of data by a predetermined weight, add the data multiplied by the weight, holds the obtained 4-bit phase comparison data that is between −4 and 4, and updates the held phase comparison data at the timing of the leading edge of the driving clock.

That is to say, the register 273-$i$ (wherein $1 \leq i \leq 8$) multiplies each piece of the data p-add[$i$−1] supplied from the register 272-$i$, and the data p-add[$i$+3] supplied from the register 272-($i$+4) by each of 1, and −1 as a weight, adds the data multiplied by weights, and holds the obtained phase comparison p-err[$i$−1]. Here, the two sets of data supplied from the register 272 are multiplied by each of 1 and −1 as weights, so the phase comparison data p-err[i−1] is taken as the difference between the data p-add[i−1] and data p-add[i+3].

The phase comparison data p-err[i−1] (wherein $1 \leq i \leq 8$) thus obtained is equal to the value obtained by multiplying each of the logic values of the sampling data obtained by sampling the received digital modulated signal at the interval of ⅛ cycles of the sampling clock Clock[i−1] eight times from the timing of the leading edge of the sampling clock Clock[i−1] by 1, 1, −1, −1, −1, −1, 1, and 1 as weights, and adding the data multiplied by the weights, i.e., the sum of the sampling data multiplied by the weights. The phase comparison data p-err[i−1] becomes a value between −4 and 4, and this value indicates how far the phase of the sampling clock Clock[i−1] is shifted (delayed) as to the phase of the carrier of the digital modulated signal.

Note that hereafter, in a case that there is no need to particularly distinguish each of the registers 273-1 through 273-8, these will be simply referred to as a register 273. Also, with the registers 272 and 273, the weights multiplied to the data are not restricted to 1 and −1, so arbitrary values may be employed.

Figure 13:
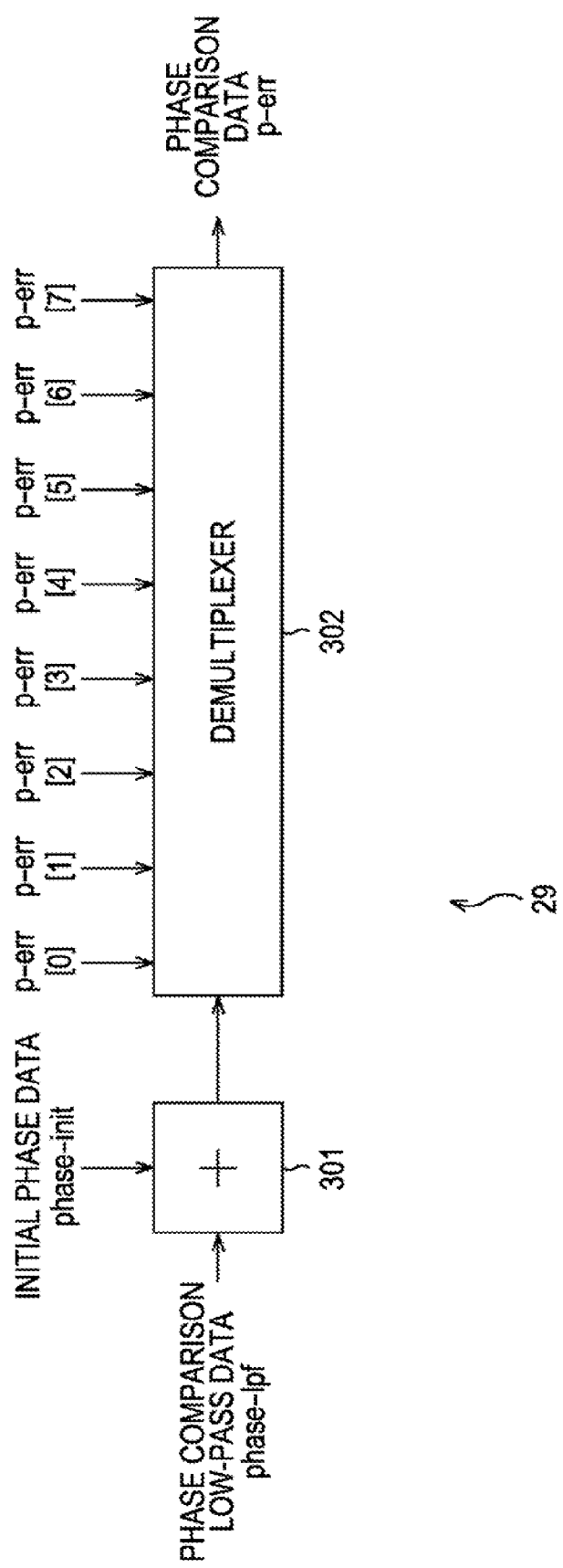
FIG. 13 is a diagram illustrating a configuration example of a phase comparison data determining unit.

FIG. 13 is a block diagram illustrating a configuration example of the phase comparison data determining unit 29 in FIG. 1. The phase comparison data determining unit 29 is configured of an adder 301, and demultiplexer 302.

The initial phase data is supplied from the initial phase determining unit 26 to the adder 301, and the phase comparison low-pass data is supplied from the sampling clock determining unit 30 to the adder 301. The adder 301 adds the supplied initial phase data and phase comparison low-pass data, and supplies the value obtained as a result thereof to the demultiplexer 302.

Note that in more detail, the initial phase data and phase comparison low-pass data are data having a different number of bits, so addition is performed by adding a predetermined number of bit data to after the initial phase data.

The demultiplexer 302 selects any one of the phase comparison data p-err[0] through p-err[7] supplied from the phase comparison data generating unit 28 based on the value supplied from the adder 301, and outputs the selected phase comparison data as final phase comparison data p-err. That is to say, with the demultiplexer 302, determination is made beforehand which phase comparison data is selected regarding each value supplied from the adder 301. Subsequently, the phase comparison data selected according to the value supplied from the adder 301 is output as the phase comparison data of the sampling clock having the phase closest to the phase of the carrier of the received digital modulated signal.

Figure 14:
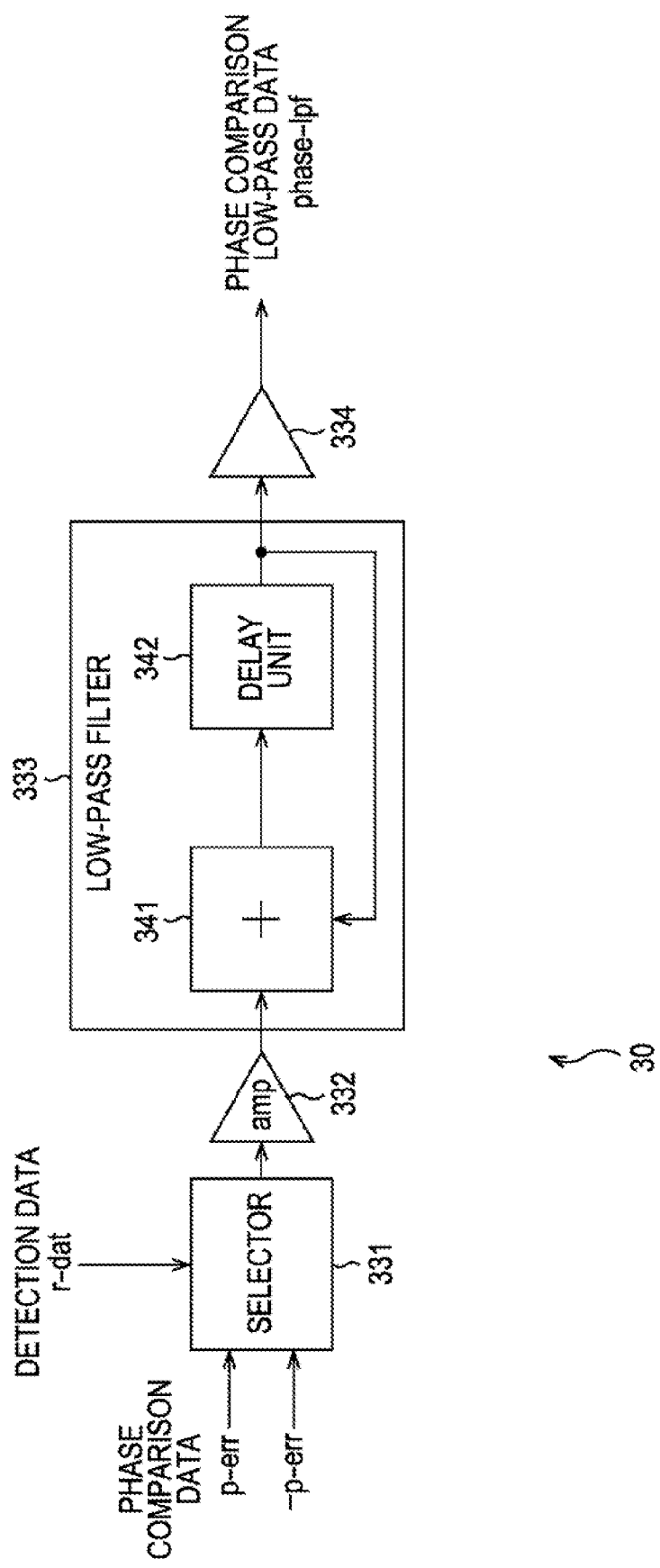
FIG. 14 is a diagram illustrating a configuration example of a sampling clock determining unit.

FIG. 14 is a diagram illustrating a configuration example of the sampling clock determining unit 30 in FIG. 1. The sampling clock determining unit 30 is configured of a selector 331, amplifier 332, low-pass filter 333, and amplifier 334.

The final detection data r-dat is supplied from the detection data determining unit 27 to the selector 331. Also, the sampling clock determining unit 30 supplies the final phase comparison data p-err supplied from the phase comparison data determining unit 29 to the selector 331 with no change, and supplies the phase comparison data p-err multiplied by −1 to the selector 331.

The selector 331 selects any one of the phase comparison data p-err supplied with no change, and the phase comparison data p-err multiplied by −1, based on the local value of the detection data r-dat supplied from the detection data determining unit 27, and supplies the selected phase comparison data to the amplifier 332.

Here, in a case wherein the received digital modulated signal is a signal of which the phase is inverted according to data, particularly such as a BPSK signal, the phase thereof is inverted according to the baseband data, i.e., the logic value of the original data, so becomes an incomplete cycle wave, and accordingly, the phase comparison data p-err is strictly data wherein the polarity thereof is not taken into consideration. That is to say, depending on whether a predetermined section of the digital modulated signal is a section where the phase is inverted, the polarity of the phase comparison data p-err corresponding to the section thereof is changed. Accordingly, the selector 331 selects one of the phase comparison data with no change, and the phase comparison data multiplied by −1 according to the logic value of the detection data, whereby phase comparison data can be obtained, which indicates phase shifting of the sampling clock as to the carrier wherein the phase is not changed.

For example, the selector 331 selects the phase comparison data with no change in a case wherein the logic value of the detection data r-dat is 1, and selects the phase comparison data multiplied by −1 in a case wherein the logic value of the detection data r-dat is 0.

The amplifier 332 amplifies or attenuates the phase comparison data supplied from the selector 331, and supplies this to the low-pass filter 333. The low-pass filter 333 removes the low-frequency components of the phase comparison data supplied from the amplifier 332, and supplies the phase comparison data from which the low-frequency components have been removed to the amplifier 334.

The low-pass filter 333 is configured of an adder 341, and delay unit 342. The adder 341 adds the phase comparison data supplied from the amplifier 332, and the phase comparison low-pass data supplied from the delay unit 342 and output last time, and supplies the data obtained as a result thereof to the delay unit 342 as new phase comparison low-pass data.

The delay unit 342 delays the phase comparison low-pass data supplied from the adder 341 by one cycle of the driving clock, and then supplies this to the amplifier 334 and adder 341. Thus, phase comparison low-pass data is output from the low-pass filter 333, which indicates how far the phase of the carrier of the received digital modulated signal is relatively shifted immediately after starting reception of the digital modulated signal.

The amplifier 334 amplifies or attenuates the phase comparison low-pass data supplied from the low-pass filter 333 as necessary, and supplies this to the detection data determining unit 27 and phase comparison data determining unit 29.

Next, description will be made with reference to the flowchart in FIG. 15 regarding detection processing wherein the detection device 11 detects the input digital modulated signal, and outputs detection data that is the original baseband data.

In step S11, the level conversion unit 21 subjects the supplied digital modulated signal to level conversion, and supplies the level-converted digital modulated signal to the sampling data generating unit 23. That is to say, the inverter 52 converts the level of the digital modulated signal input via the capacitor 61 such that the level of the center thereof becomes the reference level of logical determination, and outputs the level-converted digital modulated signal.

In step S12, the sampling clock generating unit 22 generates multiple sampling clocks based on the supplied driving clock, and supplies the generated sampling clocks to the sampling data generating unit 23.

That is to say, the sampling clock generating unit 22 outputs the supplied driving clock with no change as the sampling clock Clock[0], and the inverter 94 outputs the sampling clock Clock[4] obtained by inverting the supplied driving clock.

Also, the delay units 91 through 93 delay the supplied driving clock, outputs the delayed driving clock as the sampling clocks Clock[1] through Clock[3], and supplies this to the inverters 95 through 97. The inverters 95 through 97 output the sampling clocks Clock[5] through Clock[7] obtained by inverting the driving clock supplied from the delay units 91 through 93.

Thus, the eight sampling clocks Clock[0] through Clock[7] are supplied to the sampling data generating unit 23.

In step S13, the sampling data generating unit 23 performs sampling data generation processing. Note that the details of the sampling data generation processing will be described later, but with this sampling data generation processing, the sampling data generating unit 23 employs the sampling clock supplied from the sampling clock generating unit 22 to sample the digital modulated signal supplied from the level conversion unit 21, and supplies the sampling data r-inp[3][0] through r-inp[3][7] obtained as a result thereof for each sampling clock to the detection data generating unit 25 and phase comparison data generating unit 28 via the bus 24.

In step S14, the detection data generating unit 25 performs detection data generation processing, and generates detection data and error data for each sampling clock from the sampling data supplied from the sampling data generating unit 23. The detection data generating unit 25 supplies the generated detection data to the detection data determining unit 27 and initial phase determining unit 26, and supplies the error data to the initial phase determining unit 26. Note that the details of the detection data generation processing will be described later.

In step S15, the initial phase determining unit 26 determines whether or not the initial phase of the carrier of the digital modulated signal has already been obtained. For example, in a case wherein the initial phase determination processing in step S16 has already been performed, and the initial phase data has been output, the initial phase is determined to have been obtained.

In step S15, in a case wherein the initial phase has been obtained, the initial phase determining unit 26 continuously supplies the initial phase data to the detection data determining unit 27 and phase comparison data determining unit 29, and the processing proceeds to step S17.

On the other hand, in a case wherein determination is made in step S15 that the initial phase has not been obtained, the processing proceeds to step S16, where initial phase determination processing is performed. While the details of the initial phase determination processing will be described later, with this initial phase determination processing, the initial phase determining unit 26 determines the initial phase of the carrier from the detection data and error data supplied from the detection data generating unit 25, and supplies the initial phase data indicating the sampling clock synchronized with the carrier to the detection data determining unit 27 and phase comparison data determining unit 29.

Upon the initial phase determination processing being performed in step S16, or upon determination being made in step S15 that the initial phase has been obtained, in step S17 the detection data determining unit 27 selects final detection data from the detection data for each sampling clock supplied from the detection data generating unit 25.

For example, the adder 241 of the detection data determining unit 27 adds the initial phase data supplied from the initial phase determining unit 26, and the phase comparison low-pass data supplied from the sampling clock determining unit 30, and supplies the value obtained as a result thereof to the demultiplexer 242. The demultiplexer 242 selects any one of the detection data r-cmp[0] through r-cmp[7] supplied from the detection data generating unit 25, based on the value supplied from the adder 241. Subsequently, the demultiplexer 242 supplies the selected detection data to the sampling clock determining unit 30 as the detection data r-dat obtained by detection using the sampling clock having the phase closest to the phase of the carrier of the digital modulated signal, and outputs this to the subsequent stage of the detection device 11.

In step S18, the phase comparison data generating unit 28 performs phase comparison data generation processing. Note that the details of the phase comparison data generation processing will be described later, but with the phase comparison data generation processing, the phase comparison data generating unit 28 generates phase comparison data p-err[0] through p-err[7] for each sampling clock based on the sampling data for each sampling clock supplied from the sampling data generating unit 23, and supplies this to the phase comparison data determining unit 29.

In step S19, the phase comparison data generating unit 29 selects final phase comparison data from the phase comparison data p-err[0] through p-err[7] supplied from the phase comparison data generating unit 28 based on the initial phase data supplied from the initial phase determining unit 26, and the phase comparison low-pass data supplied from the sampling clock determining unit 30.

For example, the adder 301 of the phase comparison data determining unit 29 adds the initial phase data and the phase comparison low-pass data, and supplies the value obtained as a result thereof to the demultiplexer 302. The demultiplexer 302 selects any one of the phase comparison data p-err[0] through p-err[7] based on the value supplied from the adder 301. Subsequently, the demultiplexer 302 supplies the selected phase comparison data to the sampling clock determining unit 30 as the phase comparison data p-err of the sampling clock having the phase closest to the phase of the carrier of the received digital modulated signal.

In step S20, the sampling clock determining unit 30 detects the sampling clock having the phase closest to the phase of the carrier of the received digital modulated signal, based on the detection data r-dat supplied from the detection data determining unit 27, and the phase comparison data supplied from the phase comparison data determining unit 29. In other words, the sampling clock determining unit 30 detects the phase of the carrier immediately after starting detection of the digital modulated signal, i.e., phase shifting of the carrier as to the initial phase.

For example, the selector 331 of the sampling clock determining unit 30 selects any one of the phase comparison data p-err and the phase comparison data p-err multiplied by −1, based on the logic value of the detection data r-dat, and supplies this to the amplifier 332. The amplifier 332 amplifies or attenuates the phase comparison data supplied from the selector 331, and supplies this to the adder 341, the adder 341 adds the phase comparison data from the amplifier 332, and the phase comparison low-pass data from the delay unit 342, and supplies new phase comparison low-pass data obtained as a result thereof to the delay unit 342.

The delay unit 342 delays the phase comparison low-pass data from the adder 341, and supplies this to the adder 341 and amplifier 334. The amplifier 334 amplifies or attenuates the phase comparison low-pass data supplied from the delay unit 342, and supplies this to the detection data determining unit 27 and phase comparison data determining unit 29.

In step S21, the detection device 11 determines whether to end the processing. In a case wherein determination is made in step S21 that the processing is not to be ended, the processing returns to step S11, where the above-mentioned processing is repeated.

On the other hand, in a case wherein determination is made in step S21 that the processing is ended, each unit of the detection device 11 ends the processing being performed, and the detection processing ends.

Thus, the detection device 11 generates multiple sampling clocks of which the phases are shifted by integer multiples of ⅛ cycles from the driving clock, and samples the digital modulated signal using these sampling clocks. Also, the detection device 11 employs the sampling data obtained by sampling to generate detection data for each sampling clock, and phase comparison data, and selects final detection data and phase comparison data from the detection data and phase comparison data thereof.

Thus, multiple sampling clocks of which the phases are shifted by integer multiples of ⅛ cycles from the driving clock are generated, and the digital modulated signal is sample using these sampling clocks, whereby the digital modulated signal can be sampled at a greater sampling frequency than the frequency of the carrier using a sampling clock having the cycle (frequency) comparable to the cycle (frequency) of the carrier of the received digital modulated signal.

Also, the sampling data obtained by sampling the digital modulated signal is employed to generate detection data for each sampling clock, and phase comparison data, and final detection data and phase comparison data are selected from the detection data and phase comparison data thereof, whereby detection of the digital modulated signal can be performed simpler in a sure manner. That is to say, the original data can be obtained simpler in a sure manner from the signal obtained by modulation.

With existing technology, there is a need to perform a great amount of processing from determination of the phase of the carrier until detection data is obtained, but according to the detection device 11, all that is necessary is that the initial phase data and phase comparison low-pass data are employed to select final detection data and phase comparison data, whereby processing after determination of the phase of the carrier can be markedly reduced extremely, and the operating speed of the detection device 11 can be improved.

Also, according to the detection device 11, detection of the digital modulated signal can be performed using a driving clock having the frequency (cycle) comparable to the carrier of the digital modulated signal, so restraint due to the limit of the operating speed of the reception device is not greater than the limit of the operating speed of the transmission device of the digital modulated signal. Further, even in a case wherein the frequency of the carrier of the digital modulated signal is increased, a state is not caused wherein the digital modulated signal can be transmitted but cannot be received, and the performance of the communication system can be exhibited to the maximum extent. That is to say, even in a case wherein the frequency of the carrier is increased, the original baseband data can be obtained from the digital modulated signal easily and in a sure manner.

Next, description will be made with reference to the flowchart in FIG. 16 regarding the sampling data generation processing corresponding to the processing in step S13 in FIG. 15.

Upon the sampling clocks Clock[0] through Clock[7] being supplied to the sampling data generating unit 23, in step S51 the flip-flop 121 generates the sampling data r-inp[3][0] by sampling the digital modulated signal at the sampling clock Clock[0] synchronized with the driving clock.

That is to say, the flip-flop 121-1 samples the digital modulated signal supplied from the level conversion unit 21 at the timing of the leading edge of the sampling clock Clock[0] supplied from the sampling clock generating unit 22, and outputs the logic data r-inp[0][0] obtained with the sampling thereof. The flip-flop 121-$i$ (wherein $2 \leq i \leq 4$) samples the logic data output from the flip-flop 121-($i-1$) at the timing of the leading edge of the sampling clock Clock[0] supplied from the sampling clock generating unit 22, and outputs the logic data obtained with the sampling thereof. Thus, the sampling data r-inp[3][0] synchronized with the sampling clock Clock[0] is output from the flip-flop 121-4.

In step S52, the flip-flop 122 generates the sampling data r-inp[3][1] by sampling the digital modulated signal at the sampling clock Clock[1] delayed by ⅛ cycles of the driving clock.

That is to say, the flip-flop 122-1 samples the digital modulated signal supplied from the level conversion unit 21 at the timing of the leading edge of the sampling clock Clock[1] supplied from the sampling clock generating unit 22, and outputs the logic data r-inp[0][1] obtained with the sampling thereof. The flip-flop 122-$i$ (wherein $2 \leq i \leq 4$) samples the logic data output from the flip-flop 122-($i-1$) at the timing of the leading edge of the sampling clock Clock[0] supplied from the sampling clock generating unit 22, and outputs the logic data obtained with the sampling thereof. Thus, the sampling data r-inp[3][1] synchronized with the sampling clock Clock[0] is output from the flip-flop 122-4.

In step S53, the flip-flop 123 generates the sampling data r-inp[3][2] by sampling the digital modulated signal at the sampling clock Clock[2] delayed by ⅖ cycles of the driving clock.

That is to say, the flip-flop 123-1 samples the digital modulated signal supplied from the level conversion unit 21 at the timing of the leading edge of the sampling clock Clock[2] supplied from the sampling clock generating unit 22, and outputs the logic data r-inp[0][2] obtained with the sampling thereof. The flip-flop 123-$i$ (wherein $2 \leq i \leq 4$) samples the logic data output from the flip-flop 123-($i-1$) at the timing of the leading edge of the sampling clock Clock[0] supplied from the sampling clock generating unit 22, and outputs the logic data obtained with the sampling thereof. Thus, the sampling data r-inp[3][2] synchronized with the sampling clock Clock[0] is output from the flip-flop 123-4.

In step S54, the flip-flop 124 generates the sampling data r-inp[3][3] by sampling the digital modulated signal at the sampling clock Clock[3] delayed by ⅜ cycles of the driving clock.

That is to say, the flip-flop 124-1 samples the digital modulated signal supplied from the level conversion unit 21 at the timing of the leading edge of the sampling clock Clock[3] supplied from the sampling clock generating unit 22, and outputs the logic data r-inp[0][3] obtained with the sampling thereof. The flip-flop 124-$i$ (wherein $2 \leq i \leq 4$) samples the logic data output from the flip-flop 124-($i-1$) at the timing of the leading edge of the sampling clock supplied from the sampling clock generating unit 22, and outputs the logic data obtained with the sampling thereof. Thus, the sampling data r-inp[3][3] synchronized with the sampling clock Clock[0] is output from the flip-flop 124-4.

In step S55, the flip-flop 125 generates the sampling data r-inp[3][4] by sampling the digital modulated signal at the sampling clock Clock[4] delayed by ⅘ cycles of the driving clock.

That is to say, the flip-flop 125-1 samples the digital modulated signal supplied from the level conversion unit 21 at the timing of the leading edge of the sampling clock Clock[4]

supplied from the sampling clock generating unit 22, and outputs the logic data r-inp[0][4] obtained with the sampling thereof. The flip-flop 125-$i$ (wherein $2 \leq i \leq 4$) samples the logic data output from the flip-flop 125-($i$−1) at the timing of the leading edge of the sampling clock supplied from the sampling clock generating unit 22, and outputs the logic data obtained with the sampling thereof. Thus, the sampling data r-inp[3][4] synchronized with the sampling clock Clock[0] is output from the flip-flop 125-4.

In step S56, the flip-flop 126 generates the sampling data r-inp[3][5] by sampling the digital modulated signal at the sampling clock Clock[5] delayed by $5/8$ cycles of the driving clock.

That is to say, the flip-flop 126-1 samples the digital modulated signal supplied from the level conversion unit 21 at the timing of the leading edge of the sampling clock Clock[5] supplied from the sampling clock generating unit 22, and outputs the logic data r-inp[0][5] obtained with the sampling thereof. The flip-flop 126-$i$ (wherein $2 \leq i \leq 4$) samples the logic data output from the flip-flop 126-($i$−1) at the timing of the leading edge of the sampling clock supplied from the sampling clock generating unit 22, and outputs the logic data obtained with the sampling thereof. Thus, the sampling data r-inp[3][5] synchronized with the sampling clock Clock[0] is output from, the flip-flop 126-4.

In step S57, the flip-flop 127 generates the sampling data r-inp[3][6] by sampling the digital modulated signal at the sampling clock Clock[6] delayed by $6/8$ cycles of the driving clock.

That is to say, the flip-flop 127-1 samples the digital modulated signal supplied from the level conversion unit 21 at the timing of the leading edge of the sampling clock Clock[6] supplied from the sampling clock generating unit 22, and outputs the logic data r-inp[0][6] obtained with the sampling thereof. The flip-flop 127-$i$ (wherein $2 \leq i \leq 4$) samples the logic data output from the flip-flop 127-($i$−1) at the timing of the leading edge of the sampling clock supplied from the sampling clock generating unit 22, and outputs the logic data obtained with the sampling thereof. Thus, the sampling data r-inp[3][6] synchronized with the sampling clock Clock[0] is output from the flip-flop 127-4.

Figure 15:
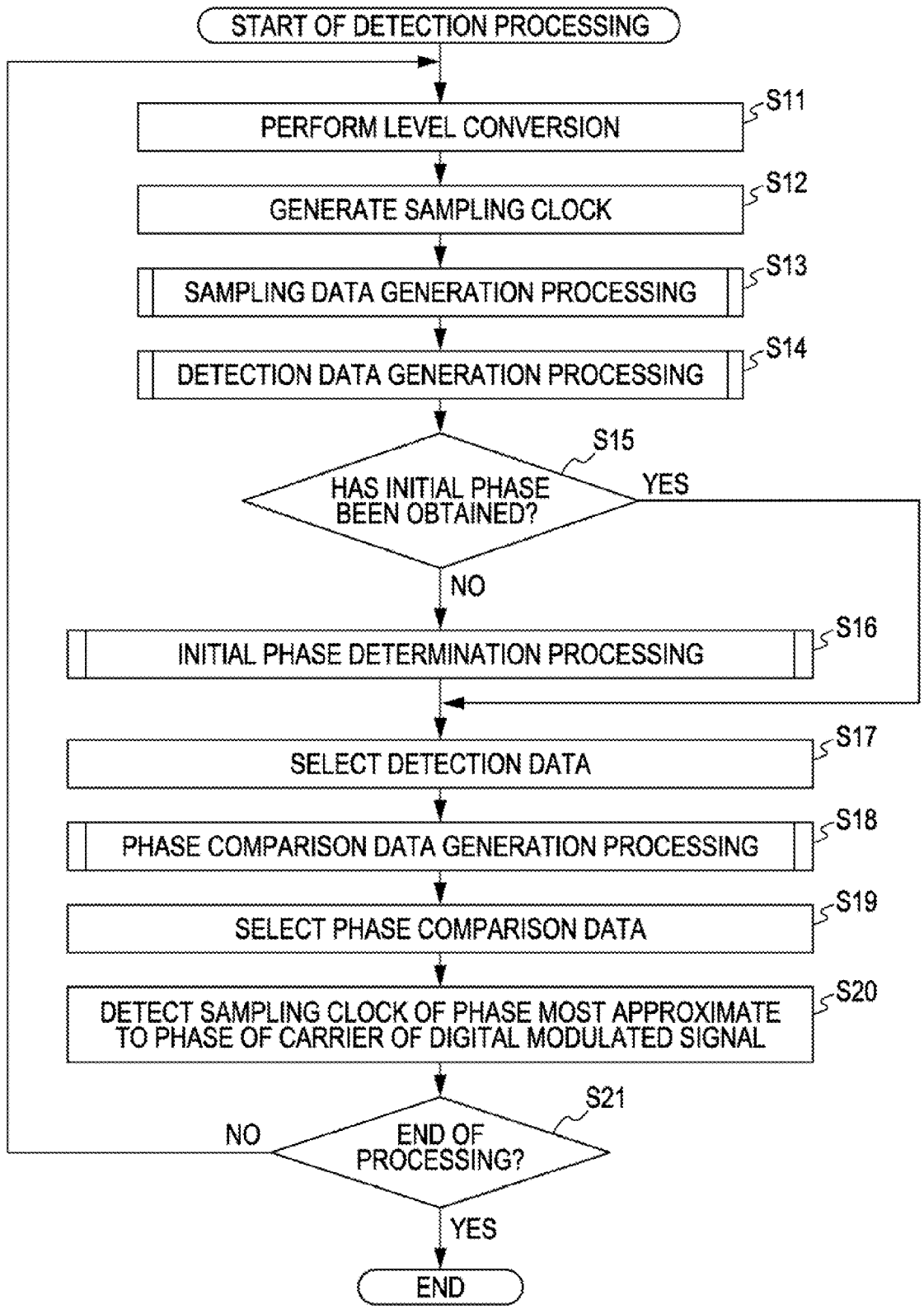
FIG. 15 is a flowchart for describing detection processing.
Figure 16:
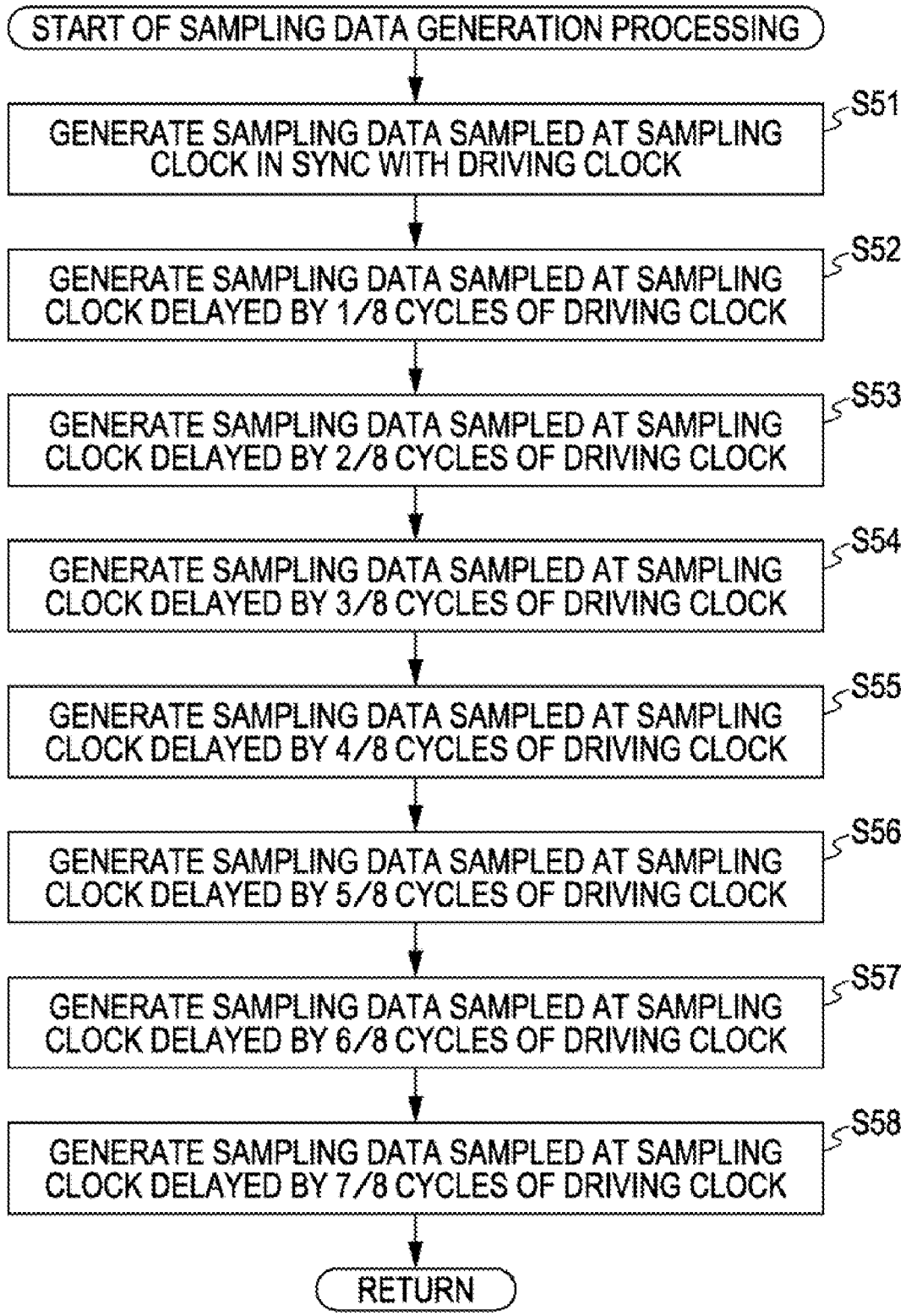
FIG. 16 is a flowchart for describing sampling data generation processing.

In step S58, the flip-flop 128 generates the sampling data r-inp[3][7] by sampling the digital modulated signal at the sampling clock Clock[7] delayed by $7/8$ cycles of the driving clock, the processing proceeds to step S14 in FIG. 15, and the sampling data generating processing ends.

That is to say, the flip-flop 128-1 samples the digital modulated signal supplied from the level conversion unit 21 at the timing of the leading edge of the sampling clock Clock[7] supplied from the sampling clock generating unit 22, and outputs the logic data r-inp[0][7] obtained with the sampling thereof. The flip-flop 128-$i$ (wherein $2 \leq i \leq 4$) samples the logic data output from the flip-flop 128-($i$−1) at the timing of the leading edge of the sampling clock supplied from the sampling clock generating unit 22, and outputs the logic data obtained with the sampling thereof. Thus, the sampling data r-inp[3][7] synchronized with the sampling clock Clock[0] is output from the flip-flop 128-4.

Thus, the sampling data generating unit 23 employs multiple sampling clocks of which the phases are shifted by integer multiples of $1/8$ cycles from the cycle of the driving clock to sample the digital modulated signal, and generate sampling data for each of the sampling clocks.

Thus, the multiple sampling clocks are employed to sample the digital modulated signal, whereby sampling data can be generated using a sampling clock having the cycle comparable to the cycle of the driving clock. Also, the logic data obtained by sampling in sync with each sampling clock is further sampled in sync with several sampling clocks, whereby ultimately the sampling data can be synchronized with the sampling clock Clock[0]

Figure 17:
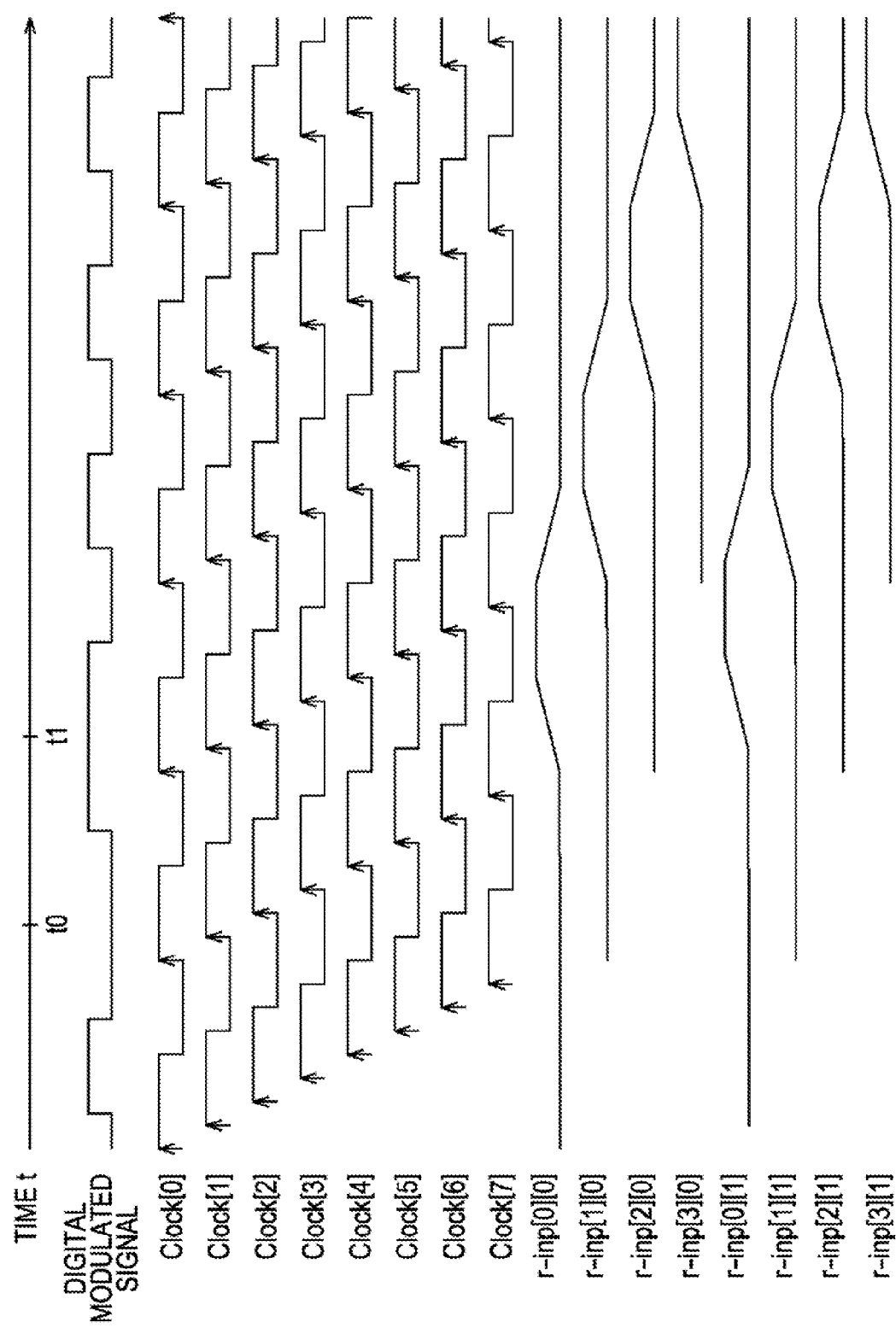
FIG. 17 is a diagram for describing sampling timing by a flip-flop.

For example, in a case wherein the signal shown in FIG. 17 is supplied to the sampling data generating unit 23 as the digital modulated signal, each flip-flop samples the digital modulated signal or the logic data held at the flip-flop of the preceding stage at the timing of the leading edge of the supplied sampling clock.

Note that in FIG. 17, the horizontal direction indicates time, and the vertical direction indicates the level (logic value) of each signal. For example, with each signal, the logic value thereof is set to 1 at the time of the signal being in a state of the greatest level, and is set to 0 at the time of the signal being in a state of the smallest level. Also, FIG. 17 illustrates the waveforms of the digital modulated signal, sampling clocks Clock[0] through Clock[7], logic data r-inp[0][0] through r-inp[2][0], sampling data r-inp[3][0], logic data r-inp[0][1] through r-inp[2][1], and sampling data r-inp[3][1].

With the digital modulated signal, the phase of the section between point-in-time t0 and point-in-time t1 of a predetermined cycle wave is assumed to be inverted. Here, the section between point-in-time t0 and point-in-time t1 is assumed to be the section equivalent to one cycle of the digital modulated signal.

Also, each of the sampling clocks Clock[0] through Clock[7] is assumed to be a cycle wave having generally the same cycle as the cycle of the digital modulated signal, and each of the sampling clocks Clock[1] through Clock[7] is assumed to be delayed by integer multiples of $1/8$ cycles of the sampling clock Clock[0]. That is to say, the sampling clock Clock[$i$] (wherein $1 \leq i \leq 7$) is delayed by $1/8$ cycles as to the sampling clock Clock[0]. Here, in the drawing of each sampling clock, upward arrows represent the timing of the leading edge of each sampling clock.

Also, the logic data r-inp[0][0] is data obtained by sampling the digital modulated signal at the timing of the leading edge of the sampling clock Clock[0]. In FIG. 17, upon the digital modulated signal being sampled in sync with the sampling clock Clock[0], the logic value obtained by sampling becomes 1 for the first time at the third timing of the leading edge of the sampling clock Clock[3], so the level of the logic data r-inp[0][0] is kept in a level wherein the logic value is 0 until the third sampling is performed.

Subsequently, upon the digital modulated signal being sampled in sync with the sampling clock Clock[0], the logic value 1 is obtained at the third sampling, so the flip-flop 121-1 holds the logic value 1 obtained with the sampling. Accordingly, the level of the logic data r-inp[0][0] gradually increases after the third sampling timing, and thereafter, a level wherein the logic value is set to 1 is maintained.

Further, upon the digital modulated signal being sampled in sync with the sampling clock Clock[0], the logic value 0 is obtained at the fourth sampling and on, so the flip-flop 121-1 holds the logic value 0 obtained with the sampling. Accordingly, the level of the logic data r-inp[0][0] gradually decreases after the fourth sampling timing, and thereafter, upon the logic value becoming 0, the level thereof is maintained.

Here, the reason why the level of the logic data r-inp[0][0] gradually changes is because delay is caused at the circuits such as flip-flops and so forth, and at wiring, and the delay time from the level of the logic data r-inp[0][0] begins to change until a level wherein the logic value is set to 0 or 1 is called "settling time".

The logic data r-inp[1][0] and r-inp[2][0], and sampling data r-inp[3][0] are obtained by the flip-flops 121-2 through 121-4 obtaining the logic values held by the flip-flops 121-1 through 121-3 at the timing of the leading edge of the sampling clock Clock[0], and holding the obtained values by one cycle, respectively. Accordingly, the logic data r-inp[1][0] and r-inp[2][0], and sampling data r-inp[3][0] are equivalent to the logic data r-inp[0][0] through r-inp[2][0] being shifted by one cycle of the sampling clock Clock[0] in the right direction, i.e., temporally in the backward direction in the drawing.

Also, the logic data r-inp[0][1] is data obtained by sampling the digital modulated signal at the timing of the leading edge of the sampling clock Clock[1]. In FIG. 17, upon the digital modulated signal being sampled at the timing of the leading edge of the sampling clock Clock[1], the logic value obtained with the sampling becomes 1 for the first time at the third timing of the leading edge of the sampling clock Clock[1], so the level of the logic data r-inp[0][1] is in a level wherein the logic value is set to 0 until the third sampling is performed.

Subsequently, upon the digital modulated signal being sampled in sync with the sampling clock Clock[1], the logic value 1 is obtained at the third sampling, so the flip-flop 122-1 holds the logic value 1 obtained with the sampling by one cycle. Accordingly, the level of the logic data r-inp[0][1] gradually increases after the third sampling timing, and upon reaching a level wherein the logic value is set to 1, the level thereof is maintained.

Upon the digital modulated signal being further sampled in sync with the sampling clock Clock[1], the logic value 0 is obtained at the fourth sampling and on, so the flip-flop 122-1 holds the logic value 0 obtained with the sampling. Accordingly, the level of the logic data r-inp[0][1] gradually decreases after the fourth sampling timing, and upon reaching a level wherein the logic value is set to 0, the level thereof is maintained.

The logic data r-inp[1][1] and r-inp[2][1], and sampling data, r-inp[3][1] are obtained by the flip-flops 122-2 through 122-4 obtaining the logic values held by the flip-flops 122-1 through 122-3 at the timing of the leading edge of the sampling clock Clock[0], and holding the obtained values by one cycle, respectively.

Accordingly, the logic data r-inp[1][1] is equivalent to the logic data r-inp[0][1] being shifted by ⅞ cycles of the sampling clock Clock[0] in the right direction in the drawing. Also, the logic data r-inp[2][1], and sampling data r-inp[3][1] are equivalent to the logic data r-inp[1][1] and r-inp[2][1] being shifted by one cycle of the sampling clock Clock[0] in the right direction in the drawing.

Thus, with the flip-flop 122-2, the logic data r-inp[0][1] is sampled at the timing of the leading edge of the sampling clock Clock[0] immediately before the logic data r-inp[0][1] is updated, i.e., immediately before the sampling clock Clock[1] rises, whereby the logic data r-inp[1][1] synchronized with the sampling clock Clock[0] can be obtained from the logic data r-inp[0][1] synchronized with the sampling clock Clock[1].

Note that with the other flip-flops 123 through 128 as well, the supplied digital modulated signal or the logic data held at the flip-flop of the preceding stage is sampled in sync with the supplied sampling clock.

Also, upon the sampling data for each sampling clock being supplied to the detection data generating unit 25 from the sampling data generating unit 23, the detection data generation processing is performed, which corresponds to the processing in step S14 in FIG. 15.

Figure 18:
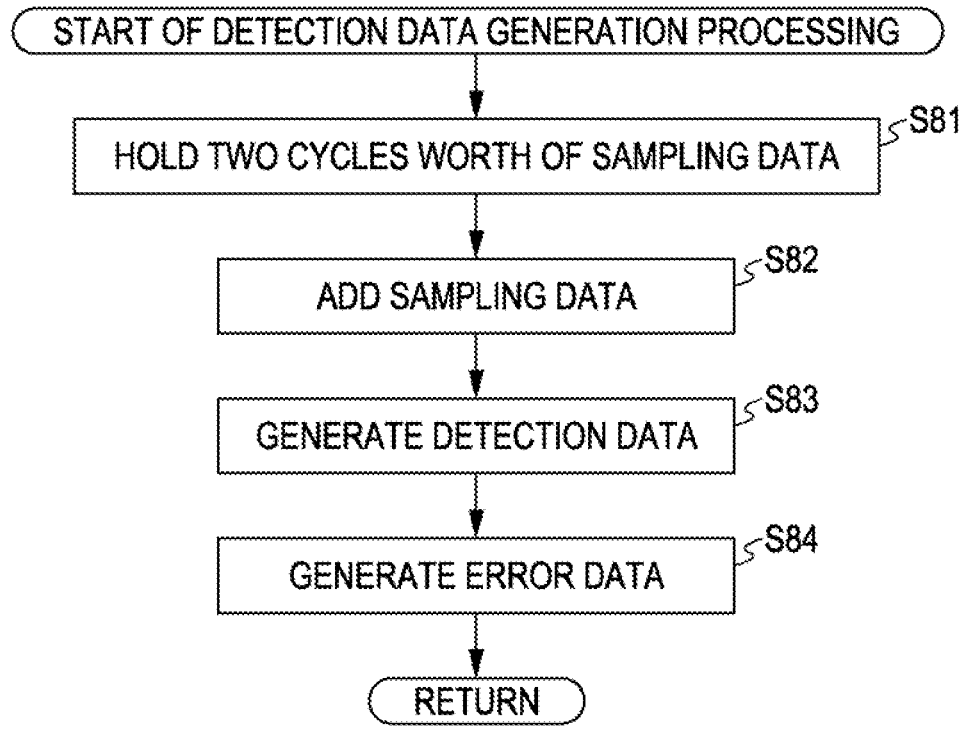
FIG. 18 is a flowchart for describing detection data generation processing.

Description will be made below regarding the detection data generation processing by the detection data generating unit 25 with reference to the flowchart in FIG. 18.

In step S81, each of the registers 151-1 through 151-15 holds the sampling data equivalent to two cycles worth of the supplied sampling data r-inp[4][0] through r-inp[3][6] by one cycle of the driving clock at the timing of the leading edge of the driving clock. Subsequently, the register 151 supplies the held sampling data to the register 152.

In step S82, the register 152-$i$ (wherein $1 \leq i \leq 12$) multiplies the four sets of the sampling data supplied from the register 151 by weights, adds the logic values multiplied by the weights, and holds the thus obtained data r-add[i−1] by one cycle of the driving clock. Subsequently, the register 152-$i$ supplies the held data r-add[i] to the registers 153 and 154.

In step S83, the register 153 compares the two sets of the data supplied from the register 152, and generates detection data. The register 153 supplies the generated detection data to the initial phase determining unit 26 and detection data determining unit 27.

In step S84, the register 154 compares the two sets of the data supplied from the register 152, and generates error data. Subsequently, the register 154 supplies the generated error data to the initial phase determining unit 26, the processing proceeds to step S15 in FIG. 15, and the detection data generation processing ends. Thus, the detection data generating unit 25 generates detection data for each sampling clock from the sampling data for each sampling clock.

Thus, detection data for each sampling clock is generated from the sampling data for each sampling clock, whereby consequently, the digital modulated signal can be sampled and detected at a shorter cycle than the cycle of the carrier, and accordingly, more reliable detection data synchronized with each sampling clock can be obtained.

Further, the generated detection data is supplied to the initial phase determining unit 26, and in step S15 in FIG. 15, in a case wherein the initial phase has not been obtained, in step S16 the initial phase determination processing is performed.

Figure 19:
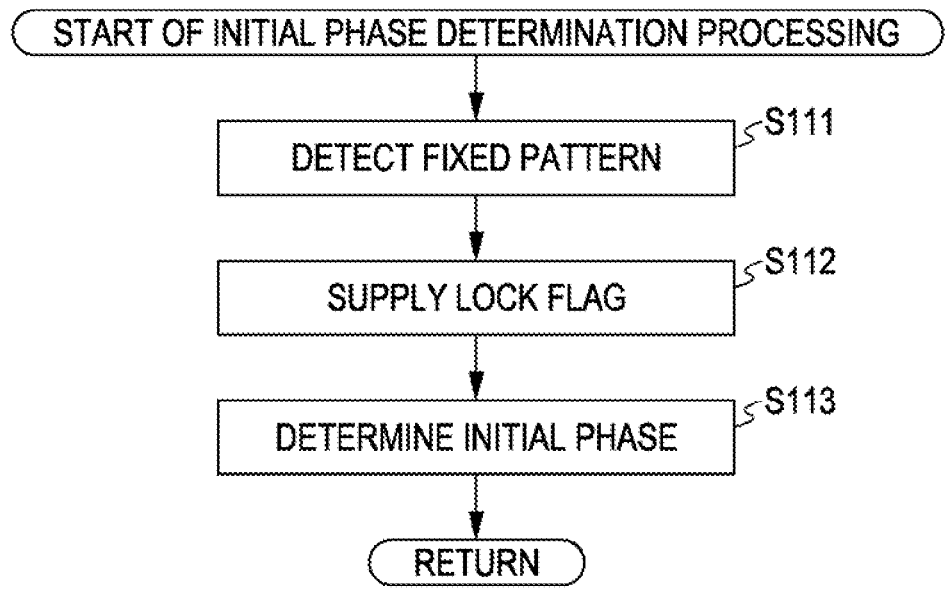
FIG. 19 is a flowchart for describing initial phase determination processing.

Description will be made below regarding the initial phase determination processing corresponding to the processing in step S16 in FIG. 15 with reference to the flowchart in FIG. 19.

In step S111, the pattern detecting unit 181 detects a predetermined fixed pattern from the digital modulated signal based on the detection data supplied from the detection data generating unit 25, and the error data regarding the detection data thereof, and supplies a detection flag indicating the detection result thereof to the phase-lock detecting unit 182.

That is to say, for example, the register 211 of the pattern detecting unit 181-1 supplies the held detection data to the logical AND unit 212. The logical AND unit 212 computes the logical AND of the logic values of the detection data supplied from the register 211, and supplies the computation result thereof to the logical AND computing unit 215. This logic value that is the computation result is set to 1 in a case wherein the fixed pattern has been detected from the digital modulated signal, and is set to 0 in a case wherein the fixed pattern has not been detected.

Also, the register 213 supplies the held error data to the logical AND computing unit 214. Further, the logical AND computing unit 214 computes the logical AND of the logic values of the supplied error data, and supplies the computation result thereof to the logical AND computing unit 215. This logic value that is the computation result is set to 1 in a case wherein all of the logic values of the error data are 0, and is set to 0 in a case wherein at least one piece of error data of which the logic value is 1 is input.

Subsequently, the logical AND unit 215 computes the logical AND of the logic value supplied from the logical AND computing unit 212, and the logic value supplied from the logical AND computing unit 214, and supplies the result thereof to the phase-lock detecting unit 182 as the detection flag Lock[0]. Note that with the pattern detecting units 181-2 through 181-4 as well, the same processing as in the case of the pattern detecting unit 181-1 is performed, and the detection flags Lock[2], Lock[4], and Lock[6] are output, respectively.

In step S112, the phase-lock detecting unit 182 supplies a lock flag to the phase encoder 183 based on the detection flag supplied form the pattern detecting unit 181.

In step S113, the phase encoder 183 determines the initial phase of the carrier based on the lock flag supplied from the phase-lock detecting unit 182, the processing proceeds to step S17 in FIG. 15, and the initial phase determination processing ends.

For example, the phase encoder 183 supplies the initial phase data indicating the sampling clock having the phase closest to the phase of the carrier of the received digital modulated signal, which is determined with the value of the supplied lock flag, to the detection data determining unit 27 and phase comparison data determining unit 29.

According to the initial phase determination processing, detection of the fixed pattern is performed from the received digital modulated signal using the sampling data for each sampling clock, and error data, whereby of the sampling clocks, a sampling clock synchronized with the carrier of the received digital modulated signal to some extent can be detected. Subsequently, further, the sampling clock having the intermediate phase of the detected sampling clocks is detected, whereby of the generated sampling clocks, the sampling clock having the phase closest to the phase of the carrier of the received digital modulated signal can be obtained.

Thus, the initial phase determining unit 26 detects the fixed pattern using the detection data for each sampling clock, and error data, and based on the detection result thereof, selects the sampling clock having the phase closest to the phase of the carrier of the received digital modulated signal, of the eight sampling clocks.

Thus, the fixed pattern is detected using the detection data for each sampling clock, and error data, whereby the sampling clock having the phase closest to the phase of the carrier of the received digital modulated signal can be detected easily and in a sure manner.

Upon the initial phase being determined by the initial phase determining unit 26, and final detection data being selected by the detection data determining unit 27, the phase comparison data generating unit 28 starts the phase comparison data generation processing corresponding to the processing in step S18 in FIG. 15.

Figure 20:
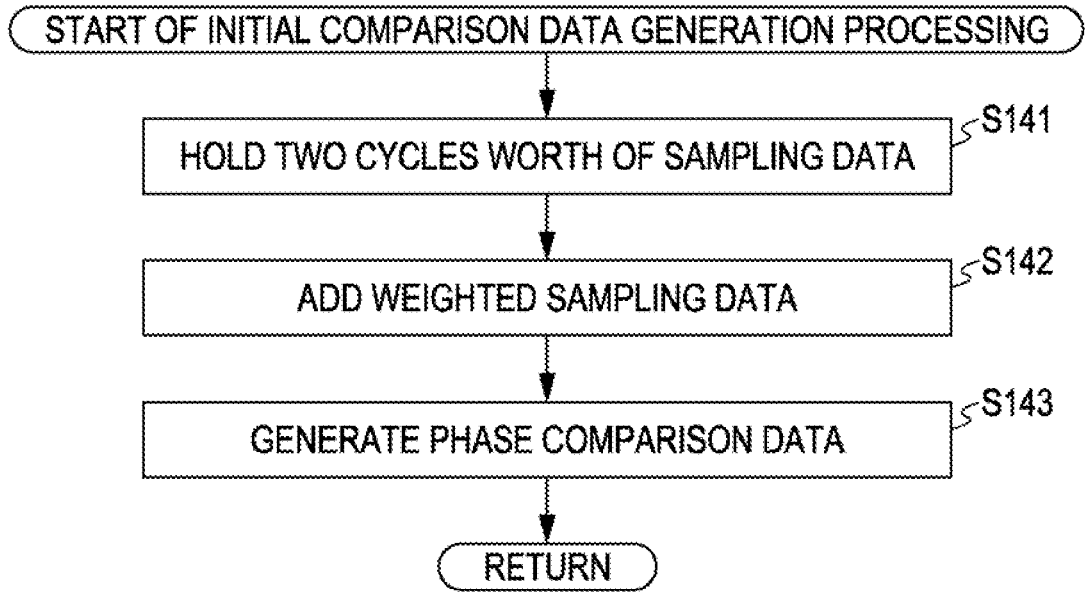
FIG. 20 is a flowchart for describing phase comparison data generation processing.

Description will be made below regarding the phase comparison data generation processing by the phase comparison data generating unit 28 with reference to the flowchart in FIG. 20.

In step S141, the register 271 holds two cycles worth of the supplied sampling data by one cycle of the driving clock, and thereafter, supplies the held sampling data to the register 272.

In step S142, the register 272 subjects four sets of supplied sampling data to weighting, and adds these. That is to say, the register 272 multiplies each of the logic values of the supplied sampling data by a predetermined weight, and adds each of the logic values multiplied by the predetermined weight. Subsequently, the register 272 supplies the data obtained by adding the logic values multiplied by the weights to the register 273 of the subsequent stage.

In step S143, the register 273 multiplies each of two sets of the data supplied from the register 272 by a predetermined weight, adds the data multiplied by the weights, thereby generating phase comparison data for each sampling clock. Subsequently, the register 273 supplies the generated phase comparison data for each sampling clock to the phase comparison data determining unit 29, the processing proceeds to step S19 in FIG. 15, and the phase comparison data, generation processing ends.

Thus, the phase comparison data generating unit 28 generates phase comparison data for each sampling clock from the sampling data for each sampling clock.

Thus, the sampling data obtained by sampling the received digital modulated signal with a shorter cycle than the cycle of the carrier of the received digital modulated signal is weighted and added, whereby more reliable phase comparison data indicating phase shifting for each sampling clock can be obtained.

Note that as described above, as shown in FIG. 3, with the sampling clock generating unit 22, the inverters 94 through 97 for inverting the driving clock are provided to generate sampling clocks, thereby reducing the number of components of the delay devices (delay units) provided in the sampling clock generating unit 22, but there is no need to necessarily provide the inverters.

For example, in a case wherein there is provided a flip-flop at the sampling data generating unit 23 of the subsequent stage of the sampling clock generating unit 22, i.e., in a case wherein the sampling clock from the sampling clock generating unit 22 is input to a flip-flop, the driving timing of the flip-flop thereof is changed to the timing of the leading edge or timing of the trailing edge of the driving clock as appropriate, thereby delaying the driving clock, which may be employed as sampling clock.

Incidentally, with the detection device 11 shown in FIG. 1, multiple sampling clocks having the same cycle as the driving clock are generated from the driving clock having the same cycle as the carrier of the received digital modulated signal, and sampling of the digital modulated signal is performed using these sampling clocks, whereby the digital modulated signal can be sampled with a shorter cycle than the cycle of the carrier thereof.

With the detection device 11, an arrangement has been made wherein the carrier of the digital modulated signal serving as a sampling object, and the driving clock, are signals having generally the same cycle, but in general, even in a case wherein the cycle of the received signal serving as a sampling object and the cycle of the driving clock differ, the received signal can be sampled with a shorter than the cycle of the driving clock using the sampling clock generated from the driving clock.

Figure 21:
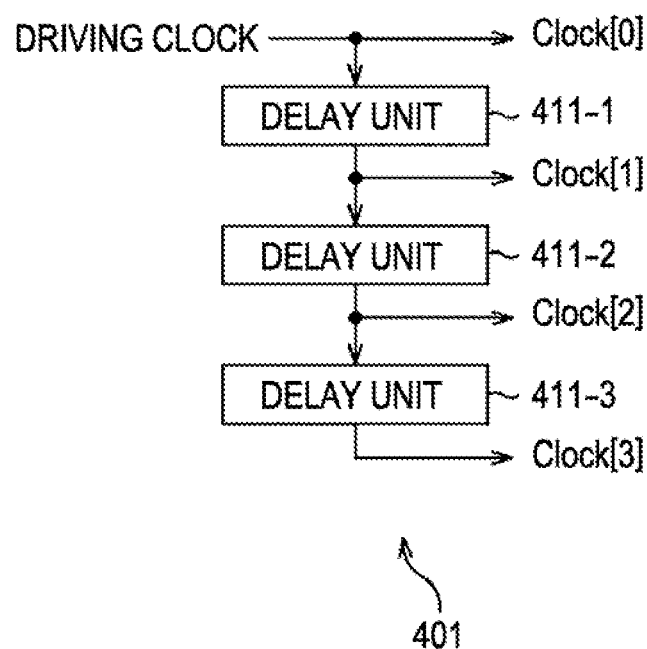
FIG. 21 is a diagram illustrating a configuration example of a sampling clock generating device.
Figure 22:
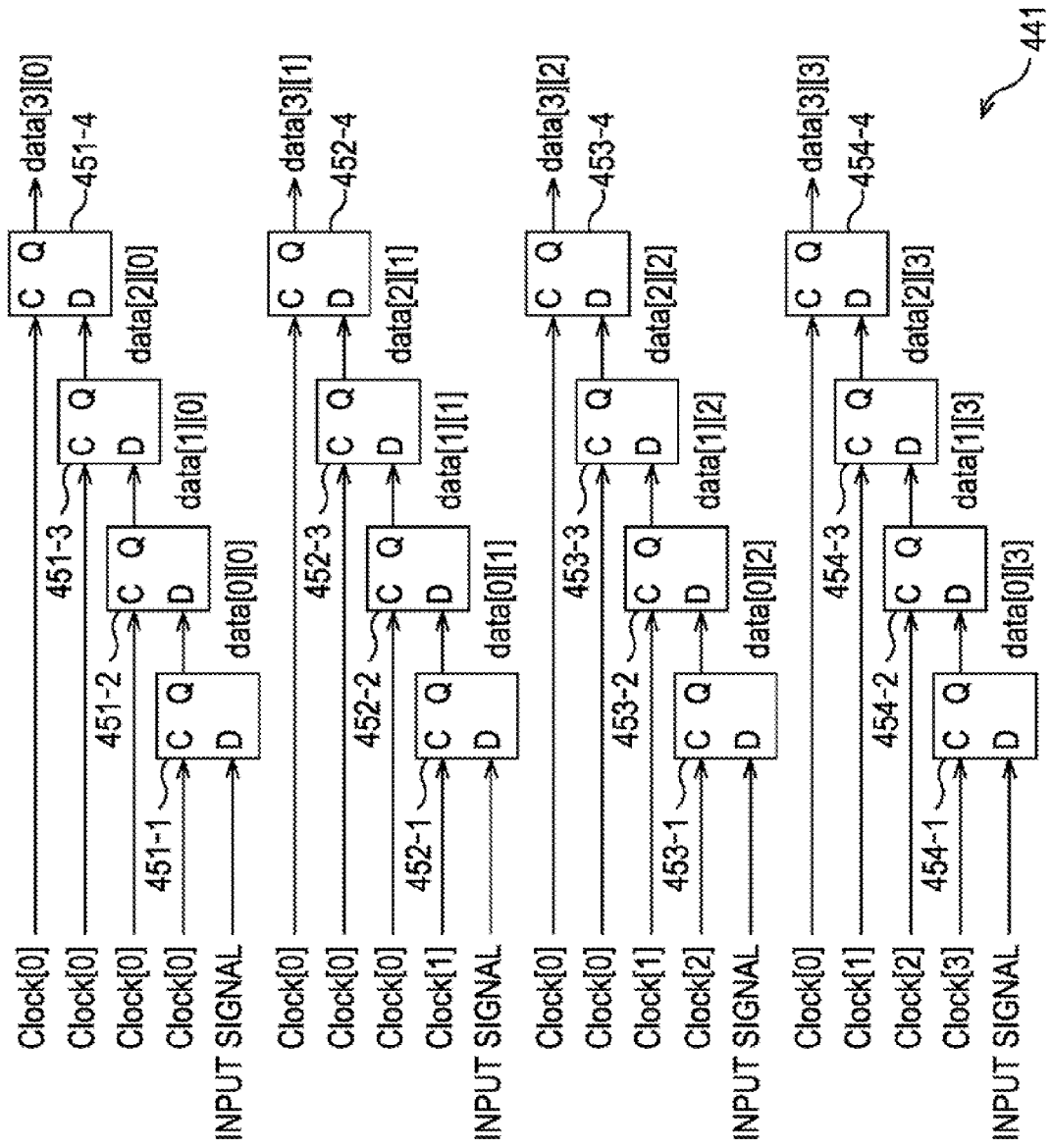
FIG. 22 is a diagram illustrating a configuration example of a sampling data generating device.

In such a case, a sampling clock generating device for generating sampling clocks from the driving clock, and a sampling data generating device for sampling the received input (received signal) are configured, for example, such as shown in FIGS. 21 and 22.

A sampling clock generating device 401 shown in FIG. 21 is configured of delay units 411-1 through 411-3, and the delay units 411-1 through 411-3 are each made up of a delay device or the like.

The sampling clock generating device 401 outputs the input driving clock with no change as the sampling clock Clock[0] synchronized with the driving clock thereof, and supplies the input driving clock to the delay unit 411-1.

The delay unit 411-1 delays the supplied driving clock by ¼ cycles of the driving clock thereof, outputs the delayed driving clock as the sampling clock Clock[1], and supplies the driving clock to the delay unit 411-2. The sampling clock Clock[1] is delayed by ¼ cycles of the sampling clock Clock[0].

The delay unit 411-2 delays the driving clock supplied from the delay unit 411-1 by ¼ cycles of the driving clock thereof, outputs the delayed driving clock as the sampling clock Clock[2], and supplies the driving clock to the delay unit 411-3. The sampling clock Clock[2] is delayed by 2/4 cycles of the sampling clock Clock[0].

The delay unit 411-3 delays the driving clock supplied from the delay unit 411-2 by ¼ cycles of the driving clock thereof, outputs the delayed driving clock as the sampling clock Clock[3]. The sampling clock Clock[3] is delayed by ¾ cycles of the sampling clock Clock[0].

Accordingly, the four sampling clocks, which have the same cycle, of which the phases are shifted by integer multiples of ¼ cycles of the driving clock are output from the sampling clock generating device 401, and supplied to a sampling data generating device 441 shown in FIG. 22.

The sampling data generating device 441 is configured of flip-flops 451-1 through 454-4. The sampling data generating device 441 is suitable for generating sampling data using multiple sampling clocks in a case wherein the cycle tc of the sampling clocks is longer than the delay time until settling of data including delay due to wiring in the sampling data generating device 441, and so forth, i.e., delay time td until data can be read.

Here, each of the flip-flops 451-1 through 454-4 is configured so as to obtain data at the timing of the leading edge of the supplied sampling clock, and the delay time td is set to be equal to or smaller than ¾ (e.g., ¾) of the cycle tc of the sampling clock. Also, each of the flip-flops 451-1 through 454-4 is holds the obtained data by one cycle of the sampling clock, i.e., driving clock.

The flip-flop 451-1 samples the supplied input signal at the timing of the leading edge of the supplied sampling clock Clock[0], and outputs data[0][0] obtained with the sampling thereof. The flip-flop 451-*i* (wherein 2≦i≦4) samples data[i−2][0] output from the flip-flop 451-(*i*−1) at the timing of the leading edge of the supplied sampling clock Clock[0], and outputs data[i−1][0] obtained with the sampling thereof.

Thus, the input signal is sampled from the flip-flop 451-4 at the timing of the leading edge of the sampling clock Clock[0], and data[3][0] is output as sampling data synchronized with the sampling clock Clock[0]. Note that hereafter, in a case that there is no need to particularly distinguish each of the flip-flops 451-1 through 451-4, these will be simply referred to as a flip-flop 451.

Also, the flip-flop 452-1 samples the supplied input signal at the timing of the leading edge of the supplied sampling clock Clock[1], and outputs data[0][1] obtained with the sampling thereof. The flip-flop 452-*i* (wherein 2≦i≦4) samples data[i−2][1] output from the flip-flop 452-(*i*−1) at the timing of the leading edge of the supplied sampling clock Clock[0], and outputs data[i−1][1] obtained with the sampling thereof.

This takes advantage of the fact that the settling time of the data[0][1] is temporally shorter than duration from rising of the sampling clock Clock[1] to rising of the next sampling clock Clock[0].

Thus, the input signal is sampled from the flip-flop 452-4 at the timing of the leading edge of the sampling clock Clock[1], and data[3][1] is output as sampling data synchronized with the sampling clock Clock[0]. Note that hereafter, in a case that there is no need to particularly distinguish each of the flip-flops 452-1 through 452-4, these will be simply referred to as a flip-flop 452.

The flip-flop 453-1 samples the supplied input signal at the timing of the leading edge of the supplied sampling clock Clock[2], and outputs data[0][2] obtained with the sampling thereof. The flip-flop 453-2 samples the data[0][2] output from the flip-flop 453-1 at the timing of the leading edge of the supplied sampling clock Clock[1], and outputs data[1][2] obtained with the sampling thereof. This takes advantage of the fact that the settling time of the data[0][2] is temporally snorter than duration from rising of the sampling clock Clock[2] to rising of the next sampling clock Clock[1].

The flip-flops 453-3 and 453-4 sample the data[1][2] and data[2][2] output from the flip-flops 453-2 and 453-3 at the timing of the leading edge of the supplied sampling clock Clock[0], and output data[2][2] and data[3][2] obtained with the sampling thereof. This takes advantage of the fact that the settling time of the data[1][2] is temporally shorter than duration from the leading edge of the sampling clock Clock[1] to the leading edge of the next sampling clock Clock[0].

Thus, the input signal is sampled from the flip-flop 453-4 at the timing of the leading edge of the sampling clock Clock[2], and data[3][2] is output as sampling data synchronized with the sampling clock Clock[0]. Note that hereafter, in a case that there is no need to particularly distinguish each of the flip-flops 453-1 through 453-4, these will be simply referred to as a flip-flop 453.

Also, the flip-flop 454-1 samples the supplied input signal at the timing of the leading edge of the supplied sampling clock Clock[3], and outputs data[0][3] obtained with the sampling thereof. The flip-flop 454-2 samples the data[0][3] output from the flip-flop 454-1 at the timing of the leading edge of the supplied sampling clock Clock[2], and outputs data[1][3] obtained with the sampling thereof.

The flip-flops 454-3 samples the data[1][3] supplied from the flip-flops 454-2 at the timing of the leading edge of the supplied sampling clock Clock[1], and output data[2][3] obtained with the sampling thereof. The flip-flops 454-4 samples the data[2][3] supplied from, the flip-flops 454-3 at the timing of the leading edge of the supplied sampling clock Clock[0], and output data[3][3] obtained with the sampling thereof.

This takes advantage of the fact that with the flip-flops 454-2 through 454-4, the settling time of the data[0][3] through data[2][3] is temporally shorter than duration from the leading edge of the sampling clock Clock[3] through Clock[1] to the leading edge of the next sampling clock Clock[2] through Clock[0], respectively.

Thus, the input signal is sampled from the flip-flop 454-4 at the timing of the leading edge of the sampling clock Clock[3], and data[3][3] is output as sampling data synchronized with the sampling clock Clock[0]. Note that hereafter, in a case that there is no need to particularly distinguish each of the flip-flops 454-1 through 454-4, these will be simply referred to as a flip-flop 454.

Thus, the data[3][0] through data[3][3] synchronized with the sampling clock Clock[0], obtained by sampling the input signal in sync with the sampling clocks Clock[0] through Clock[3], are output from the sampling data generating device 441, respectively. In other words, the sampling data obtained by sampling the input signal at ¼ cycles of the sampling clock, i.e., (¼) tc time interval is output from the sampling data generating device 441.

Here, in order to synchronize each piece of sampling data obtained by sampling with the sampling clock Clock[0], during from the data sampled at the timing of the leading edge of a predetermined sampling clock and held by a flip-flop becoming a level wherein the data can be read correctly, until the data thereof being updated next, the flip-flop of the subsequent stage needs to obtain the data held by that flip-flop at the timing of the leading edge of another sampling clock having a different phase. Accordingly, the sampling cycle of the input signal using the multiple sampling clocks is taken as the time below the difference between the cycle tc of the sampling clock and delay time td (tc−td).

Also, the flip-flops 451 through 454 synchronize the data obtained by sampling in sync with each sampling clock with the sampling clock Clock[0], so it can be said that the sampling data generating device 441 is configured of the four shift registers made up of the flip-flops 451 through 454.

Note that each piece of the data[0][0] through data[3][3] may be taken as 1-bit logic data, or may be taken as data of two bits or more.

Also, an arrangement may be made wherein the input signal is taken as the digital modulated signal, and detection of the digital modulated signal is performed using the sampling data output from the sampling data generating device 441. In such a case, the sampling data output from the sampling data generating device 441 is employed, and detection data and phase comparison data are generated by the detection data generating unit 25 and phase comparison data generating unit 28.

Figure 23:
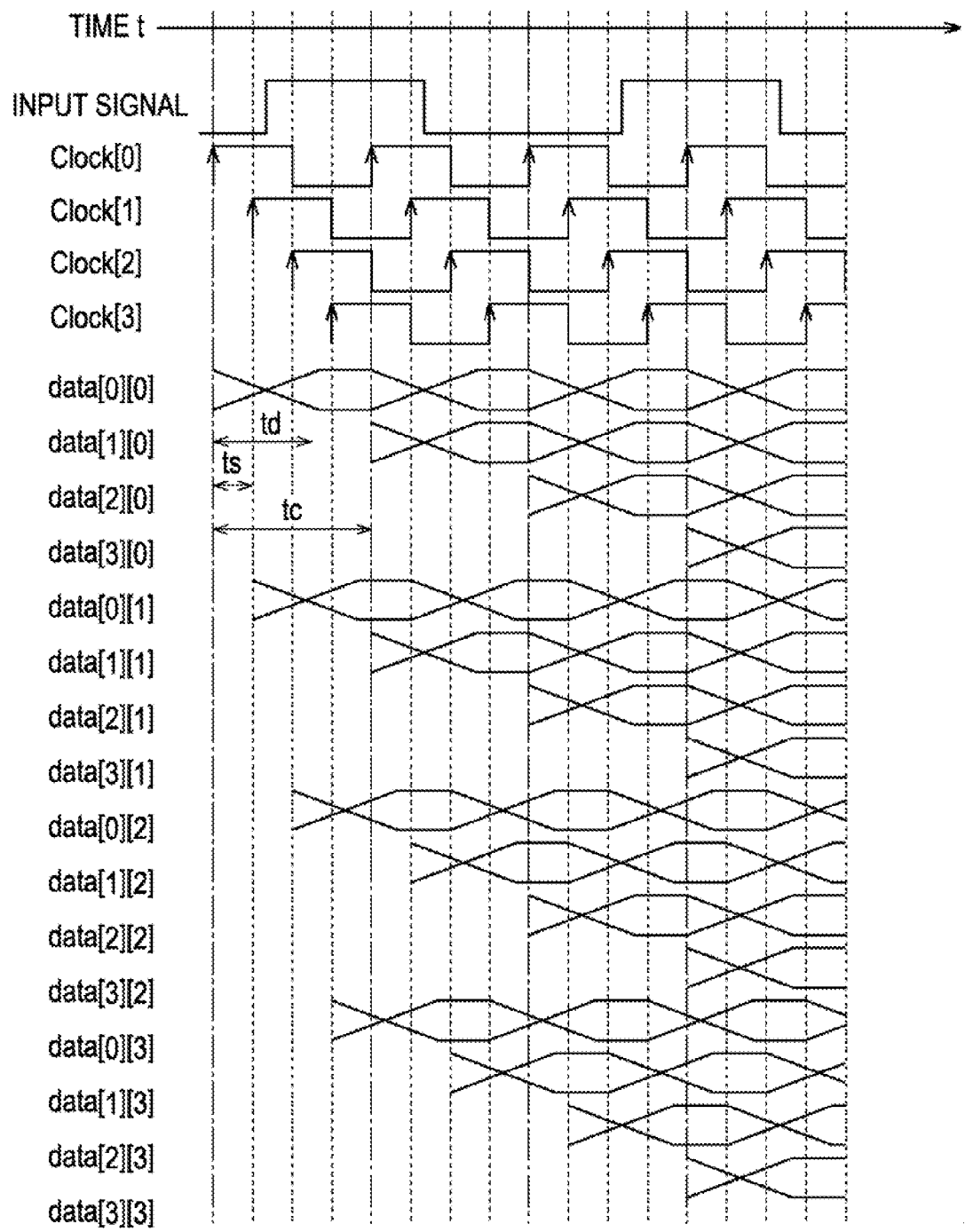
FIG. 23 is a diagram for describing data sampling timing of the sampling data generating device.

Further, for example, upon the input signal shown in FIG. 23 being supplied to the sampling data generating device 441, each flip-flop samples the supplied input signal or the data held by the flip-flop of the preceding stage at the timing of the leading edge of the supplied sampling clock.

Note that in FIG. 23, the horizontal direction indicates time, and the vertical direction indicates the level (logic value or data value) of each signal. Description will be made below assuming that with each signal, the logic value thereof is set to 1 at the time of the signal being in a state of the greatest level, and is set to 0 at the time of the signal being in a state of the smallest level. Also, FIG. 23 illustrates the waveforms of the input signal, sampling clocks Clock[0] through Clock[3], and data[0][0] through data[3][3].

The input signal is taken as cycle waves wherein the cycle thereof is longer than the cycles of the sampling clocks. Each of the sampling clocks Clock[0] through Clock[3] is as cycle waves wherein the cycle tc is shorter than the cycle of the input signal, and the sampling clocks Clock[1] through Clock[3] are obtained by delaying the sampling clock Clock[0] by ¼ through ¾ of the cycle thereof respectively.

Here, in the drawing of each sampling clock, upward arrows represent the timing of the leading edge of each sampling clock. Accordingly, the sampling cycle ts wherein the input signal is sampled is assumed to be ¼ cycles of the sampling clocks.

Also, the data[0][0] is data obtained by sampling the input signal at the timing of the leading edge of the sampling clock Clock[0]. In FIG. 23, upon sampling of the input signal being performed in sync with the sampling clock Clock[0], the logic values 1 and 0 are alternately obtained as a result of the sampling.

The flip-flop 451-1 holds the logic value obtained with the sampling by one cycle of the sampling clock, so the level of the data[0][0] gradually increases or decreases after the timing of the leading edge of the sampling clock Clock[0], and upon reaching a level wherein the logic value is set to 1 or 0, the level thereof is maintained until the next timing of the leading edge of the sampling clock Clock[0]. Here, duration from the level of the data[0][0] beginning to change until a level wherein the logic value is set to 1 or 0, is taken as the delay time td according to settling.

Each piece of the data[1][0] through data[3][0] is obtained by each of the flip-flops 451-2 through 451-4 obtaining the logical value held by each of the flip-flops 451-1 through 451-3 at the timing of the leading edge of the sampling clock Clock[0], and holding the obtained logic value by one cycle of the sampling clock. Accordingly, each piece of the data[1][0] through data[3][0] is obtained by shifting each piece of the data[0][0] through data[2][0] in the right direction in the drawing, i.e., temporally in the backward direction by one cycle of the sampling clock Clock[0].

Also, the data[0][1] is data obtained by sampling the input signal at the timing of the leading edge of the sampling clock Clock[1]. The flip-flop 452-1 holds the logic value obtained with the sampling by one cycle of the sampling clock, so the level of the data[0][1] gradually increases or decreases after the timing of the leading edge of the sampling clock Clock[1], and upon reaching a level wherein the logic value is set to 1 or 0, the level thereof is maintained until the next timing of the leading edge.

Each piece of the data[1][1] through data[3][1] is obtained by each of the flip-flops 452-2 through 452-4 obtaining the logical value held by each of the flip-flops 452-1 through 452-3 at the timing of the leading edge of the sampling clock Clock[0], and holding the obtained logic value by one cycle. Accordingly, the data[1][1] is obtained by shifting the data [0][0] temporally in the backward direction in the drawing by ¾ cycles of the sampling clock Clock[0], and the data[2][1] and data[3][1] are obtained by shifting the data[1][1] and data[2][1] temporally in the backward direction by one cycle of the sampling clock Clock[0].

Further, the data[0][2] is data obtained by sampling the input signal at the timing of the leading edge of the sampling clock Clock[2]. The flip-flop 453-1 holds the logic value obtained with the sampling by one cycle of the sampling clock, so the level of the data[0][2] gradually increases or decreases after the timing of the leading edge of the sampling clock Clock[2], and upon reaching a level wherein the logic value is set to 1 or 0, the level thereof is maintained until the next timing of the leading edge.

Each piece of the data[1][2] through data[3][2] is obtained by each of the flip-flops 453-2 through 453-4 obtaining the logical value held by each of the flip-flops 453-1 through 453-3 at the timing of the leading edge of the sampling clock Clock[0], and holding the obtained logic value by one cycle. Accordingly, the data[1][2] and data[2][2] are obtained by shifting the data[0][2] and data[1][2] temporally in the backward direction in the drawing by ¾ cycles of the sampling clock Clock[0], and the data[3][2] is obtained by shifting the data[2][2] temporally in the backward direction by one cycle of the sampling clock Clock[0].

Moreover, the data[0][3] is data obtained by sampling the input signal at the timing of the leading edge of the sampling clock Clock[3]. The flip-flop 454-1 holds the logic value obtained with the sampling by one cycle of the sampling clock, so the level of the data[0][3] gradually increases or decreases after the timing of the leading edge of the sampling clock Clock[3], and upon reaching a level wherein the logic value is set to 1 or 0, the level thereof is maintained until the next timing of the leading edge.

Each piece of the data[1][3] through data[3][3] is obtained by each of the flip-flops 454-2 through 454-4 obtaining the logical value held by each of the flip-flops 454-1 through 454-3 at the timing of the leading edge of the sampling clocks Clock[2] through Clock[0], and holding the obtained logic value by one cycle. Accordingly, the data[1][3] through data

[3][3] are obtained by shifting the data[0][3] through data[2][3] temporally in the backward direction in the drawing by ¾ cycles of the sampling clock Clock[0].

Thus, with the sampling data generating device 441, an arrangement is made wherein each flip-flop holds the obtained data by one cycle tc of the sampling clock, which is longer than the delay time td, such that the flip-flop of the subsequent stage can read the data held at each flip-flop correctly, and a flip-flop which is updated at a different timing from the timing of the flip-flop of the preceding stage is employed as necessary, thereby relatively reducing the delay of the sampling clock, i.e., the delay of sampling timing, and accordingly, the sampling data obtained by sampling the input signal at a shorter cycle than the cycle of the sampling clock Clock[0] can be output in sync with the sampling clock Clock[0].

Figure 24:
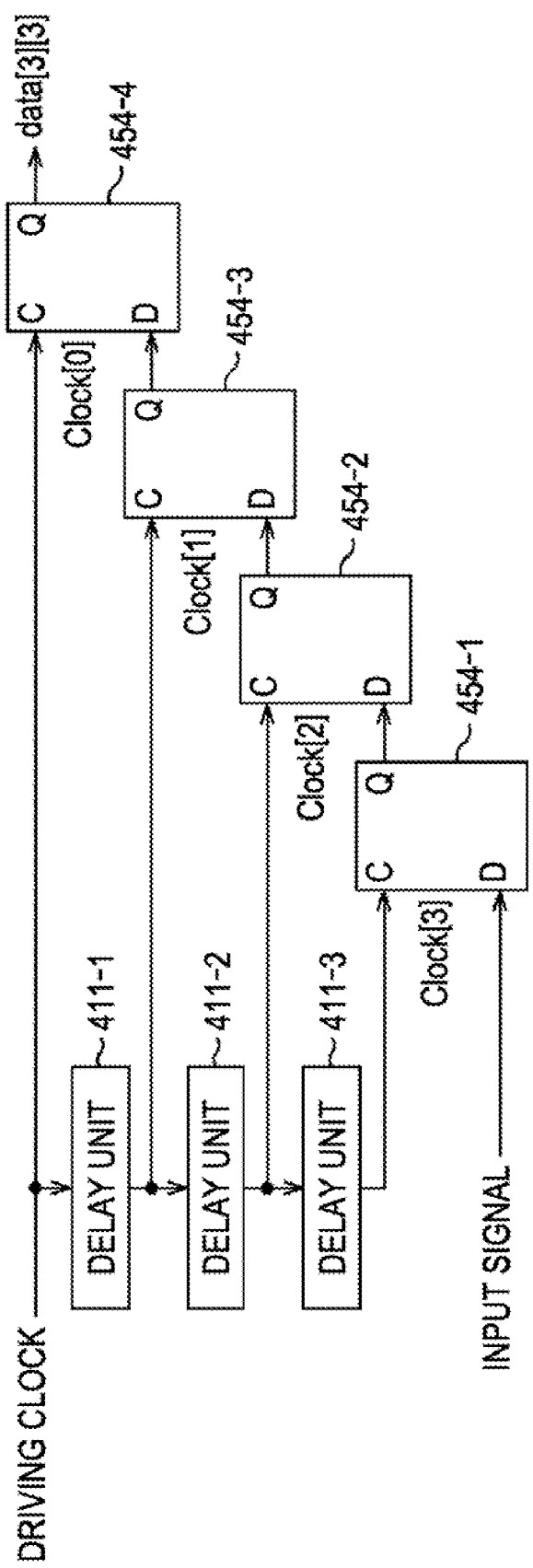
FIG. 24 is a diagram illustrating a connection example between a delay unit and a flip-flop.

Note that the sampling clock generating device 401 shown in FIG. 21 may be provided within the sampling data generating device 441. In such a case, for example, as shown in FIG. 24, the flip-flop 454 is connected to the delay units 411-1 through 411-3 for generating a sampling clock. Note that in FIG. 24, the components corresponding to those in the cases of FIGS. 21 and 22 are denoted with the same reference numerals, and the description thereof will be omitted as appropriate.

In FIG. 24, the delay units 411-1 through 411-3 which are connected serially are further connected to the flip-flops 454-3 through 454-1, respectively. Accordingly, the supplied driving clock is supplied to the delay unit 411-1, supplied to the flip-flop 454-4 with no change as the sampling clock Clock[0], the driving clock delayed by the delay unit 411-1 is supplied to the delay unit 411-2, and supplied to the flip-flop 454-3 as the sampling clock Clock[1].

Also, the driving clock delayed by the delay unit 411-2 is supplied to the delay unit 411-3, supplied to the flip-flop 454-2 as the sampling clock Clock[2], and the driving clock delayed by the delay unit 411-3 is supplied to the flip-flop 454-1 as the sampling clock Clock[3].

With the configuration shown in FIG. 24, the three delay units 411-1 through 411-3 are connected serially, so this configuration is suitable in a case wherein the operation precision of each delay unit is very high, and propagation delay due to wiring is uniform.

Figure 25:
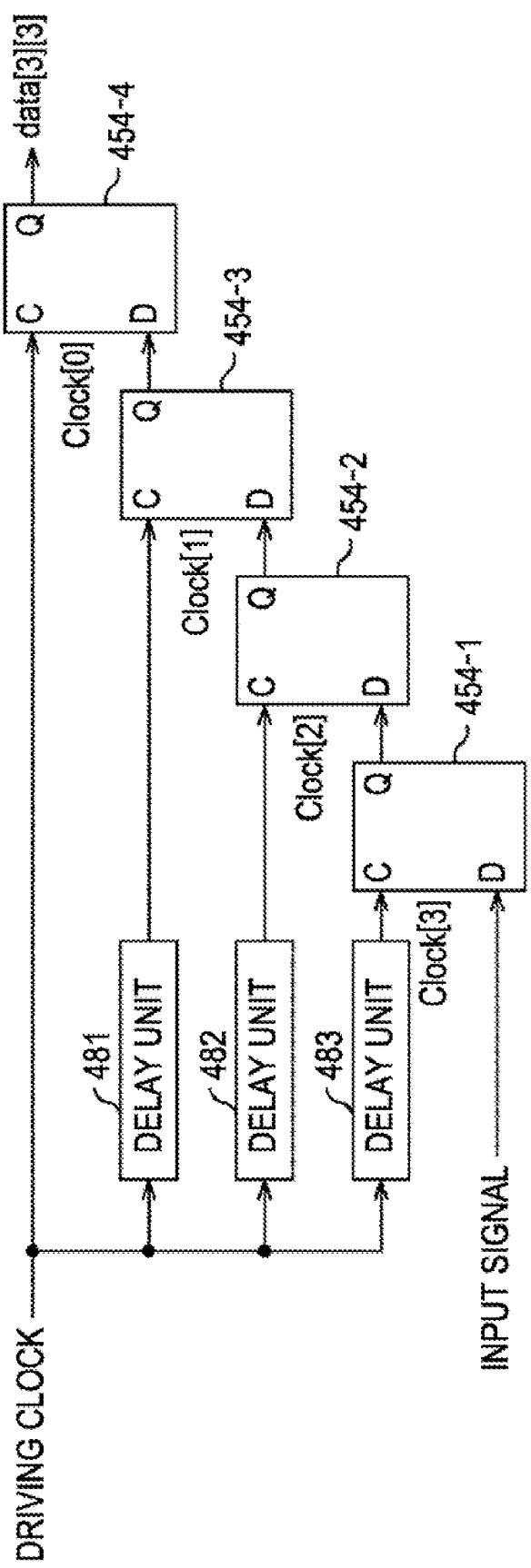
FIG. 25 is a diagram illustrating a connection example between a delay unit and a flip-flop.

Also, in a case wherein the sampling clock generating device 401 is provided within the sampling data generating device 441, an arrangement may be made wherein the delay units to be connected to the flip-flop 454 are not connected serially as shown in FIG. 24 but are connected in parallel as shown in FIG. 25. Note that in FIG. 25, the components corresponding to those in the case of FIG. 22 are denoted with the same reference numerals, and the description thereof will be omitted as appropriate.

In FIG. 25, the delay units 481 through 483 made up of a delay unit or the like are connected to the flip-flops 454-3 through 454-1 respectively, and the driving clock is supplied to the delay units 481 through 483.

That is to say, the supplied driving clock is supplied to the flip-flop 454-4 as the sampling clock Clock[0], and supplied to the delay units 481 through 483. The delay unit 481 delays the supplied driving clock by ¼ cycles of the driving clock thereof, and supplies the delayed driving clock to the flip-flop 454-3 as the sampling clock Clock[1].

The delay unit 482 delays the supplied driving clock by ²⁄₄ cycles of the driving clock thereof, and supplies the delayed driving clock to the flip-flop 454-2 as the sampling clock Clock[2]. The delay unit 483 delays the supplied driving clock by ¾ cycles of the driving clock thereof, and supplies the delayed driving clock to the flip-flop 454-1 as the sampling clock Clock[3].

With the configuration shown in FIG. 25, the three delay units 481 through 483 are disposed in parallel, so this configuration is suitable for a case wherein the placement interval of the flip-flop 454 is uneven, and propagation delay according to wiring in each flip-flop 454 is not constant. With such a configuration, when taking propagation delay according to each wiring into consideration, it is desirable to set time for delaying the driving clock at the delay units 481 through 483 such that the delay intervals of the sampling clocks Clock[0] through Clock[3] become even intervals, as compared with setting time for delaying the driving clock at the delay units 481 through 483 to integer multiples of ¼ of the cycle of the driving clock.

Figure 26:
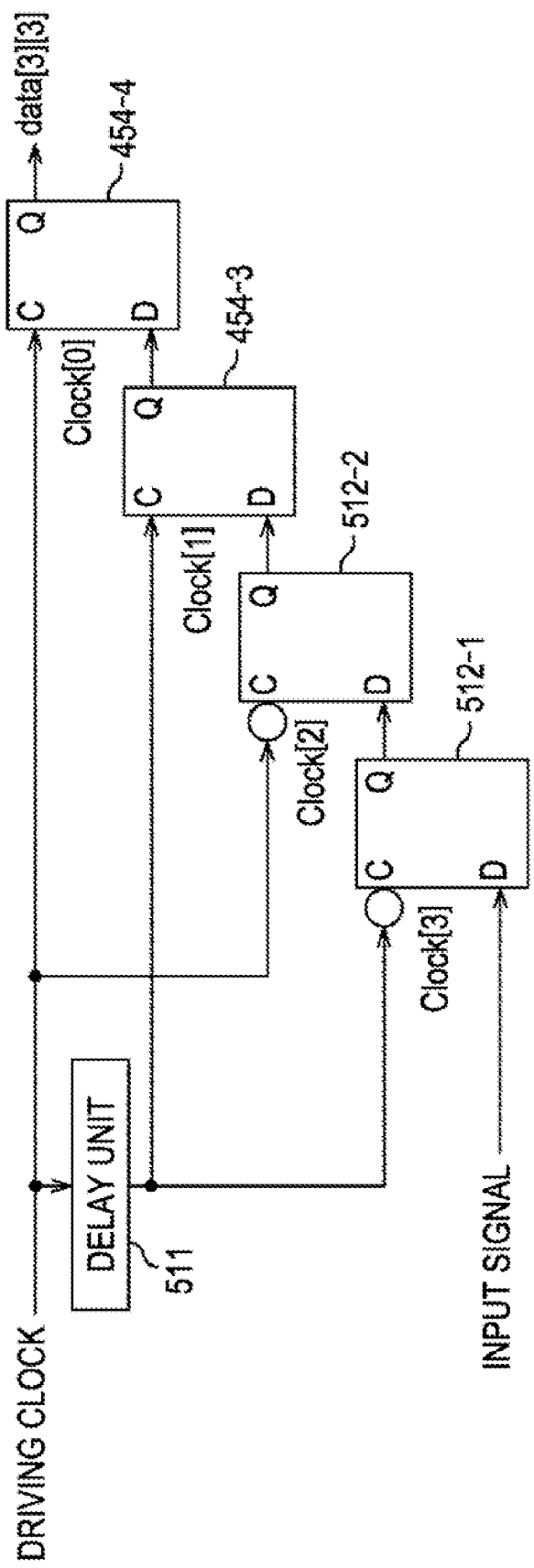
FIG. 26 is a diagram illustrating a connection example between a delay unit and a flip-flop.

Further, in a case wherein the sampling clock generating device 401 is provided within the sampling data generating device 441, a sampling clock is generated using the leading edge and trailing edge of the driving clock, whereby the number of the delay units to be connected to the flip-flops can be reduced. In such a case, the flip-flop 454 is connected with a single delay unit 511 such as shown in FIG. 26 for example. Note that in FIG. 26, the components corresponding to those in the case of FIG. 22 are denoted with the same reference numerals, and the description thereof will be omitted as appropriate.

In FIG. 26, flip-flops 512-1 and 512-2 are provided instead of the flip-flops 454-1 and 454-2. The flip-flops 512-1 and 512-2 operate in the same way as with the flip-flops 454-1 and 454-2, but obtain the supplied sampling clock in an inverted manner.

In FIG. 26, the driving clock is supplied to the delay unit 511 made up of a delay device or the like. That is to say, the supplied driving clock is supplied to the flip-flop 454-4 as the sampling clock Clock[0], the supplied driving clock is inverted, and supplied to the flip-flop 512-2 as the sampling clock Clock[2], and further the supplied driving clock is also supplied to the delay unit 511. Here, the sampling clock Clock[2] is the inverted driving clock, so is delayed by ²⁄₄ cycles of the driving clock as to the sampling clock Clock[0].

The delay unit 511 delays the supplied driving clock by ¼ cycles of the driving clock, supplies the delayed driving clock to the flip-flop 454-3 as the sampling clock Clock[1], and supplies the delayed driving clock to the flip-flop 512-1 as the sampling clock Clock[3]. Here, the sampling clock Clock[3] is obtained by the driving clock delayed by ¼ cycles being further inverted, and is delayed by ¾ cycles of the driving clock as to the sampling clock Clock[0].

The flip-flop 512-1 inverts the driving clock supplied from the delay unit 511, and obtains this as the sampling clock Clock[3]. Also, the flip-flop 512-1 samples the supplied input signal at the timing of the leading edge of the obtained sampling clock Clock[3], and outputs the data obtained as a result thereof.

The flip-flop 512-2 inverts the supplied driving clock, and obtains this as the sampling clock Clock[2]. Also, the flip-flop 512-2 samples the data output from the flip-flop 512-1 at the timing of the leading edge of the obtained sampling clock Clock[2], and outputs the data obtained as a result thereof to the flip-flop 454-3.

Thus, the flip-flops 512-1 and 512-2 inverts and obtains the supplied driving clock, whereby four sampling clocks having different phases can be generated simply by providing the single delay unit 511 even in a case wherein there are constraints regarding the number of delay devices which can be employed for the sampling data generating device 441, and delay according to wiring. That is to say, multiple sampling clocks can be generated with half or less the delay devices usually needed.

Note that with the configuration shown in FIG. 26, the driving clock is inverted, so it is desirable to set the duty ratio of the driving clock to generally 50%. Also, an arrangement may be made wherein a PLL circuit is employed to control the phase-lock position at the PLL circuit, thereby delaying the driving clock by desired time to generate the sampling clocks Clock[0] through Clock[3].

Figure 27:
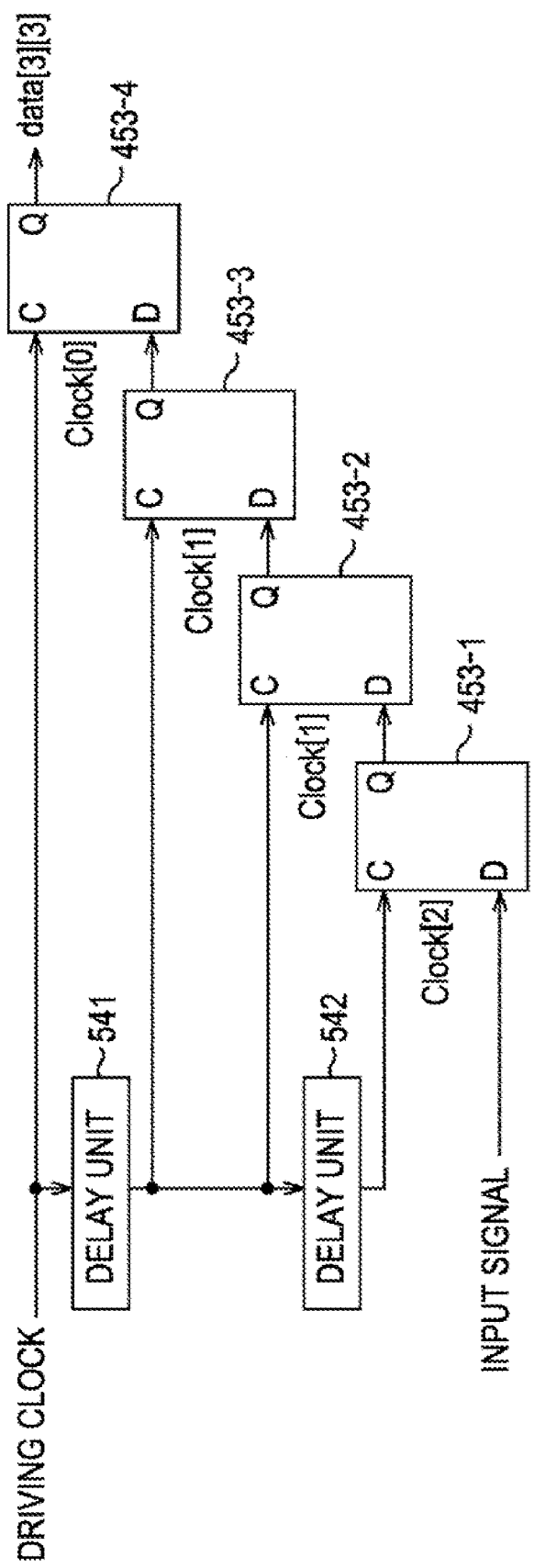
FIG. 27 is a diagram illustrating a connection example between a delay unit and a flip-flop.

Further, in a case wherein the sampling clock generating device 401 is provided within the sampling data generating device 441, for example, as shown in FIG. 27, the flip-flop 453 is connected with the delay units 541 and 542 for generating sampling clocks. Note that in FIG. 27, the components corresponding to those in the case of FIG. 22 are denoted with the same reference numerals, and the description thereof will be omitted as appropriate.

In FIG. 27, two delay units 541 and 542 made up of a delay device or the like are connected in serial, and the driving clock is supplied to the delay unit 541. That is to say, the driving clock is supplied to the flip-flop 453-4 with no change as the sampling clock Clock[0], and also supplied to the delay unit 541. The delay unit 541 delays the supplied driving clock by ¼ cycles of the driving clock thereof, supplies this to the flip-flops 453-3 and 453-2 as the sampling clock Clock[1], and supplies the driving clock to the delay unit 542.

The delay unit 542 further delays the driving clock supplied from the delay unit 541 by ¼ cycles of the driving clock, supplies the delayed driving clock to the flip-flop 453-1 as the sampling clock Clock[2]. Accordingly, the sampling clock Clock[2] supplied to the flip-flop 453-1 is a sampling clock delayed by two cycles of the driving clock as to the sampling clock Clock[0].

Note that with the configuration shown in FIG. 27, unlike the case in FIG. 22, the sampling clock Clock[1] delayed by ¼ cycles as to the sampling clock Clock[0] is supplied to the flip-flop 453-3. That is to say, the flip-flop 453-3 samples the data held by the flip-flop 453-2 not at the first timing of the leading edge of the sampling clock Clock[0] from the data held by the flip-flop 453-2 being updated and ready to be read correctly, but at the further latter timing of the timing thereof, i.e., at the timing of the leading edge of the sampling clock Clock[1].

The flip-flop 453-3 samples the data output from the flip-flop 453-2 in sync with the sampling clock Clock[1], so the data output from the flip-flop 453-3 is not data synchronized with the sampling clock Clock[0]. Note however, the flip-flop 453-4 of the further subsequent stage samples the data output from the flip-flop 453-3 in sync with the sampling clock Clock[0], so consequently, the data synchronized with the sampling clock Clock[0] is output from the flip-flop 453-4.

Thus, with the sampling data generating device 441, all that is necessary is that the data obtained with sampling using another sampling clock having a different phase from the sampling clock Clock[0] can be output in sync with the sampling clock Clock[0], so each flip-flop does not necessarily need to perform sampling temporally at the earliest timing, of the timing of the leading edge of each of the multiple sampling clocks, from the data held by the flip-flop of the preceding stage being ready to be read correctly.

Note however, in a case wherein sampling is performed using a sampling clock delayed greatly as to the sampling clock Clock[0], in order to regain the delayed worth as to the sampling clock Clock[0] in short time, it is desirable to perform sampling at the first timing of the leading edge of the sampling clock from the data held by the flip-flop of the preceding stage being able to be read correctly. In other words, it is desirable to perform sampling in sync with the rising edge of the first sampling clock after settling of the data.

Further, with the subsequent stage of the sampling data generating device for sampling the input signal, in a case wherein n steps of pipeline processing are performed, the sampling data generating device can also output the sampling data obtained by sampling the input signal after holding the sampling data by a period longer than the cycle tc of the driving clock, e.g., time tc×n (wherein n is an integer) of integer multiples of the cycle thereof.

Figure 28:
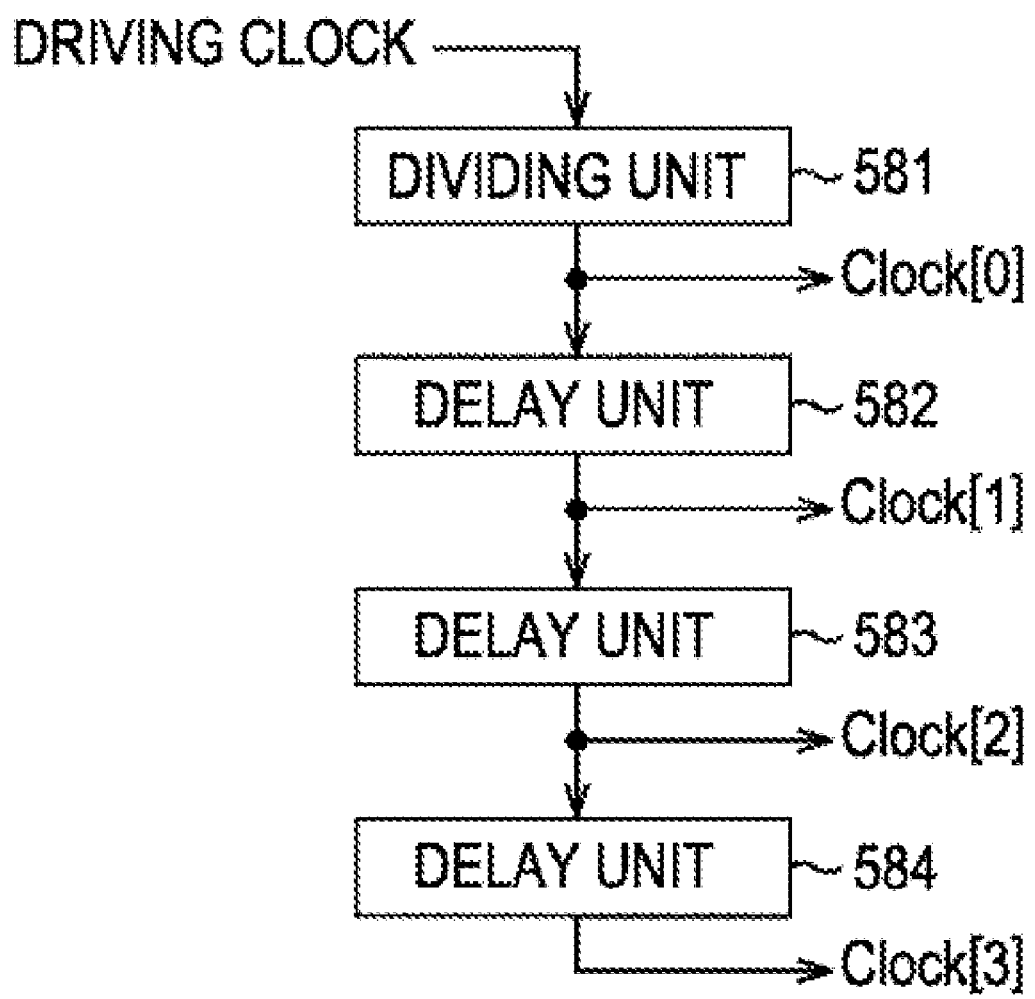
FIG. 28 is a diagram illustrating a configuration example of a sampling clock generating device.
Figure 29:
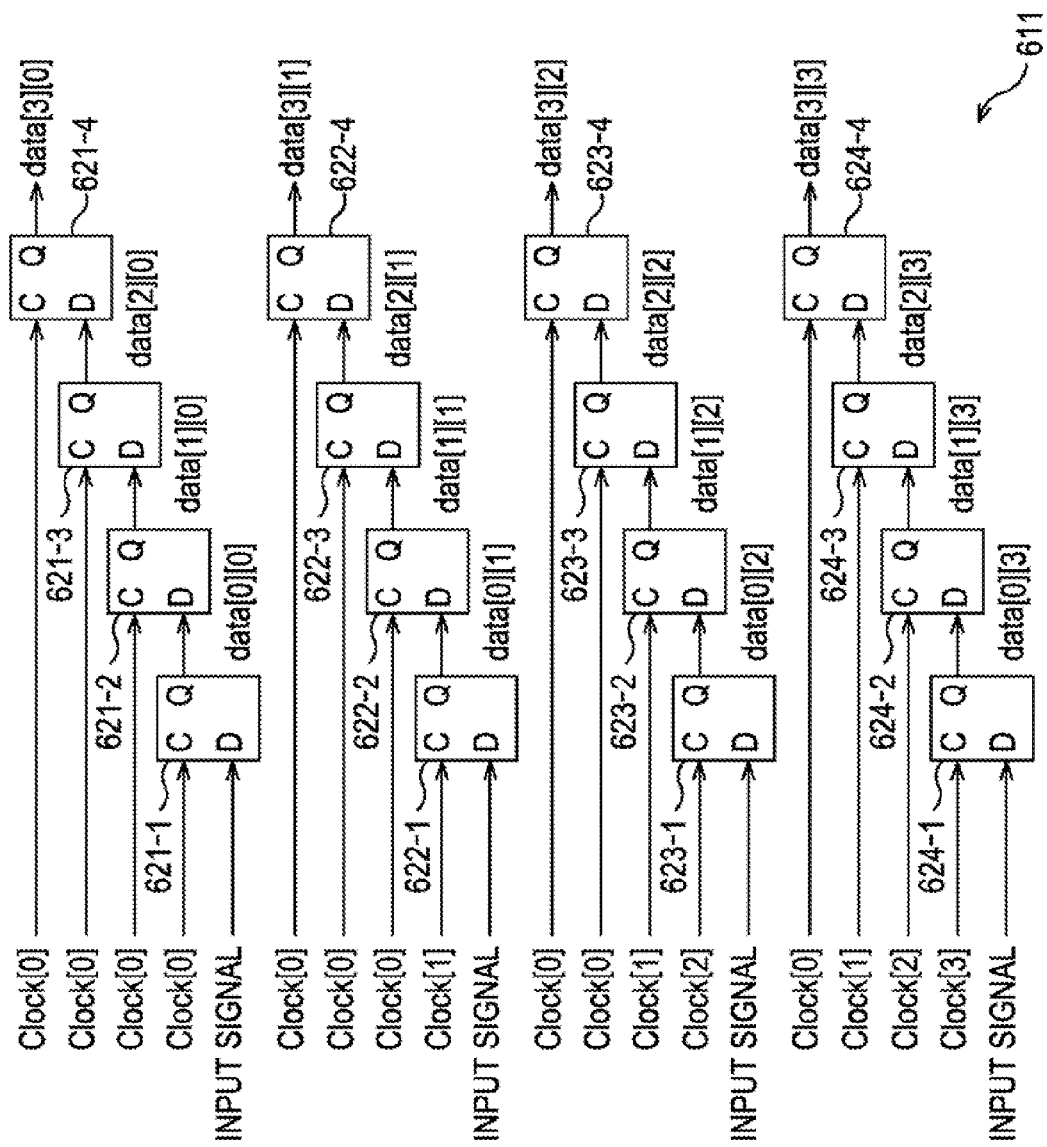
FIG. 29 is a diagram illustrating a configuration example of a sampling data generating device.

For example, in a case wherein two steps of pipeline processing are performed at the subsequent stage, the sampling clock generating device and sampling data generating device are configured such as shown in FIGS. 28 and 29, for example.

FIG. 28 is a diagram illustrating a configuration example of a sampling clock generating device.

A sampling clock generating device 571 is configured of a dividing unit 581, and delay units 582 through 584, and the driving clock is supplied to the dividing unit 581.

The dividing unit 581 is made up of, for example, a ½ divider or the like, and generates the sampling clock Clock[0] having a cycle twice the cycle of the driving clock by dividing the supplied driving clock. The diving unit 581 outputs the generated sampling clock Clock[0] to the sampling data generating device, and supplies this to the delay unit 582.

The delay unit 582 delays the sampling clock supplied from the dividing unit 581 by ½ cycles of the driving clock, and outputs the delayed sampling clock to the sampling data generating device as the sampling clock Clocks[1], and supplies this to the delay unit 583. Accordingly, the sampling clock Clock[1] is obtained by delaying the sampling clock Clock[0] by ½ cycles of the driving clock.

The delay unit 583 delays the sampling clock supplied from the dividing unit 582 by ½ cycles of the driving clock, and outputs the delayed sampling clock to the sampling data generating device as the sampling clock Clock[2], and supplies this to the delay unit 584. Accordingly, the sampling clock Clock[2] is obtained by delaying the sampling clock Clock[0] by one cycle of the driving clock.

The delay unit 584 delays the sampling clock supplied from the dividing unit 583 by ½ cycles of the driving clock, and outputs the delayed sampling clock to the sampling data generating device as the sampling clock Clock[3]. Accordingly, the sampling clock Clock[3] is obtained by delaying the sampling clock Clock[0] by 3/2 cycles of the driving clock.

Accordingly, the four sampling clocks are output from, the sampling clock generating device 571, which have the cycles twice the cycle of the driving clock, and the phases each shifted by ½ cycles of the driving clock, and supplied to a sampling data generating device 611 shown in FIG. 29.

The sampling date generating device 611 shown in FIG. 29 is configured of flip-flops 621-1 through 624-4. The sampling data generating device 611 and sampling clock generating device 571 are suitable for generating sampling data using a sampling clock in a case wherein the cycle tc of the driving clock is shorter than delay time until settling of data including delay according to wiring in the sampling data generating device 611, i.e., the delay time td until the data is ready to be read.

Here, the flip-flops 621-1 through 624-4 are configured so as to obtain data at the timing of the leading edge of the supplied sampling clock, such that the delay time td becomes equal to or smaller than 3/2 of the cycle tc of the driving clock. Also, the interval between the respective sampling clocks are configured so as to be equal to or smaller than ½ cycles of the driving clock, and also equal to or smaller than ¼ cycles of the sampling clock.

Note that each of the flip-flops 621-1 through 624-4 is the same as each of the flip-flops 451-1 through 454-4 in FIG. 22, so the description thereof will be omitted. That is to say, these flip-flops sample input data (input signal or data) at the timing of the leading edge of the supplied sampling clock, and hold the data obtained as a result thereof by one cycle of the sampling clock, and output this.

Also, in FIG. 22, the cycles of the sampling clocks to be supplied to the respective flip-flops are the same as the cycle of the driving clock, but the cycles of the sampling clocks supplied to the respective flip-flops 621-1 through 624-4 shown in FIG. 29 are set to twice the cycle of the driving clock.

Note that hereafter, in a case wherein there is no need to particularly distinguish each of the flip-flops 621-1 through 621-4, these will be simply referenced to as a flip-flop 621, and in a case wherein there is no need to particularly distinguish each of the flip-flops 622-1 through 622-4, these will be simply referenced to as a flip-flop 622. Similarly, hereafter, in a case wherein there is no need to particularly distinguish each of the flip-flops 623-1 through 623-4, these will be simply referenced to as a flip-flop 623, and in a case wherein there is no need to particularly distinguish each of the flip-flops 624-1 through 624-4, these will be simply referenced to as a flip-flop 624.

Thus, the data[3][0] through data[3][3] synchronized with the sampling clock Clock[0], i.e., the driving clock, obtained by sampling the input signal in sync with the sampling clocks Clock[0] through Clock[3], are output from the sampling data generating device 611, respectively. In other words, the sampling data obtained by sampling the input signal at ½ cycles of the driving clock, i.e., (½) tc time interval is output from the sampling data generating device 611.

Note that each piece of the data[3][0] through data[3][3] output from each of the flip-flops 621-1 through 624-4 may be taken as 1-bit logic data, or may be taken as data of two bits or more.

Here, in order to synchronize each piece of sampling data obtained by sampling with the driving clock (sampling clock Clock[0]), during from the data sampled at the timing of the leading edge of a predetermined sampling clock and held by a flip-flop becoming a level wherein the data can be read correctly until the data thereof is updated next, the flip-flop of the subsequent stage needs to obtain the data held by that flip-flop at the timing of the leading edge of another sampling clock having a different phase. Accordingly, the sampling cycle of the input signal is taken as the time below the difference between the time twice the cycle tc of the driving clock, and delay time td (2tc−td).

Also, the flip-flops 621 through 624 synchronize the data obtained by sampling in sync with each sampling clock with the sampling clock Clock[0], so it can be said that the sampling data generating device 611 is configured of the four shift registers made up of the flip-flops 621 through 624.

Further, an arrangement may be made wherein the input signal is taken as the digital modulated signal, and detection of the digital modulated signal is performed using the sampling data output from the sampling data generating device 611. In such a case, the sampling data output from the sampling data generating device 611 is employed, and detection data and phase comparison data are generated by the detection data generating unit 25 and phase comparison data generating unit 28.

Further, an arrangement may be made wherein the sampling clock generating device 571 is provided within the sampling data generating device 611, e.g., the flip-flop 624 may have the same configuration as any of FIGS. 24 through 26, or the flip-flop 623 may have the same configuration as the configuration shown in FIG. 27.

Figure 30:
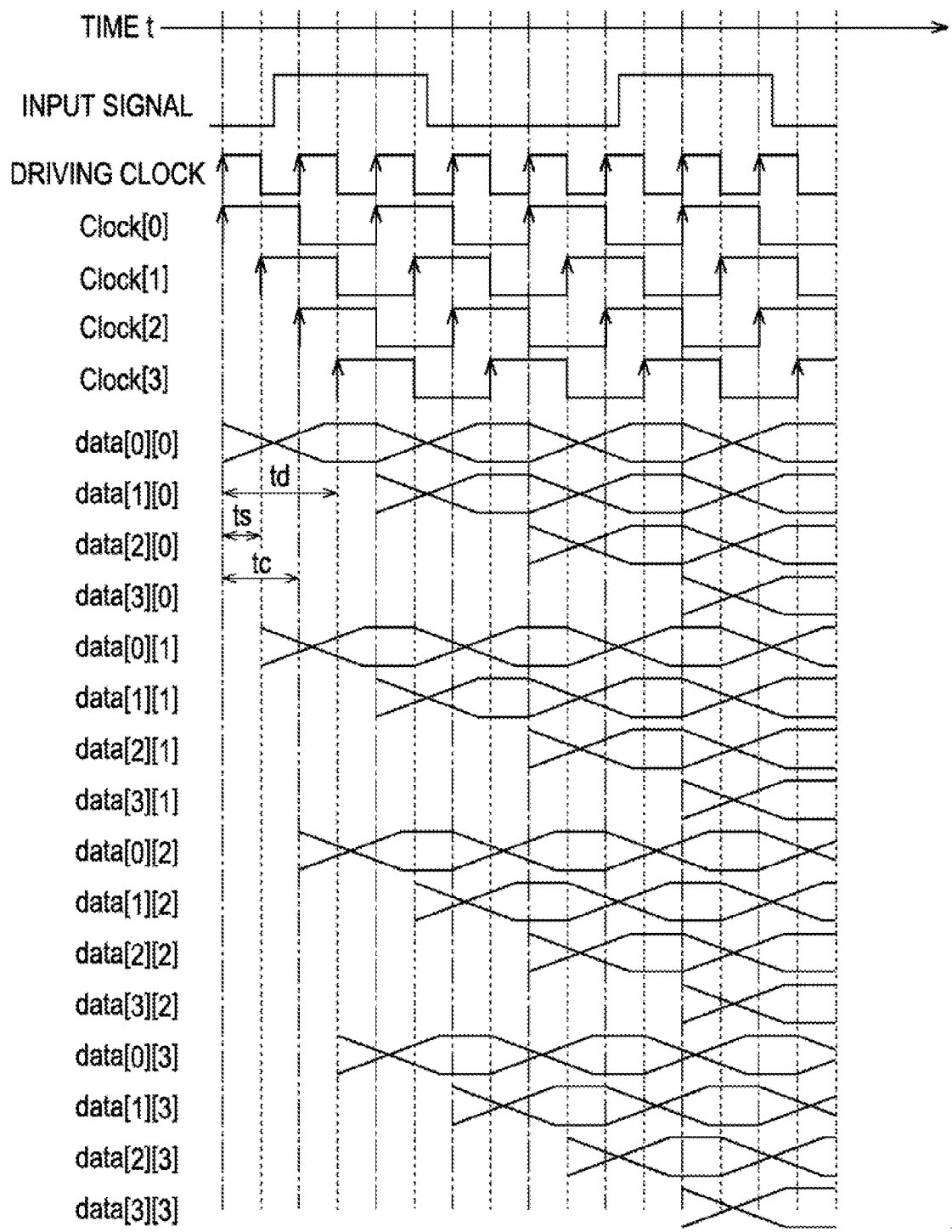
FIG. 30 is a diagram for describing data sampling timing of the sampling data generating device.

Further, for example, upon the input signal shown in FIG. 30 being supplied to the sampling data generating device 611, each flip-flop samples the supplied input signal or the data held by the flip-flop of the preceding stage at the timing of the leading edge of the supplied sampling clock.

Note that in FIG. 30, the horizontal direction indicates time, and the vertical direction indicates the level (logic value or data value) of each signal. Description will be made below assuming that with each signal, the logic value thereof is set to 1 at the time of the signal being in a state of the greatest level, and is set to 0 at the time of the signal being in a state of the smallest level. Also, FIG. 30 illustrates the waveforms of the input signal, sampling clocks Clock[0] through Clock[3], and data[0][0] through data[3][3].

The input signal is taken as a signal wherein the cycle thereof is longer than the cycle of the driving clock. Each of the sampling clocks Clock[0] through Clock[3] is as cycle waves wherein the cycle thereof is twice the cycle tc of the driving clock, and the sampling clocks Clock[1] through Clock[3] are obtained by delaying the sampling clock Clock[0] by ½ through ³⁄₂ of the cycle tc of the driving clock respectively.

Here, in the drawing of each sampling clock, upward arrows represent the timing of the leading edge of each sampling clock. Accordingly, the sampling cycle ts wherein the input signal is sampled is assumed to be ½ cycles of the driving clock.

Also, the data[0][0] is data obtained by sampling the input signal at the timing of the leading edge of the sampling clock Clock[0]. In FIG. 30, upon sampling of the input signal being performed in sync with the sampling clock Clock[0], the logic values 1 and 0 are obtained alternately as a result of the sampling.

The flip-flop 621-1 holds the logic value obtained with the sampling by one cycle of the sampling clock, so the level of the data[0][0] gradually increases or decreases after the timing of the leading edge of the sampling clock Clock[0], and upon reaching a level wherein the logic value is set to 1 or 0, the level thereof is maintained until the next timing of the leading edge of the sampling clock Clock[0]. Here, duration from the level of the data[0][0] beginning to change until a level wherein the logic value is set to 1 or 0 is taken as the delay time td according to settling.

Each piece of the data[1][0] through data[3][0] is obtained by each of the flip-flops 621-2 through 621-4 obtaining the logical value held by each of the flip-flops 621-1 through 621-3 at the timing of the leading edge of the sampling clock Clock[0], and holding the obtained logic value by one cycle of the sampling clock. Accordingly, each piece of the data[1][0] through data[3][0] is obtained by shifting each piece of the data[0][0] through data[2][0] in the right direction in the drawing, i.e., temporally in the backward direction by one cycle of the sampling clock Clock[0].

Also, the data[0][1] is data obtained by sampling the input signal at the timing of the leading edge of the sampling clock Clock[1]. The flip-flop 622-1 holds the logic value obtained with the sampling by one cycle of the sampling clock, so the level of the data[0][1] gradually increases or decreases after the timing of the leading edge of the sampling clock Clock[1], and upon reaching a level wherein the logic value is set to 1 or 0, the level thereof is maintained until the next timing of the leading edge.

Each piece of the data[1][1] through data[3][1] is obtained by each of the flip-flops 622-2 through 622-4 obtaining the logical value held by each of the flip-flops 622-2 through 622-3 at the timing of the leading edge of the sampling clock Clock[0], and holding the obtained logic value by one cycle of the sampling clock. Accordingly, the data[1][1] is obtained by shifting the data[0][0] temporally in the backward direction in the drawing by ¾ cycles of the sampling clock Clock[0], and the data[2][1] and data[3][1] are obtained by shifting the data[1][1] and data[2][1] temporally in the backward direction by one cycle of the sampling clock Clock[0].

Further, the data[0][2] is data obtained by sampling the input signal at the timing of the leading edge of the sampling clock Clock[2]. The flip-flop 623-1 holds the logic value obtained with the sampling by one cycle of the sampling clock, so the level of the data[0][2] gradually increases or decreases after the timing of the leading edge of the sampling clock Clock[2], and upon reaching a level wherein the logic value is set to 1 or 0, the level thereof is maintained until the next timing of the leading edge.

Each piece of the data[1][2] through data[3][2] is obtained by each of the flip-flops 623-2 through 623-4 obtaining the logical value held by each of the flip-flops 623-1 through 623-3 at the timing of the leading edge of the sampling clock Clock[1], sampling clock Clock[0], and sampling clock Clock[0], and holding the obtained logic value by one cycle of the sampling clock. Accordingly, the data[1][2] and data[2][2] are obtained by shifting the data[0][2] and data[1][2] temporally in the backward direction in the drawing by ¾ cycles of the sampling clock Clock[0], and the data[3][2] is obtained by shifting the data[2][2] temporally in the backward direction by one cycle of the sampling clock Clock[0].

Moreover, the data[0][3] is data obtained by sampling the input signal at the timing of the leading edge of the sampling clock Clock[3]. The flip-flop 624-1 holds the logic value obtained with the sampling by one cycle of the sampling clock, so the level of the data[0][3] gradually increases or decreases after the timing of the leading edge of the sampling clock Clock[3], and upon reaching a level wherein the logic value is set to 1 or 0, the level thereof is maintained until the next timing of the leading edge.

Each piece of the data[1][3] through data[3][3] is obtained by each of the flip-flops 624-2 through 624-4 obtaining the logical value held by each of the flip-flops 624-1 through 624-3 at the timing of the leading edge of the sampling clocks Clock[2] through Clock[0], and holding the obtained logic value by one cycle of the sampling clock. Accordingly, the data[1][3] through data[3][3] are obtained by shifting the data[0][3] through data[2][3] temporally in the backward direction in the drawing by ¾ cycles of the sampling clock Clock[0].

Thus, with the sampling data generating device 611, an arrangement is made wherein each flip-flop holds the obtained data, by one cycle of the sampling clock, which is longer than the delay time td, such that the flip-flop of the subsequent stage can read the data held at each flip-flop correctly, and a flip-flop which is updated at a different timing from the timing of the flip-flop of the preceding stage is employed as necessary, thereby relatively reducing the delay of the sampling clock, i.e., the delay of sampling timing, and accordingly, the sampling data obtained by sampling the input signal at a shorter cycle than the cycle of the driving clock can be output in sync with the sampling clock Clock[0] (driving clock).

That is to say, each of the data[3][0] through data[3][3] synchronized with the driving clock can be obtained from each of the data[0][0] through data[0][3] obtained with sampling using the sampling clock having a different phase.

Note that with the sampling data generating device 611, the input signal is sampled at a half cycle of the driving clock, so two sets of data are obtained during one cycle of the driving clock as sampling data obtained with the sampling. Also, in reality, four sets of the data[3][0] through data[3][3] are output at the timing of the leading edge of the sampling clock Clock[0] from the sampling data generating device 611, but two sets of the data are redundant and become unnecessary data. Accordingly, of the data[3][0] through data[3][3] output from the sampling data generating device 611, for example, only the upper two bits (e.g., data[3][0] and data[3][1]) or the lower two bits (e.g., data[3][2] and data[3][3]) may be employed for the processing of the subsequent stage.

Also, in a case wherein a logic cell capable of faster settling than the settling of the flip-flops of the sampling data generating device 611 can be employed, the logic cell thereof can be employed as a counter. In such a case, a counter is provided for each sampling clock, and the logic value held by a counter is inverted at the timing of the leading edge of the driving clock. Subsequently, regarding whether to output the sampling data of which sampling clock is selected according to the logic value held by the counter thereof.

Note that with the sampling data generating device 441 and sampling data generating device 611, an arrangement has been made wherein the input signal is sampled with four times and twice as many cycles as the cycle of the driving clock respectively, but sampling may be performed with arbitrary multiples.

For example, a sampling cycle whereby the input signal can be sampled is determined with the number of the subsequent buses of the sampling data generating device, delay time at a delay unit for generating a sampling clock, i.e., time interval between sampling clocks.

For example, if the number of the subsequent buses whereby sampling data can be output is N, sampling can be performed with N times as many cycles as the cycle of the driving clock. Also, if the upper limit interval of phase shifting between sampling clocks, i.e., the shortest interval is tm, sampling can be performed with M=[tc/tm] times as many cycles as the cycle of the driving clock. Here, tc indicates the cycle of a sampling clock, and [tc/tm] indicates the integer portion of tc/tm.

Accordingly, the input signal can be sampled with k=MIN (N, M) times as many cycles as the cycle of the driving clock. Here, MIN(N, M) indicates smaller one of N and M. Thus, with the sampling data generating device, if there is no restraint regarding the number of buses of sampling data to be output (number of bits), and time interval between sampling clocks, the input signal can be sampled with shorter cycle without limit than time until data is settled, or the cycle of the driving clock that can be realized within the sampling data generating device.

Also, the sampling clock generating device 401, sampling data generating device 441, sampling clock generating device 571, and sampling data generating device 611 are applied to a sampling hold circuit, whereby high-speed sample-holding can be realized, or applied to an analog-to-digital conversion circuit, whereby higher speed analog-to-digital conversion can be realized. Also, these sampling hold circuit and analog-to-digital conversion circuit are applied to a signal detection circuit and signal detecting circuit, whereby a reception device which receives a signal at higher speed can be realized.

Figure 31:
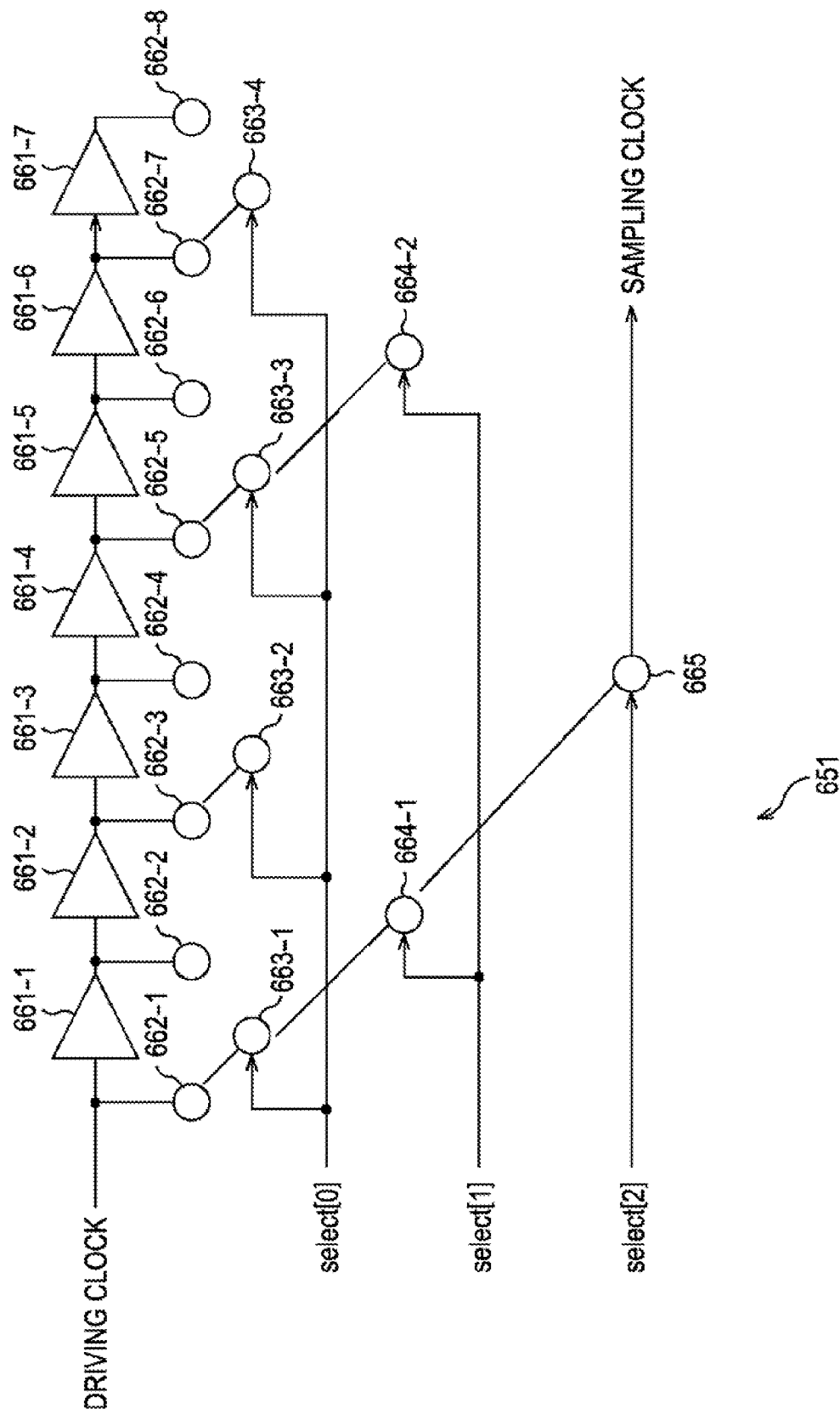
FIG. 31 is a diagram illustrating a configuration example of a delay unit.

Further, the above-mentioned delay units 91 through 93 of the sampling clock generating unit 22, the delay units 411-1 through 411-3 of the sampling clock generating device 401, the delay units 532 through 584 of the sampling clock generating device 571, and so forth may be configured such as shown in FIG. 31, for example.

FIG. 31 is a diagram illustrating a configuration example of a programmable delay unit for delaying the driving clock. A delay unit 651 is configured of buffers 661-1 through 661-7, nodes 662-1 through 662-8, switches 663-1 through 663-4, and switches 664-1, 664-2, and 665.

With the delay unit 651, the seven buffers 661-1 through 661-7 are connected serially, and the nodes 662-1 through 662-7 are connected to the input sides of the buffers 661-1 through 661-7 respectively. Also, the node 662-8 is connected to the output side of the buffer 661-7.

The driving clock is supplied to the buffer 661-1 and node 662-1 of the delay unit 651. Each of the buffers 661-1 through 661-7 holds the supplied driving clock by predetermined time, and outputs this. For example, each of the buffers 661-1 through 661-7 delays the supplied driving clock by ⅛ cycles of the driving clock, and outputs this.

The switch 663-1 is connected to the node 662-1 or node 662-2 based on a selection signal select[0] supplied from an unshown selector. That is to say, the switch 663-1 switches the connection thereof to the node 662-1 or node 662-2.

The switch 663-2 is connected to the node 662-3 or node 662-4 based on the selection signal select[0] supplied from the selector. The switch 663-3 is connected to the node 662-5 or node 662-6 based on the selection signal select[0] supplied from the selector. The switch 663-4 is connected to the node 662-7 or node 662-3 based on the selection signal select[0] supplied from the selector.

The switch 664-1 is connected to the node 663-1 or node 663-2 based on a selection signal select[1] supplied from an unshown selector. That is to say, the switch 664-1 switches the connection thereof to the node 663-1 or node 663-2. The switch 664-2 is connected to the node 663-3 or node 663-4 based on the selection signal select[1] supplied from the selector. Also, the switch 663 is connected to the node 664-1 or node 664-2 based on a selection signal select[2] supplied from an unshown selector.

For example, in a case wherein connection to the node 662-1 is instructed according to the selection signal select[0], connection to the node 663-1 is instructed according to the selection signal select[1], and connection to the node 664-1 is instructed according to the selection signal select[2], the switch 663-1 is connected to the node 662-1, the switch 664-1 is connected to the switch 663-1, and the switch 665 is connected to the switch 664-1. Thus, the driving clock supplied to the delay unit 651 is output with no change from the delay unit 651 via the node 662-1, switch 663-1, switch 664-1, and switch 665.

Also, for example, in a case wherein connection to the node 662-2 is instructed according to the selection signal select[0], connection to the node 663-1 is instructed according to the selection signal select[1], and connection to the node 664-1 is instructed according to the selection signal select[2], the switch 663-1 is connected to the node 662-2, the switch 664-1 is connected to the switch 663-1, and the switch 665 is connected to the switch 664-1. Thus, the driving clock supplied to the delay unit 651 is delayed by ⅛ cycles of the driving clock at the buffer 661-1, and is then output from the delay unit 651 via the node 662-2, switch 663-1, switch 664-1, and switch 665. That is to say, the driving clock to be output is delayed by ⅛ cycles of the original driving clock.

Further, for example, in a case wherein connection to the node 662-3 is instructed according to the selection signal select[0], connection to the node 663-2 is instructed according to the selection signal select[1], and connection to the node 664-1 is instructed according to the selection signal select[2], the switch 663-2 is connected to the node 662-3, the switch 664-1 is connected to the switch 663-2, and the switch 665 is connected to the switch 664-1. Thus, the driving clock supplied to the delay unit 651 is delayed by ⅛ cycles of the driving clock at each of the buffers 661-1 and 661-2, and is then output from the delay unit 651 via the node 662-3, switch 663-2, switch 664-1, and switch 665. That is to say, the driving clock to be output is delayed by ⅖ cycles of the original driving clock.

Further, for example, in a case wherein connection to the node 662-4 is instructed according to the selection signal select[0], connection to the node 663-2 is instructed according to the selection signal select[1], and connection to the node 664-1 is instructed according to the selection signal select[2], the switch 663-2 is connected to the node 662-4, the switch 664-1 is connected to the switch 663-2, and the switch 665 is connected to the switch 664-1. Thus, the driving clock supplied to the delay unit 651 is delayed by ⅛ cycles of the driving clock at each of the buffers 661-1 through 661-3, and is then output from the delay unit 651 via the node 662-4, switch 663-2, switch 664-1, and switch 665. That is to say, the driving clock to be output is delayed by ⅜ cycles of the original driving clock.

Moreover, for example, in a case wherein connection to the node 662-5 is instructed according to the selection signal select[0], connection to the node 663-3 is instructed according to the selection signal select[1], and connection to the node 664-2 is instructed according to the selection signal select[2], the switch 663-3 is connected to the node 662-5, the switch 664-2 is connected to the switch 663-3, and the switch 665 is connected to the switch 664-2. Thus, the driving clock supplied to the delay unit 651 is delayed by ⅛ cycles of the driving clock at each of the buffers 661-1 through 661-4, and is then output from the delay unit 651 via the node 662-5, switch 663-3, switch 664-2, and switch 665. That is to say, the driving clock to be output is delayed by ⅘ cycles of the original driving clock.

Moreover, for example, in a case wherein connection to the node 662-6 is instructed according to the selection signal select[0], connection to the node 663-3 is instructed according to the selection signal select[1], and connection to the node 664-2 is instructed according to the selection signal select[2], the switch 663-3 is connected to the node 662-6, the switch 664-2 is connected to the switch 663-3, and the switch 665 is connected to the switch 664-2. Thus, the driving clock supplied to the delay unit 651 is delayed by ⅛ cycles of the driving clock at each of the buffers 661-1 through 661-5, and is then output from the delay unit 651 via the node 662-6, switch 663-3, switch 664-2, and switch 665. That is to say, the driving clock to be output is delayed by ⅝ cycles of the original driving clock.

Moreover, for example, in a case wherein connection to the node 662-7 is instructed according to the selection signal select[0], connection to the node 663-4 is instructed according to the selection signal select[1], and connection to the node 664-2 is instructed according to the selection signal select [2], the switch 668-4 is connected to the node 662-7, the switch 664-2 is connected to the switch 663-4, and the switch 665 is connected to the switch 664-2. Thus, the driving clock supplied to the delay unit 651 is delayed by ⅛ cycles of the driving clock at each of the buffers 661-1 through 661-6, and is then output from the delay unit 651 via the node 662-7, switch 663-4, switch 664-2, and switch 665. That is to say, the driving clock to be output is delayed by ⅝ cycles of the original driving clock.

Moreover, for example, in a case wherein connection to the node 662-8 is instructed according to the selection signal select[0], connection to the node 663-4 is instructed according to the selection signal select[1], and connection to the node 664-2 is instructed according to the selection signal select[2], the switch 663-4 is connected to the node 662-8, the switch 664-2 is connected to the switch 663-4, and the switch 665 is connected to the switch 664-2. Thus, the driving clock supplied to the delay unit 651 is delayed by ⅛ cycles of the driving clock at each of the buffers 661-1 through 661-7, and is then output from the delay unit 651 via the node 662-8, switch 663-4, switch 664-2, and switch 665. That is to say, the driving clock to be output is delayed by ⅞ cycles of the original driving clock.

Thus, with the delay unit 651, connection of each switch is switched according to the selection signal from the selector, whereby the supplied driving clock can be delayed by predetermined time and output.

With the delay unit 651, it is desirable to determine time for delaying the driving clock at each of the buffers 661-1 through 661-7 as correctly as possible in light of propagation delay according to wiring of the delay unit 651 such that the driving clock output from the delay unit 651 is delayed by predetermined time.

Also, in a case wherein such a delay unit 651 is employed, for example, as the delay unit 91, 92, and 93 in FIG. 3 and the like, the driving clock output from the delay unit 651 is supplied to the flip-flops making up the sampling data generating unit 23 of the subsequent stage. In such a case, there is a possibility that irregularities may be caused due to propagation delay of wiring regarding the time interval of the multiple sampling clocks supplied from the sampling clock generating unit 22 to the sampling data generating unit 23. Therefore, it is desirable to determine wiring for connecting between the sampling clock generating unit 22 and sampling data generating unit 23 such that the time intervals between the sampling clocks supplied to the sampling data generating unit 23 are regular intervals as much as possible.

Note that description has been made above wherein the detection device 11 performs detection of a digital modulated signal modulated with a digital modulation method such as ASK, PSK, or the like, thereby obtaining the original baseband, but more specifically, depending on whether the digital modulated signal is a signal modulated with which digital modulation method such as ASK, PSK, or the like, a weight to be multiplied to sampling data is changed as appropriate when generating detection data or error data.

Also, a signal to be detected is not restricted to a digital modulated signal, as long as the signal represents data series, an arrangement may be made wherein a common digital signal of baseband, e.g., a signal subjected to Manchester coding is sampled with multiple sampling clocks, thereby obtaining the original signal.

That is to say, a signal obtained by modulating cycle waves (carrier) using a predetermined coding method, digital modulation method, or the like is sampled with multiple sampling clocks having the same cycle as the driving clock and having a different phase. Subsequently, the sampling data obtained as a result thereof is employed to generate the original signal obtained with sampling for each sampling clock, and phase comparison data indicating phase shifting for each sampling clock, and a reasonable original signal is selected from the original signal and phase comparison data.

For example, in the case of configuring the detection device 11 for detecting a BPSK signal where the cycle of the carrier is identical to the cycle of data, bit series obtained by performing logical determination of a BPSK signal become a signal equivalent to Manchester coding having the same cycle of data as the cycle of that data (bit series), so the detection device 11 for detecting a BPSK signal becomes a decoding device of Manchester coding. Further, according to the detection device 11, a common digital signal is sampled with shorter interval than the cycle of data, whereby the original data can be obtained.

The above-mentioned series of processing can be executed by hardware, and can also be executed by software. In a case of executing the series of processing by software, a program making up the software thereof is installed from a network or recording medium to a computer built into dedicated hardware, or a device capable of executing various types of functions by various types of programs being installed, such as a general-purpose personal computer for example.

FIG. 32 is a block diagram illustrating a hardware configuration example of a computer for executing the above-mentioned series of processing by the program. With the computer, a CPU (Central Processing Unit) 801, ROM (Read Only Memory) 802, and RAM (Random Access Memory) 803 are mutually connected by a bus 804.

Further, an input/output interface 805 is connected to the bus 804. The input/output interface 805 is connected with an input unit 806 made up of a keyboard, mouse, microphone, and so forth, an output unit 807 made up of a display, speakers, and so forth, a recording unit 808 made up of a hard disk, nonvolatile memory, and so forth, a communication unit 809 made up of a network interface and so forth, and a drive 810 for driving a removable medium 811 such as a magnetic disk, optical disc, magneto-optical disc, semiconductor memory, or the like.

With the computer thus configured, the CPU 801 loads, for example, the program recorded in the recording unit 808 to the RAM 803 via the input/output interface 805 and bus 804, and executes this, whereby the above-mentioned series of processing is performed.

The program executed by the computer (CPU 801) is provided by being recorded in the removable medium 811 which is a package medium made up of, for example, a magnetic disk (including flexible disk), optical disc (CD-ROM (Compact Disc-Read Only Memory), DVD (Digital Versatile Disc), etc.), magneto-optical disc, semiconductor memory, or the like, or provided via a cable or wireless transmission medium such as a local area network, the Internet, digital satellite broadcasting, or the like.

Subsequently, the program can be installed in the recording unit 808 via the input/output interface 805 by mounting the removable medium 811 on the drive 810. Also, the program can be received at the communication unit 809 via a cable or wireless transmission medium, and can be installed in the recording unit 808. In addition, the program can be installed in the ROM 802 or recording unit 808 beforehand.

Note that the program executed by the computer may be a program wherein processing is performed in chronological order along the sequence described in the present Specification, or may be a program wherein processing is performed in parallel or at necessary timing such as when call-up is performed, or the like.

Note that the embodiments of the present invention are not restricted to the above-mentioned embodiments, and various modifications can be made within departing from the essence of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
sampling clock generating means configured to generate, based on a driving clock with a predetermined cycle serving as an operating timing reference, a plurality of sampling clocks having mutually different phases and the same cycle as said predetermined cycle;
sampling data generating means configured to sample an input signal expressing data series using each of said plurality of sampling clocks, and generate a plurality of sampling data corresponding to said input signal;
phase comparison data generating means configured to generate phase comparison data indicating phase shiftings of said sampling clocks with respect to said input signal using said plurality of sampling data;
phase comparison data selecting means configured to select one of the phase comparison data of one of the sampling clocks having the phase closest to the phase of said input signal; and
data generating means configured to generate data based on the selected one of phase comparison data supplied from the phase comparison data selecting means, and to supply the data to the phase comparison data selecting means.

2. The signal processing device according to claim 1, wherein said data generating means multiply each piece of said sampling data obtained by sampling said input signal using each of said plurality of sampling clocks during a period of one cycle of one of said sampling clocks by predetermined weight, compare the sum of said sampling data sampled at a first half cycle of one cycle of said sampling clock, and multiplied by said weight with the sum of said sampling data sampled at a later half cycle of one cycle of said sampling clock, and multiplied by said weight, of said sampling data multiplied by said weight, and generate said data based on the comparison result thereof.

3. The signal processing device according to claim 1, wherein said phase comparison data generating means multiply each piece of said sampling data obtained by sampling said input signal using each of said plurality of sampling clocks during a period of one cycle of one of said sampling clocks by predetermined weight, and obtain the sum of each piece of said sampling data multiplied by said weight, thereby generating said phase comparison data.

4. The signal processing device according to claim 1, wherein said sampling data generating means employ a sampling clock of which the phase is closer to the phase of said driving clock than the phase of a predetermined sampling clock to sample data obtained by sampling said input signal using said predetermined sampling clock, further sample the data obtained as a result thereof employing a sampling clock having the same phase as said driving clock, and output the obtained data thereof as said sampling data, thereby generating said sampling data synchronized with said driving clock.

5. The signal processing device according to claim 1, wherein said input signal is a signal obtained by modulating a carrier having generally the same cycle as the cycle of said driving clock according to said data.

6. The signal processing device according to claim 1, wherein said sampling clock is delayed with respect to said driving clock, by a predetermined time which is shorter than one cycle of said driving clock.

7. The signal processing device according to claim 1, further comprising:
initial phase data generating means configured to detect an initial phase that is the phase of said input signal immediately after starting detection of said data by detecting a predetermined fixed pattern from said input signal using said data for each of said sampling clocks, and generate initial phase data indicating the detection result; and
phase data generating means configured to detect phase shifting of said input signal with respect to said initial phase, and generate phase data indicating the detection result,
wherein said phase comparison data selecting means select the one of the phase comparison data of one of the sampling clocks having the phase closest to the phase of said input signal based on said initial phase data and said phase data;
wherein said phase data generating means generate said phase data based on said data selected by said data selecting means, and said phase comparison data selected by said phase comparison data selecting means; and
wherein said data generating means select said data using said initial phase data and said phase data.

8. A signal processing method comprising the steps of:
generating, based on a driving clock having a predetermined cycle serving as an operating timing reference, a plurality of sampling clocks having mutually different phases and the same cycle as said cycle;
generating plurality of sampling data corresponding to an input signal expressing data series by sampling said input signal using said plurality of sampling clocks;
generating phase comparison data indicating phase shiftings of said sampling sleek clocks with respect to said input signal using said plurality of sampling data;
selecting one of the phase comparison data of one of the sampling clocks having the phase closest to the phase of said input signal;
generating data based on the selected one of phase comparison data; and inputting the generated data in the step of selection.

9. A non-transitory computer-readable media tangibly storing a program causing a computer to execute processing comprising the steps of:
generating, based on a driving clock having a predetermined cycle serving as an operating timing reference, a plurality of sampling clocks having mutually different phases and the same cycle as said cycle;
generating plurality of sampling data corresponding to an input signal expressing data series by sampling said input signal using said plurality of sampling clocks;
generating phase comparison data indicating phase shiftings of said sampling clocks with respect to said input signal using said plurality of sampling data;
select one of the phase comparison data of one of the sampling clocks having the phase closest to the phase of said input signal;
generating data based on the selected one of phase comparison data; and inputting the generated data in the step of selection.

10. A signal processing device comprising:
a sampling clock generating unit configured to generate, based on a driving clock with a predetermined cycle serving as an operating timing reference, a plurality of sampling clocks having mutually different phases and the same cycle as said predetermined cycle;

a sampling data generating unit configured to sample an input signal expressing data series using each of said plurality of sampling clocks, and generate a plurality of sampling data corresponding to said input signal;

a phase comparison data generating unit configured to generate phase comparison data indicating phase shiftings of said sampling clocks with respect to said input signal using said plurality of sampling data;

a phase comparison data selecting unit configured to select one of the phase comparison data of one of the sampling clocks having the phase closest to the phase of said input signal; and a data generating unit configured to generate data based on the selected one of phase comparison data supplied from the phase comparison data selecting unit, and to supply the data to the phase comparison data selecting unit.

* * * * *